(12) United States Patent
Smith, Jr.

(10) Patent No.: US 9,489,119 B1
(45) Date of Patent: Nov. 8, 2016

(54) ASSOCIATIVE DATA MANAGEMENT SYSTEM UTILIZING METADATA

(71) Applicant: Theodore Root Smith, Jr., Seattle, WA (US)

(72) Inventor: Theodore Root Smith, Jr., Seattle, WA (US)

(*) Notice: Subject to any disclaimer, the term of this patent is extended or adjusted under 35 U.S.C. 154(b) by 265 days.

(21) Appl. No.: 14/063,641

(22) Filed: Oct. 25, 2013

(51) Int. Cl.
G06F 17/30 (2006.01)
G06F 3/0482 (2013.01)
G06F 3/0484 (2013.01)
G06F 3/0486 (2013.01)

(52) U.S. Cl.
CPC .......... *G06F 3/0486* (2013.01); *G06F 3/0484* (2013.01); *G06F 3/0482* (2013.01); *G06F 17/3056* (2013.01)

(58) Field of Classification Search
CPC ............. G06F 17/30; G06F 17/30554; G06F 17/30557; G06F 17/3056; G06F 17/30112; G06F 17/301; G06F 17/30699; G06F 17/30722; G06F 17/30705; G06F 3/0484; G06F 3/0482
See application file for complete search history.

(56) References Cited

U.S. PATENT DOCUMENTS

| | | | |
|---|---|---|---|
| 6,553,365 B1 | 4/2003 | Summerlin | |
| 6,598,046 B1* | 7/2003 | Goldberg | .......... G06F 17/30699 |
| 6,768,997 B2 | 7/2004 | Schirmer | |
| 8,060,634 B1 | 11/2011 | Darnell | |
| 2003/0033296 A1 | 2/2003 | Rothmuller | |
| 2003/0158855 A1 | 8/2003 | Farnham | |
| 2004/0003403 A1* | 1/2004 | Marsh | .................... G06F 3/0481 725/53 |
| 2004/0064455 A1 | 4/2004 | Rosenzweig | |
| 2004/0125148 A1 | 7/2004 | Pea | |
| 2004/0239700 A1 | 12/2004 | Baschy | |
| 2006/0149716 A1* | 7/2006 | Polo-Malouvier | ........ G06F 17/30554 |
| 2007/0120576 A1 | 5/2007 | Ford | |
| 2007/0124333 A1 | 5/2007 | Bontempi | |
| 2007/0198613 A1 | 8/2007 | Prahlad | |
| 2008/0072145 A1 | 3/2008 | Blanchard | |
| 2008/0104542 A1* | 5/2008 | Cohen | ............... G06F 17/30864 715/810 |
| 2008/0154873 A1 | 6/2008 | Redlich | |
| 2008/0168135 A1 | 7/2008 | Redlich | |
| 2008/0183694 A1 | 7/2008 | Cane | |
| 2008/0222630 A1 | 9/2008 | Taylor | |
| 2009/0092374 A1 | 4/2009 | Kulas | |
| 2009/0307604 A1 | 12/2009 | Giles | |
| 2009/0327739 A1 | 12/2009 | Relyea | |
| 2010/0287053 A1 | 11/2010 | Ganong | |
| 2011/0004524 A1 | 1/2011 | Paul | |

(Continued)

OTHER PUBLICATIONS

Webster's ninth new collegiate dictionary, 1986, Merriam-Webster Inc., ninth edition, p. 409.*

*Primary Examiner* — Amy M Levy
*Assistant Examiner* — David Spellman
(74) *Attorney, Agent, or Firm* — Theodore R. Smith, Jr.

(57) ABSTRACT

Data management systems, interactions, interfaces, and methods are disclosed for utilizing metadata in the storage, management, organization, and retrieval of items through a visual interface. An associative interface component corresponds to an associative element of metadata including an associative category and one or more elements of associative data corresponding to the associative category. A user may interact with a data management system interface to associate a piece of selected data with a metadata element by dragging and dropping or otherwise adding a corresponding associative interface component to an interface panel associated with the piece of selected data. The user may access the piece of data by causing a search for data elements responsive to dragging and dropping or otherwise adding an associative interface component to a search interface panel.

20 Claims, 31 Drawing Sheets

(56) References Cited

U.S. PATENT DOCUMENTS

| | | |
|---|---|---|
| 2011/0022609 A1 | 1/2011 | Grover |
| 2011/0072375 A1 | 3/2011 | Victor |
| 2011/0161272 A1 | 6/2011 | Love |
| 2011/0191343 A1 | 8/2011 | Heaton |
| 2012/0110508 A1 | 5/2012 | Bullen |
| 2012/0159392 A1 | 6/2012 | Kauerauf |
| 2012/0215766 A1* | 8/2012 | Gorelik ............ G06F 17/30554 707/722 |
| 2012/0236201 A1 | 9/2012 | Larsen |
| 2012/0303629 A1 | 11/2012 | Klein |
| 2012/0304247 A1 | 11/2012 | Badger |
| 2012/0331568 A1 | 12/2012 | Weinstein |
| 2013/0145478 A1 | 6/2013 | O'Gorman, Jr. |
| 2013/0263289 A1 | 10/2013 | Vijayan |
| 2013/0283232 A1 | 10/2013 | Van Megchelen |
| 2014/0096048 A1* | 4/2014 | Rottler .................. G06F 3/0486 715/769 |
| 2014/0282101 A1* | 9/2014 | Beechuk ............... H04W 4/003 715/753 |
| 2014/0359505 A1* | 12/2014 | Cisler ............... G06F 17/30103 715/769 |

\* cited by examiner

| DATA ID | ASSOCIATIVE CATEGORY | ASSOCIATIVE ATTRIBUTE |
|---|---|---|
| 98c009cf1733 | DOCUMENT CLASS | "PURCHASE ORDER" |
| 98c009cf1733 | STATE | "WA" |
| 98c009cf1733 | ACCOUNTING CODE | "001684441" |
| 1373a3ff8a4a | CLIENT ID | "AABL04" |
| ⋮ | ⋮ | ⋮ |
| 1373a3ff8a4a | DOCUMENT NAME | "Mall Checklist" |
| 1a8cff8204ba | CLIENT ID | "CNDYAA0" |

ASSOCIATIVE DATA MANAGEMENT SYSTEM UTILIZING METADATA

BACKGROUND

Users and organizations that deal with significant quantities of digital information often have difficulty managing files and data in an efficient and intuitive manner. An inability to easily store, organize, and locate documents and content, while causing difficulty and irritation at the level of the individual user, may translate into significant inefficiencies and lost opportunities at the organizational level. Lost documents, overlooked e-mails and records, and the duplication of work between users or departments may impact a business's productivity and agility. For the digital consumer, difficulty organizing and locating digital data may result in user frustration and the accidental re-purchasing of extant content.

Modern high-capacity hard drives and remote storage solutions allow for the retention of large numbers of documents and records nearly indefinitely; however, increases in storage capacity have often not been accompanied by a corresponding increase in the effectiveness of document management tools and technology. Most modern storage solutions utilize some combination of a traditional directory-based file system and search-based data management such as full-text search or basic keyword tagging. Although appropriate for some types of data, both types of systems may present significant challenges when dealing with large numbers of files or heterogeneous data sets. Directory-based solutions may be satisfactory for highly structured data or content; however, directory-trees often break down as an organizational method when a document or datum is relevant across one or more data categories or when a user desires to cross-reference or locate documents based on an alternate organizational schema. Simple text and keyword search-based systems generally discard the rigid structure of the directory-tree, but may present other challenges, such as requiring that the user remember specific terms or phrases associated with the document to be located. The lack of structure associated with many keyword or full-text based data management solutions may also pose difficulties when similar keyword terms occur over different classes of documents, such as a "flight" keyword being used both for trip records and engineering documents.

Some of the weaknesses with directory and keyword/text search-based systems may be mitigated by associating one or more elements of typed metadata (e.g. customer ID, band name, product code, etc.) with each piece of data. Although the addition of typed metadata may allow for structured searches and easier access to data, these solutions often require a user to manually enter relevant metadata into a number of fields at the time that the document or data is being stored. In many cases, this process is extremely time consuming and may require that the user sort through a large number of metadata fields, only a fraction of which may be relevant for a particular document. These categories of metadata are often fixed by the storage solution provider and/or selected without a deep understanding of the needs of the user or organization. Still further, many metadata-based storage systems may encounter problems if users are not familiar with organizational or system naming conventions, as the entry of metadata values or terms in dissimilar ways may hamper efficient search. Taken as a whole, these problems often hinder the adoption of metadata-based document management systems, and can lead to a loss in system effectiveness and overall utility. A system capable of leveraging the power of a metadata-based system while preserving qualities such as customizability, consistency, and/or ease of use could provide significant benefits to organizations and individuals working in and interacting with data rich digital environments.

BRIEF DESCRIPTION OF THE DRAWINGS

The foregoing aspects and many of the attendant advantages of this disclosure may become more readily appreciated and better understood by reference to the following detailed description in conjunction with the accompanying drawings, wherein.

DETAILED DESCRIPTION

Figure 1:
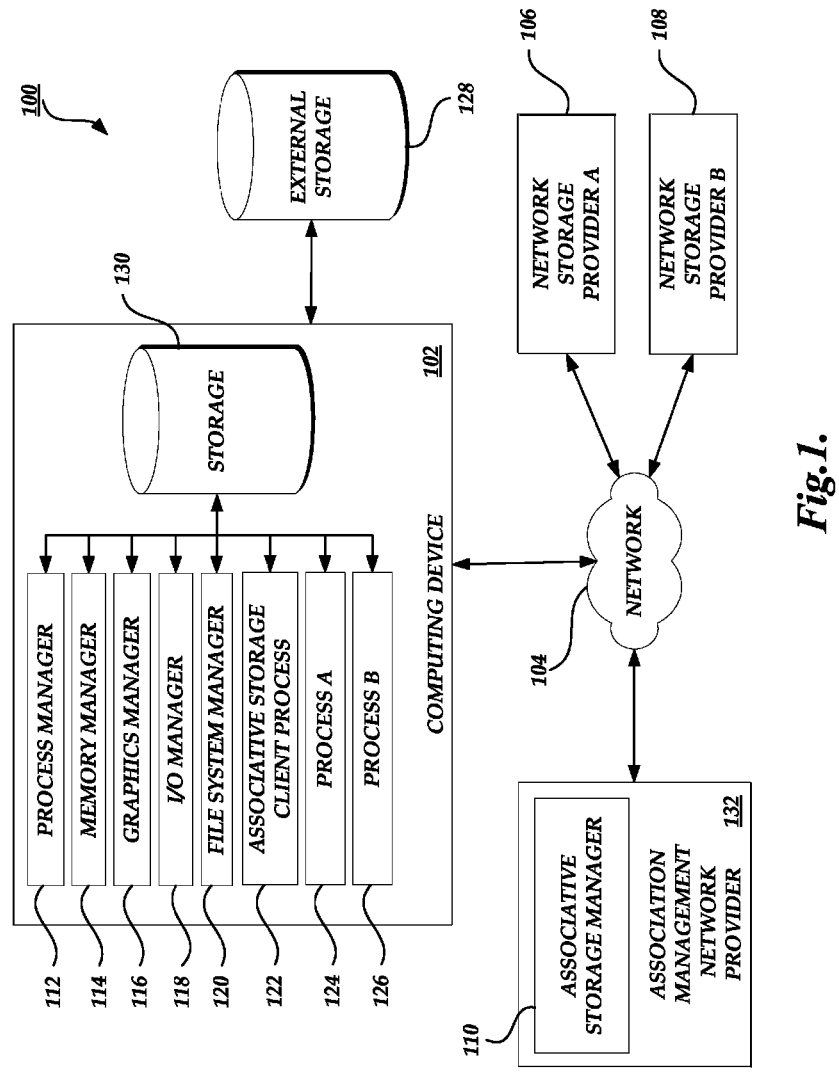
FIG. 1 is a block diagram depicting an illustrative embodiment of a computing environment implementing an item management system.

Generally described, the present disclosure is directed towards a computer system, and more specifically towards the management of data within or between one or more data storage solutions. For purposes of brevity, a piece of data to be stored, managed, retrieved or otherwise associated with a data storage solution may be referred to herein as an "item." It is important to note that such items are not limited to structured document data, but may encompass any type of file, message, e-mail, record, metadata, pointer, datum, or any other piece, collection, or set of data capable of being stored in an electronic medium.

Specifically, embodiments of item management systems, interactions, interfaces, and methods are disclosed for managing the storage, organization, and retrieval of items within, among, or between one or more data storage solutions. Additional or alternate embodiments of systems, interactions, interfaces, or methods of or relating to the management of item data and metadata are disclosed in the following three co-pending U.S. patent applications filed concurrently with the present application and incorporated by reference herein: patent application Ser. No. 14/063,632 filed by inventor Theodore R. Smith on the same date as the present application and entitled CUSTOMIZABLE ASSOCIATIVE DATA MANAGEMENT SYSTEM; and patent application Ser. No. 14/063,621 filed by inventor Theodore R. Smith on the same date as the present application and entitled METHODS AND SYSTEMS FOR ASSOCIATIVE SEARCH UTILIZING METADATA; and patent application Ser. No. 14/063,607 filed by inventor Theodore R. Smith on the same date as the present application and entitled ASSOCIATIVE DATA MANAGEMENT AND PERMISSIONING SYSTEM. Item management system interface components are described herein that enable a user to utilize metadata in the storage, management, organization, and retrieval of items through a visual interface. For the purposes of brevity, an associative element such as particular piece or set of metadata associable with an item will be referred to herein as a "tag instance" and the process of associating a tag instance with an item will be referred to as "tagging" the item.

In one embodiment, each tag instance may correspond to an associative category such as a logical category of metadata. For the purpose of brevity, a logical category of metadata will be herein referred to as a "tag category." For example, a tag instance may correspond to a "Client ID" tag category, which may, in one embodiment, indicate that the tag instance is associated with metadata describing one or more client ID codes. For the purpose of brevity, a tag instance corresponding to a particular tag category may herein be referred to as being a tag instance "of" the particular tag category; similarly, and for the purpose of brevity, a tag category corresponding to a particular tag instance may herein be referred to as being a tag category "of" the particular tag instance. In one embodiment, an item management system may define or include any number of tag categories, and may define or include any number of tag instances corresponding to each tag category.

In one embodiment, a tag instance may further be associable with one or more associative attributes such as an element of associative data descriptive of an attribute, property, categorization, or other aspect of an associated item; for the purpose of brevity, an element of descriptive metadata associable with a tag instance will be herein referred to as a "tag phrase." Similarly, and for the purpose of brevity, an associative attribute such as a tag phrase associated with a particular tag instance will be herein referred to as a "selected tag phrase." In various embodiments, a tag instance may be associated with any number of selected tag phrases.

Illustratively, selected tag phrases associated with a tag instance may be based on (or otherwise associated with) a tag category corresponding to the tag instance. For example, a tag instance corresponding to a "Client ID" tag category may be associated with an "APPL01" tag phrase, which in one embodiment may be a client identification code internal to an organization and representative of a particular business client. In the context of this example, tagging an item with this tag instance may indicate or imply that the item is related to or associated with the client represented by the "APPL01" identification code. It is important to note that the term "tag phrase" does not necessarily imply or refer to an actual alphabetic or alphanumeric phrase; a tag phrase may be, may include, or may be associated with any type of data, including but not limited to any combination of characters, character strings, numerical data, dates or times, pointers, data collections or objects, item management system objects, third party data or data objects, items, tag instances, or any other data capable of being stored in an electronic form.

In one embodiment, an item management system interface may include associative interface components corresponding to or representative of one or more tag instances. For the purposes of brevity, an associative interface component corresponding to or representative of one or more tag instances will herein be referred to as "tag interface component" or a "tag element." For the purposes of brevity, a tag instance associated with a particular tag element may herein be referred to as a tag instance "of" the tag element, and vice versa. Still further, and for the purpose of brevity, tag categories, tag phrases, or other tag settings or system data objects corresponding to or associated with a tag instance may herein also be referred to as corresponding to or associated with a tag element of the tag instance. In one embodiment, a tag element may present visual indicia indicating a corresponding tag category or selected tag phrase. In further embodiments, a tag element may be associated with any number of display settings or tag attributes defining aspects of display attributes, a visual appearance, or a presentation.

In one embodiment, a tag category may be associated with a set of predefined tag phrases; for the purpose of brevity, a set of predefined tag phrases will be referred to as a "tag phrase collection." Illustratively, a tag phrase collection may represent or include one or more tag phrases that may be selected or otherwise associated with a tag instance to become a selected tag phrase. For example, a "Client ID" tag category may be associated with a tag phrase collection including tag phrases such as "APPL01," "YAH0009," and "GOOG13." In the context of this example, an item management system interface may present a user with the option of selecting one or more of these predefined tag phrases to be associated with a tag instance (e.g. becoming a selected tag phrase) during an item tagging process. As a specific example, interacting with a tag element may cause an item management system interface to display a dropdown allowing a user to select one or more tag phrases out of a tag phrase collection. Although, for the purpose of clarity, tag phrase collections are herein discussed as being associated with a particular tag category, in various embodiments tag phrase collections may be associated with items or other system data objects, such as tag instances, etc. Illustratively, selected tag phrases or tag phrase collection data may have been entered or selected by one or more item management system user, or may have been defined by any combination of system administrator, installer, creator, or other entity with appropriate permissions. For example, a tag phrase collection may include tag phrases predefined by a system administrator as well as one or more tag phrases entered by a user in the course of retrieving and storing items.

In one embodiment, a tag category may be associated with various data defining, designating, or indicating one or more attributes, properties, or aspects of corresponding tag instances or tag elements. For the purposes of brevity, data defining an attribute, property, behavior, association, or aspect of a tag instance or tag element may be herein referred to as a "tag attribute." For example, a tag category may be associated with tag attributes defining a tag phrase data type (e.g. text) and maximum tag phrase length (e.g. 8 characters) for all corresponding tag instances and elements. As another example, a tag category may be associated with tag attributes defining a visual appearance (e.g. a background, border, etc.) for all corresponding tag elements. For the purpose of brevity, a tag category that is associated with a tag attribute or set of tag attributes defining, designating, or indicating a particular attribute, property, or aspect of a tag instance or tag element may herein be referred to as itself "designating" the particular attribute, property, or aspect. For example, within the context of our earlier example the tag category may be said to designate a visual appearance for corresponding tag elements. In one embodiment, a tag attribute may identify or correspond to a tag phrase collection. Illustratively, a tag category may be associated with any number of tag attributes defining various attributes, properties, behaviors, associations, or aspects of corresponding tag instances or tag elements, including, but not limited to, associated tag phrase formats or data types, tag phrase lengths or entry restrictions, tag element display properties or visual characteristics (e.g. colors, shapes, backgrounds, sounds, fonts, images or icons, display styles, etc.), functional properties (e.g. tag phrase selection or entry options, whether to suggest tag phrases, whether to add new tag phrases to a collection, whether to allow the use of comparison operators for values, etc.), display restrictions (e.g. whether an associated element should be shown in a search or storage interface configuration), associated tag phrase collections, etc. In one embodiment, tag categories or tag phrases may further be associated with user access permissions, such as permissions limiting or allowing a user or group from viewing, tagging or searching with, storing, or otherwise accessing associated tag elements, tag categories, tag phrases, tag instances, or other system data objects For the purpose of brevity, an element of data or metadata associated with or required for the implementation, functionality, or functioning of an item management system may herein be referred to as a system data object. In various embodiments, system data objects may include, but are not limited to: tag instances; tag attributes; tag categories; typed or untyped tag phrases; keywords; tag phrase collections; system user data; calendar or event data; permission data; storage locations or settings; encryption settings or keys; creation and modification history data; system data object attribute data; item management system configurations, properties, or attributes; data records; database records, files, or schema information; network configuration or access data; item information or metadata; or any other information associated with or required for the implementation, functionality, or functioning of an item management system.

Although tag instances and other metadata are generally described herein for the purpose of clarity and illustration as relating to items and item data, it should be understood that tag instances and other metadata may additionally or alternately relate to any number of different system data objects; interfaces, methods, systems, processes, or procedures described herein respective to one or more items may be performed, described, or implemented respective to any system data object. In one embodiment an item management system may manage data, metadata or other information associated with system data objects in addition or as an alternative to data, metadata or other information associated with items. For example, in various embodiments, metadata relating to a system user, access log, storage location, or tag category may be stored, retrieved, or otherwise managed by an item management system in any of the same ways as metadata associated with one or more item.

For the purpose of clarity and illustration, embodiments of tag instances and tag elements referenced herein are generally discussed as each corresponding to a single tag category; however, it should be understood that any such correspondence is presented for the purpose of clarity and illustration only and in no way limits the number of tag categories corresponding to a tag instance or tag element. In various embodiments a tag instance or tag element may inherit, correspond to, be based upon, or otherwise be associated with any number of different tag categories. For example, in one embodiment a tag instance or tag element may be associated with a primary tag category and a secondary tag category. In another embodiment, a tag instance or tag element may be associated with two or more tag categories, and may inherit properties from or be based on tag attributes associated with any one or more of these tag categories. In still another embodiment, a tag instance or tag element may not be associated with any tag category, and tag phrases corresponding to the tag instance or tag element may not be associated with any specific logical category of metadata.

Further, for the purpose of clarity and illustration, embodiments of tag instances and elements referenced herein are generally discussed as corresponding to associative metadata (e.g. tag categories, tag phrases) potentially descriptive of one or more items; however, it should be understood that any such correspondence to associative or descriptive metadata is presented for the purpose of clarity and illustration only and in no way limits tag instances or elements from corresponding to or representing other types of data or metadata. Illustratively, data or metadata associated with a tag instance or element, tag category, tag attribute, item, or other system data object may include, but is not limited to, typed or untyped tag phrases, keywords, tag phrase collections, system user data, calendar or event data, access permission settings or data, storage locations or settings, encryption settings or keys, item or system access history data, system data object attribute data, item management system properties or attributes, encryption or compression methods, item names or descriptions, item preview information, display data or settings, access or application preferences, creation dates, creator or modifier identifiers, item types or formats, modification or creation dates, version numbers, identification codes, record identifiers, or any other information associated with an attribute or aspect of an item or system data object or otherwise required for the implementation, functionality, or functioning of an item management system.

In one embodiment, a tag instance or element may correspond to metadata associated with an item storage setting or location. For example, a tag element may include visual indicia representative of a storage location, encryption options, compression options, a backup schedule, or properties or settings associated with the storage of one or more items. In the context of this example, moving the tag element to an interface panel associated with a particular item may cause an item management system to modify or define storage settings for the item. In another embodiment, a tag instance or element may correspond to metadata associated with item permissions. For example, a tag element may include visual indicia representative of one or more item access permissions or system users. In the context of this example, moving the tag element to an interface panel associated with a particular item may cause an item management system to modify or define user access permissions for the item. In further embodiment, a tag instance or element may represent, include, or be associated with any number of other properties, attributes, or aspects associated with one or more items, and may represent, include, or be associated with any type or combination of metadata associated with one or more items. As discussed above, in one embodiment, a tag instance or element may not correspond to a tag category. In another embodiment, a tag element may visually represent a purpose, type, or suggested use through one or more display properties. For example, a particular tag element corresponding to one or more item storage settings may not correspond to or may not display a tag category. As another example, a particular tag element corresponding to one or more item permissions may use visual indicia including a red background to show that it represents a tag instance corresponding to access-limiting permissions.

For the purpose of clarity and illustration, tag attributes referenced herein are generally discussed as being logically associated with a tag category; however, it should be understood that any such logical association is presented for the purpose of clarity and illustration only, and in no way limits the organization or logical associations of tag attributes within an item management system. In various embodiments, one or more tag attributes may be logically associated with any number of different system data objects, including, but not limited to, tag instances, tag categories, tag phrases, tag phrase collections, particular tag attributes, tag attribute data objects (e.g. a data object defining one or more tag attributes, a tag archetype or prototype object, etc.) or any other system data object. For example, in one embodiment an item management system may define or implement a tag archetype object associated with one or more tag attributes or system data objects (e.g. associated with a set of tag categories, tag phrase collections, tag phrase data types, tag element display settings, etc.). For the purposes of this example, each tag instance or tag element may inherit or be based on one or more tag archetypes; tag instance or element associations or attributes such as a corresponding tag category, a corresponding tag phrase collection, tag element display properties, etc. may inherit from a parent tag archetype.

It should further be understood that any discussion herein of tag attributes associated with one or more tag category (or other system data object) may refer to one or more illustrative embodiment of a set of tag attributes, and in no way implies that any particular set of tag attributes necessarily represents a fixed or complete definition or basis for any particular tag instance, tag element, or set of tag instances or elements. In one embodiment, one or more of a set of tag instances or tag elements corresponding to a particular tag category may be based on a different set of tag attributes than other members of the set of tag instances or tag elements corresponding to the particular tag category. In another embodiment, all of a set of tag instances or tag elements corresponding to a particular tag category may be based on a same set of tag attributes. In one embodiment, a tag instance or tag element may not be based on any particular tag attribute or set or tag attributes. In one embodiment, a tag attribute or set of tag attributes may provide the basis for any number of different tag instances or tag elements; in further embodiments, a tag instance or tag element may inherit or derive properties from any number of different tag attributes or sets of tag attributes. Illustratively, a tag instance or tag element may inherit, duplicate, reference, or otherwise be associated with one or more tag attributes in any way known in the relevant art.

Illustratively, various aspects of an item management system, including, but not limited to, one or more tag instances, tag elements, tag attributes, tag categories, tag phrases, or other system data objects may be generated or defined by any combination of different entities, including, but not limited to, an item management system creator or installer, a system user, a system administrator, etc. For example, in one embodiment an implementation of an item management system may include one or more predefined tag categories (e.g. "Keyword," "Document Creator," etc.), and a system administrator may define one or more additional tag categories (e.g. "Client ID," "Counterparty," etc.). In additional embodiments, various aspects of one or more tag instances, tag elements, tag attributes, tag categories, tag phrases, system data objects, or item management system may be defined or generated by an item management system, and may be based on any combination of data, metadata, or other aspect of an item management system (e.g. an item, system data object, etc.).

In order to illustrate various aspects and advantages of this disclosure, a number of embodiments and examples are provided. For example, in one embodiment, a user may utilize an item management system storage interface in the storage and tagging of one or more items. An embodiment of an item management system storage interface is discussed below at least with reference to FIG. 3, et al. A user may begin a tagging or storage routine or interaction by selecting an item to be stored by an item management system. To provide a specific example, a user on a personal computer or mobile computing device might select an item consisting of a "Jones Account Purchase Order" document by dragging and dropping the document over an icon associated with the item management system.

To continue with our specific example, the user may be presented with an item management system storage interface including one or more interface elements; interface elements may include, but are not limited to, a library interface location such as a tag repository or interface panel component (herein referred to as a "tag library component" or "tag library") and a selected item interface location such as a tagging interface panel component (herein referred to as a "tagging interface panel").

Illustratively, a tag library component may consist of an interface panel or other interface component (e.g., a box, list, etc.) holding or organizing one or more tag elements associated with an item management system. In one embodiment, a tag library component may include one or more logical sections or areas for the organization of tag elements. For example, a user may configure a tag library component to include one or more collapsible areas to hold tag elements of various tag categories. As a specific example, a user may configure a tag library component to include a "Work" area intended to hold tag elements related to her work, and a "Music" area intended to hold tag elements related to audio content. In one embodiment, a tag library component may include search functionality to locate or retrieve a tag element. For example, a tag library component may include a search bar allowing a user to search for a tag element by a corresponding tag category or tag phrase. In another embodiment, a tag library component may include tag element suggestion functionality to suggest or recommend one or more tag elements or tag categories to associate with an item.

Illustratively, a tagging interface panel may consist of a panel or other interface component (e.g. a box, list, icon, image, etc.) configured to hold or reference tag elements or other metadata interface elements. In one embodiment, a tagging interface panel may be associated with one or more selected items.

In one embodiment, a user may identify a tag element in a tag library component with a tag category appropriate for an item to be stored. Illustratively, a tag element may display indicia corresponding to one or more selected tag phrases associated with a tag element. For the purpose of our specific example, we may assume that the item management system interface includes a tag element with a "Customer" tag category; we may further assume that the "Customer" tag element is currently displaying indicia associated with a "Smith" selected tag phrase.

In one embodiment, if a tag element is not associated with an appropriate tag phrase for a selected item, a user may select an appropriate tag phrase through the use of a dropdown or other interface component associated with the tag element. For the purpose of our specific example, we may assume that the "Customer" tag category is associated with a tag phrase collection including at least a predefined "Jones" tag phrase in addition to the "Smith" tag phrase. In the context of our specific example, the user may open a dropdown interface associated with the tag element to show one or more tag phrases associated with the tag phrase collection and select the "Jones" tag phrase; this may cause the "Jones" tag phrase to become the selected tag phrase and may cause the tag element to display indicia associated with the "Jones" tag phrase.

In one embodiment, a user may add a tag element in a tag library component to a tagging interface panel. For example, a user may add a tag element by dragging and dropping the tag element from the tag library component to the tagging interface panel, by selecting a move or add command from a menu or dropdown, by selecting the tag element within the tag library, by right-clicking, left-clicking, or double-clicking, or by any other interface means. The user may repeat this process until all desired tag elements have been moved to the tagging interface panel. Illustratively, a tag element may be moved between panels or interface components whether or not an appropriate tag phrase has been selected. Further, in one embodiment, a user may modify or select a tag phrase associated with a tag element regardless of the location of the tag element in the item management system interface.

In the context of our specific example, the user may drag or otherwise move one or more tag elements from the tag library component to a tagging interface panel associated with the selected item. For the purpose of this specific example, we may assume that the user moves the tag element with the "Customer" tag category to the tagging interface panel, and that the user further moves a tag element with an "Order Value" tag category and a tag element with a "Document Class" tag category to the tagging interface panel. As discussed above, the tag element with the "Customer" tag category may be associated with a "Jones" selected tag phrase. In the context of this specific example, the user may utilize a dropdown associated with the "Document Class" tag element to select an appropriate tag phrase from a tag phrase collection associated with the "Document Class" tag category. For this specific example, we may assume that the user selects a "Purchase Order" tag phrase to associate with the "Document Class" tag element.

Continuing our specific example, we may assume that the "Order Value" tag category does not have any defined tag phrases in an associated tag phrase collection and allows the free entry of tag phrase values. Illustratively, the tag element associated with the "Order Value" tag category may include a field that allows the user to enter a tag phrase consisting of a floating point currency value. For example, the user may enter a value of $8345.50 into the field of the tag element. The entered value may become the selected tag phrase associated with the "Order Value" tag element, and may, for the purpose of our specific example, represent an order value associated with the "Jones Account Purchase Order" item.

Illustratively, a user may store a selected item by selecting a "Store" or "Save" interface button or otherwise activating a store command. In one embodiment, activating a store command may cause the system to store data corresponding to a selected item to one or more storage locations (e.g. a local drive, remote storage repository, and/or other storage solution) and additionally store or record metadata associated with the selected item, including but not limited to tag instance data associated with one or more tag element in the tagging interface panel. In various embodiments, metadata associated with a selected item may additionally or alternately include automatically generated metadata (e.g. based on data or attributes of the selected item), or metadata entered into one or more fixed fields or other interface components.

Illustratively, the system may store tag instance data and other item metadata to any number of metadata repositories. In various embodiments, a metadata repository may include or consist of a data storage system including but not limited to any combination of associative or non-associative database, flat file, distributed storage system, index, item data (e.g. a header or footer attached to stored item data), data tree, or other structured or unstructured data storage system on any combination of storage devices, providers, or other storage solutions. In one embodiment, a metadata repository may include or be associated with one or more of the same storage solutions as a selected item. In another embodiment, a metadata repository may be included in or associated with any other combination of storage solutions or locations. In various embodiments, an item management system may encrypt or compress an item and/or metadata to be stored, or may store multiple copies of an item or of various elements of associated metadata in one or more repositories or data storage solutions. In one embodiment, a metadata repository may store system data objects associated with functionality, configurations, or aspects of an item management system in addition to metadata and system data objects associated with one or more stored items.

To continue our specific example, a user may decide that there are no other appropriate tag categories corresponding to the "Jones Account Purchase Order" item and may click a "Store" button associated with the item. The system may store the "Jones Account Purchase Order" item to one or more data storage solution, and may record metadata associated with properties of attributes of the item (e.g. an item location, encryption key, encryption or compression method, creation date, creator, item type, version number, etc.) or metadata corresponding to the tag elements in the tagging interface panel (e.g. tag categories, selected tag phrases, etc.) in a metadata repository.

In a further illustrative embodiment, a user may search for one or more stored items through an item management system search interface. Illustratively, an item management system search interface may include user interface elements including but not limited to a tag library component, a search interface location such as a search interface panel component (herein "search interface panel"), and a search results interface location such as a search results interface panel component (herein "search results interface panel"). An illustrative embodiment of an item management system search interface is discussed below at least with reference to FIG. 27, et al. In one embodiment, elements included in an item management system search interface (e.g. tag elements, a tag library component, etc.) may correspond, be organized, or be displayed in a manner similar to elements included in an item management system storage interface. In another embodiment, alternate or additional interface components may be displayed or may be organized differently in an item management system search interface than within an item management system storage interface. For example, an item management system interface may include a tag library component storing and organizing an identical, similar, or different set of tag elements in each of a storage configuration and a search configuration.

In one embodiment, a search interface panel may consist of a panel or other interface component configured to hold or reference tag elements or other metadata interface elements. Illustratively, a search interface panel may be associated with a search results interface panel. An illustrative example of a search interface panel is discussed below at least with reference to FIG. 27 et al.

In one embodiment, a search results interface panel may consist of a panel or other interface component configured to display or reference one or more sets of search results. Illustratively, search results may include a combination of data or metadata associated with items or system data objects corresponding to the results of a search. An illustrative example of a search results interface panel is discussed below at least with reference to FIG. 27 et al.

To continue our illustrative embodiment, a user may drag or otherwise move one or more tag elements from a tag library component to a search interface panel. In one embodiment, moving a tag element to a search interface panel may cause an item management system to perform an associative search of various stored items based on tag instance data associated with tag elements within the search interface panel. For example, an item management system may compare tag instance data associated with one or more tag elements with metadata or data stored in one or more metadata repository and associated with stored items or system data objects.

For the purpose of illustration, and in the context of our earlier specific example, a user may wish to find a previously stored "Jones Account Purchase Order" document. Within the context of this specific example, the user may identify a tag element corresponding to a "Customer" tag category, and may select a "Jones" tag phrase from an associated tag phrase collection through a dropdown associated with the tag element. In the context of this specific example, dragging this tag element to a search interface panel may cause the item management system to search for stored items with associated tag instance data corresponding to at least the "Customer" tag category and the "Jones" tag phrase.

In one embodiment, having identified one or more stored items, an item management system may return a list of search results, including various metadata information associated with the one or more stored items (e.g. an item name, item type, creation date, size, version, other associated tag instances, etc.). An item management system interface may present information corresponding to any number of search results in any display configuration or presentation format (e.g. list view, icon view, tile view, preview view, etc.). For the purpose of our specific example, the item management system may retrieve search results identifying a number of items that have been tagged with at least the "Customer" tag category and the "Jones" tag phrase. Illustratively, one of these items may be the desired "Jones Account Purchase Order" item. In one embodiment, a user may move additional tag elements to a search interface panel in order to narrow or expand a scope of a search.

FIG. 1 is a block diagram depicting an illustrative computing environment 100 implementing an embodiment of an item management system for the storage, management, and retrieval of digital data. As illustrated in FIG. 1, computing environment 100 includes a client computing device 102. In an illustrative embodiment, client computing device 102 may correspond to any of a wide variety of computing devices including personal computing devices (e.g. desktop or laptop computing devices), tablet or other hand-held computing devices, mobile devices, wireless devices, augmented reality devices or glasses, virtual reality devices, set-top devices, terminal devices, network or cloud computing devices, server or mainframe computing devices, or any other electronic device or appliance.

Illustratively, client computing device 102 may include or implement one or more hardware or software components for management of various aspects of the client computing device 102, such as process manager 112, memory manager 114, graphics manager 116, I/O manager 118, and file system manager 120. Client computing device 102 may further include or implement one or more client processes 124 and 126. Client processes 124 and 126 may include, but are not limited to any variety of application, service, utility, script, or other software or hardware process. Still further, client computing device 102 may include or implement one or more storage device 130. Illustratively, storage device 130 may comprise any kind or configuration of one or more devices or modules allowing the storage of electronic information, which may include but are not limited to computer hard drives, solid state drives (SSD), clustered drives (e.g. RAID), flash storage, optical storage, removable storage media such as CD or DVD, tape drive, holographic storage, or other storage technology or device. Client computing device 102 may further be directly or indirectly connected to one or more external storage solution 128, such as an external hard drive or flash memory device, drive cluster, storage management system, external media device, or other storage solution.

Client computing device 102 may further include associative storage client process 122 for providing an item management storage system interface. Associative storage client process 122 may be implemented in any combination of software or hardware, and may provide one or more commands, API calls, or interface elements allowing a user or process to store, manage, and retrieve data. In one embodiment, associative storage client process 122 may cause item management system interface elements to be displayed to a user as discussed at least with reference to FIG. 3, et al. below.

In an illustrative embodiment, client computing device 102 includes necessary hardware and software components for establishing communications over communication network 104, such as a wide area network (e.g. the Internet), or local area network (e.g. an intranet). For example, client computing device 102 may establish communications over communication network 104 through I/O manager 118 or any other combination of networking equipment or software.

Computing environment 100 may further include one or more network storage providers 106 and 108 in communication with client computing device 102 over communication network 104. Illustratively, network storage providers 106 and 108 may each correspond to a logical association of one or more computing devices or storage modules for the storage of digital data. Illustratively, network storage providers 106 and 108 may each be associated with a single user, organization, or entity, or may be associated with any combination of one or more users, organizations, or entities. Illustratively, network storage providers 106 and 108 may correspond to cloud-based document storage providers, cloud-based database or record storage providers, software-as-a-service data storage solutions, enterprise storage solutions, remote storage modules or devices, networked computing devices, or any other kind of system capable of storing digital data. As a specific example, network storage provider 106 may correspond to a cloud-based document storage provider, and network storage provider 108 may correspond to an organizational file server accessible over communications network 104.

With continued reference to FIG. 1, computing environment 100 can further include one or more association management provider 132 in communication with client computing device 102 over communication network 104. In one embodiment, association management provider 132 may correspond to a logical association of one or more computing devices associated with an association management service provider. Specifically, association management provider 132 illustrated in FIG. 1 may comprise some combination of hardware or software configured to implement associative storage manager 110 for the management of data and metadata associated with one or more items or system data objects managed by an item management storage system (e.g. items, tags instances, tag phrases, tag categories, or other item metadata or system data object data). For example, associative storage manager 110 may provide API calls, commands, or other services allowing for the storage, management, and retrieval of metadata, system data objects, or items. In one embodiment, association management provider 132 or associative storage manager 110 may include or be associated with one or more storage devices, providers, or solutions for the storage of items, system data objects, or other data. For example, association management provider 132 may be associated with a metadata repository such as a database for storing system data objects as database records, or a storage system for storing item data.

With reference to FIG. 1, computing environment 100 may include one or more metadata repositories (not shown) on any combination of storage devices. In one embodiment, association management provider 132 or associative storage manager 110 may provide one or more metadata repository for the storage of metadata. In additional embodiments, one or more metadata repository may be provided by or on any other storage provider, system, or device, such as computing device 102, storage device 130, external storage solution 128, network storage providers 106 and 108, or any other storage solution. In some embodiments, one or more metadata repositories may be split between storage devices, providers, or solutions. In one embodiment, item data may be stored with metadata within a metadata repository or other storage solution. In another embodiment, elements of metadata or other system data objects may be appended, prepended, or otherwise combined with item data stored in one or more storage solutions.

Illustratively, associative storage manager 110 may manage the storage, organization, and retrieval of items from or on any combination of one or more storage solutions, including but not limited to network storage providers 106 and 108, storage device 130 or other storage associated with client computing device 102, external storage device 128, storage associated with association management provider 132, or any other storage solution. Associative storage manager 110 may further manage the storage, organization, and retrieval of data and metadata associated with one or more items or system data objects. For example, associative storage manager 110 may manage the encryption/compression and storage of a data item on a combination of storage devices as discussed above, and may further manage the storage or recording of metadata and system data objects (e.g. tag instance data, tag category data, tag attribute data, permission data, encryption settings keys, storage locations, compression settings, or any other system data object, data, or metadata) associated with the data item in one or more metadata repositories. As a further example, associative storage manager 110 may manage the search, encryption/decryption, data translation, and retrieval of a data item from one or more storage devices based upon or utilizing stored metadata associated with the data item.

In one embodiment, associative storage manager 110 may manage the storage, organization, and retrieval of various system data objects or other data related to the functionality of an associated item management system. For example, associative storage manager 110 may manage information associated with one or more item management system users, preferences, functionalities, configurations, storage locations and settings, tag attributes, display parameters or settings, icons or interface data, permission settings, communication parameters, etc.

In one embodiment, one or more aspects or functionalities of associative storage manager 110 may be provided by, implemented on, or included on computing device 102 in addition to or instead of association management provider 132. For example, a process may run on computing device 102 that implements one or more aspects of associative storage manager 110. In further embodiments, functionalities or aspects of associative storage manager 110 may be provided by, implemented on, or included within various other devices, providers, or systems, such as network storage providers 106 and 108 or other entity.

In one embodiment, associative storage manager 110 may communicate with associative storage client process 122 through a combination of hardware or software associated with association management provider 132, communication network 104, client computing device 102, or other system, device, or entity. In one embodiment, aspects of associative storage manager 110 and associative storage client process 122 may be implemented by or associated with the same software or hardware process. In another embodiment, associative storage manager 110 may cause or manage the storage, organization, and retrieval of items or metadata responsive to or in conjunction with commands or calls caused by associative storage client process 122.

As a specific example, elements of hardware or software associated with client computing device 102 (e.g. associative storage client process 122) may cause one or more elements of an item management interface to be displayed to a user, and may cause one or more call or command to be communicated to associative storage manager 110 based on user interaction.

Illustratively, calls or commands communicated to or by associative storage manager 110 may include, but are not limited to: instruction data associated with the management or functioning of an item management storage system; instruction data corresponding to the storage, retrieval, compression, encryption, or modification of one or more items, tag instances, or other system data objects; instruction data corresponding to the modification or management of any of the components, devices, or entities included in computing environment 100, such as associative storage manager 110, associative storage client process 122, client computing device 102, etc.; or any other command, API call, or instruction.

Calls or commands communicated to or by associative storage manager 110 may further include various data or references to data including, but not limited to, item data, tag instance data, system data object data, or any other data such as associated with one or more items, tag instances, system data objects, devices, systems, storage locations, metadata repositories, or entities. As a specific example, a storage call or command may include item data or references to item data as well as one or more storage locations or parameters for storing item data, including, but not limited to: access or location information associated with one or more storage devices, solutions, or providers; encryption or compression information; versioning information; or any other information associated with the location or storage of an item. As a further example, a storage call or command may include metadata or references to metadata associated with an item (e.g. tag instance data, etc.) as well as storage locations or parameters for storing metadata, including, but not limited to, access or location information associated with one or more metadata repositories, metadata encryption or compression information, metadata formatting information, data storage structure or schema data, etc.

In one embodiment, user interaction with elements of a user interface provided through client computing device 102 may be the basis for calls or commands communicated to associative storage manager 110. In further embodiments, one or more automated sequences or processes may cause calls or commands to be communicated to associative storage manager 110; sequences or processes may include, but are not limited to, hardware or software processes associated with client computing device 102 (e.g. client processes 124 and 126), processes associated with network storage providers 106 and 108, processes associated with association management provider 132 or associative storage manager 110, or processes or commands associated with any other entity.

As an example, in one embodiment associative storage manager 110 may cause an item to be stored responsive to one or more interactions, calls, or commands. Illustratively, associative storage manager 110 may retrieve or store item data directly, or may cause item data to be stored on or through one or more storage devices, systems, or solutions, such as network storage providers 106 and 108, storage device 130, external storage device 128, or any other storage device, system, or solution. Associative storage manager 110 may cause multiple copies of item data to be stored, may cause item data to be stored in one or more formats (including encrypted or compressed formats), may salt or concatenate item data, or may split item data between one or more storage devices, systems, or solutions. Illustratively, associative storage manager 110 may cause any number of copies or pieces of item data to be stored according to any combination of different storage parameters. For example, associative storage manager 110 may cause a first copy of item data to be encrypted with a 16 bit salt and stored in a big-endian format with a cloud storage provider (e.g. network storage provider 106), and may cause a second copy of item data to be stored in a little-endian unencrypted format on a storage device 130 associated with a client computing device 102.

In one embodiment, associative storage manager 110 may additionally or alternately cause metadata associated with one or more items (or system data objects) to be stored responsive to one or more interactions, calls, or commands. Illustratively, metadata associated with an item or system data object may comprise tag instances or any kind of other information, including, but not limited to, tag attribute data, tag categories, typed or untyped tag phrases, tag phrase attribute data, data format or size information, display data, permission data, information about a storage, compression, or encryption format, encryption keys, creation and modification dates, permission data, creation and modification histories, creator or modifier system ids, or any other system data object or other information associated with or describing an item, associated tag instance, or system data object. Associative storage manager 110 may cause multiple copies of metadata to be stored, may cause metadata to be stored in one or more formats (including encrypted or compressed formats), may salt or concatenate metadata, and may split metadata or metadata records between any combination of metadata repositories on any combination of storage devices, systems, or solutions. Illustratively, associative storage manager 110 may cause any number of copies, records, or pieces of metadata to be stored according to any combination of different storage parameters. For example, associative storage manager 110 may store a first copy of a set of tag instances associated with an item to a metadata repository consisting of a distributed SQL database provided by network storage provider 106, and a second copy of a set of tag instances associated with the item to a metadata repository consisting of an encrypted header appended to the item data itself.

In one embodiment, associative storage manager 110 may cause items, system data objects, or associated metadata to be modified responsive to one or more interactions, calls, or commands. Illustratively, modification of metadata may comprise adding, removing, overwriting, or otherwise modifying existing data or metadata, including, but not limited to, partial or complete changes in format, content, location, storage parameters, encryption or compression, versioning, permissions, organization, etc. In one embodiment, an item management system may be configured to overwrite instances of existing item data with modified item data. In further embodiments, an item management system may be configured to preserve instances of existing item data and store modified item data without overwriting existing data. Illustratively, an item management system may determine whether to overwrite or preserve existing data based at least on versioning metadata or other settings information associated with an item or tag instance.

In one embodiment, responsive to one or more interactions, calls, or commands, associative storage manager 110 may cause the modification, addition, or removal of settings or preferences associated with associative storage manager 110, associative storage client process 122, or any other device, process, or element associated with an item management system. Illustratively, settings or preferences associated with elements of an item management system may include, but are not limited to, definitions and sets of tag categories or tag phrases, settings or preferences associated with tag categories or tag phrases, organization, behavior, or display properties of tag categories, tag phrases, tag elements, or other interface elements, settings or preferences governing item management system behavior (e.g. search, store, metadata modification, user settings and preferences, messaging, etc.), user and group definitions and attributes, item definitions, data formats, network settings, or any other preference or setting associated with the functioning, configuration, or behavior of an item management system.

In one embodiment, associative storage manager 110 may cause a search for an item (or system data object) responsive to one or more interactions, calls, or commands. Illustratively, a search for an item may be based on one or more tags instances or other associated data such as tag categories, tag phrases, search terms, keywords, parameters, etc. In one embodiment, associative storage manager 110 may cause a set of search results to be provided to a user (e.g. presented by client computing device 102) based on the results of a search. For example, associative storage manager 110 may perform a search based on one or more tag instances or tag elements specified by a user, and may return a list of search results corresponding to one or more stored items. Search results may include one or more elements of information or data associated with a stored item or system data object, including, but not limited to, item names, sizes, creators, editors, creation or modification dates, statuses, types, formats, tags, locations, versions, visual indicia, item previews or data, or any other combination of metadata or data associated with the item. Illustratively, search results may be displayed in any format or configuration.

Illustratively, although a number of functionalities and illustrative calls and commands associated with associative storage manager 110 are discussed above, any specific calls, commands, and functionalities are included for the purpose of example only. In various embodiments, elements of an item management system may support any number of different calls, commands, and functionalities associated with embodiments, behavior, or functionality described or suggested herein or known in the relevant art.

Illustratively, all specific components, systems, devices, and elements discussed herein with reference to FIG. 1 are included for purpose of example; embodiments of item management systems may include or omit any number or combination of components, systems, devices, or elements as depicted or discussed with reference to computing environment 100, and may include any number or configuration of additional or alternate computing devices, components, or elements as known in the relevant art. Additionally, aspects or functionalities herein ascribed to one or more components, devices or elements included in illustrative computing environment 100 may be split between, distributed between, or performed by any combination of different components, systems, devices, or elements in addition to or as an alternative to specific components, systems, devices, or elements herein described.

Figure 2:
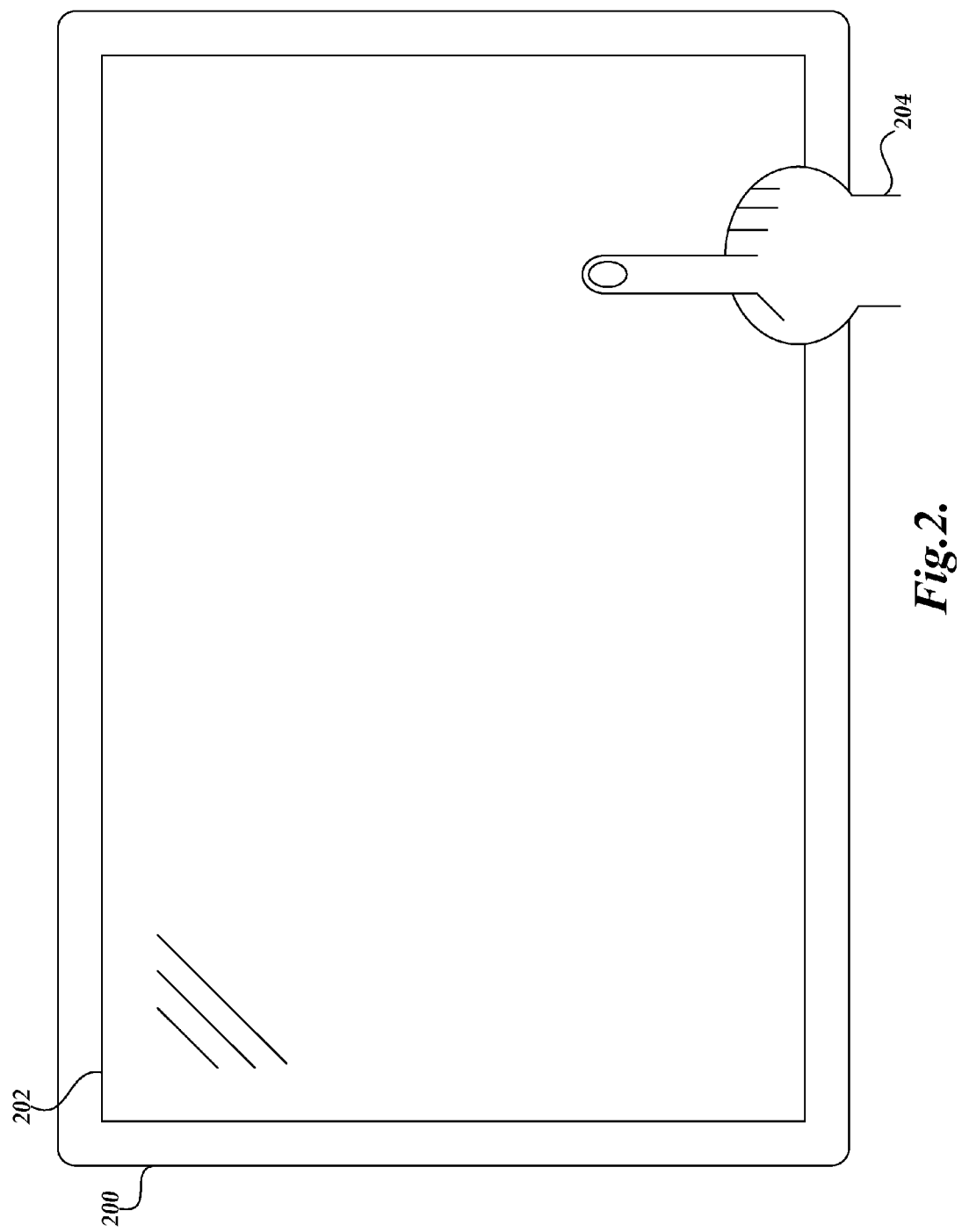
FIG. 2 is a device diagram depicting an illustrative embodiment of a tablet computing device.

FIG. 2 is a device diagram depicting an illustrative embodiment of a tablet computing device 200. Illustratively, tablet computing device 200 may include, implement, or be associated with any number or type of processors, memories, hardware, software, or other processes or devices. In one embodiment, tablet computing device 200 may correspond to illustrative client computing device 102 discussed with reference to FIG. 1. In further embodiments, tablet computing device 200 may include, implement, or be associated with one or more elements, interfaces, processes, systems, hardware, software, entities, or devices discussed with reference to illustrative computing environment 100 discussed with reference to FIG. 1.

In one embodiment, tablet computing device 200 may include a touchscreen interface 202. Touchscreen interface 202 may consist of a combination display and input device allowing a user finger 204 to interact with tablet computing device 200 through one or more interface elements displayed on touchscreen interface 202. In various embodiments, touchscreen interface 202 may allow input by any number of fingers, body parts, styluses, pens, or other input devices. In various embodiments, touchscreen interface 202 may support any combination of gestures, motions, or other interactions. Illustratively, tablet computing device 200 may support any number of additional inputs or peripherals, such as displays, mice, trackballs, keyboards, trackpads, drawing tablets, etc. In various embodiments, interfaces, routines, interactions, or aspects described with regards to tablet computing device 200 may be implemented, performed, or displayed on or in association with any number of alternate or additional computing or client interfaces as known in the art.

Figure 3:
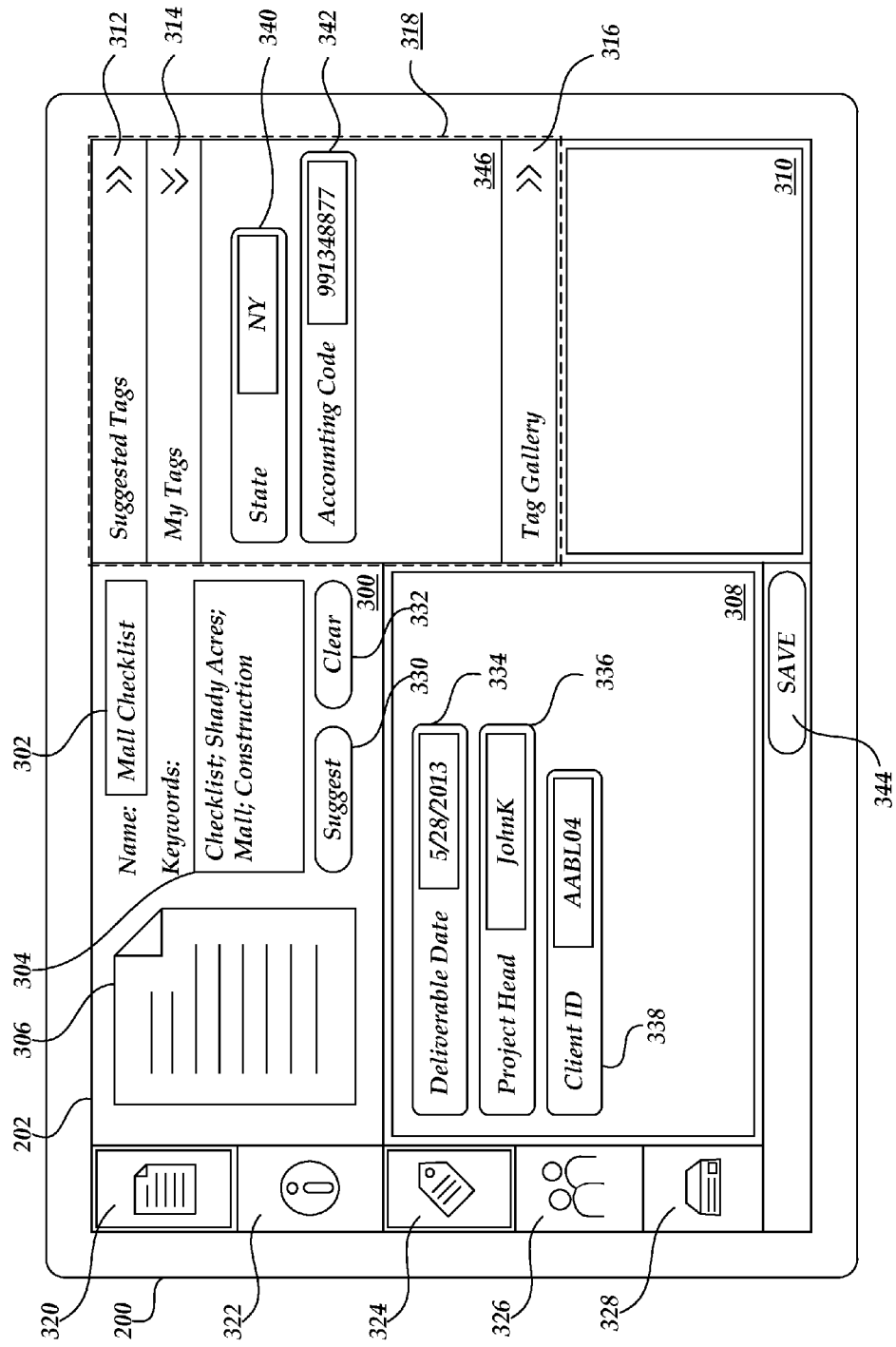
FIG. 3 is a device diagram depicting an illustrative embodiment of an item management system storage interface.

FIG. 3 is a device diagram depicting an illustrative embodiment of an item management system storage interface displayed on tablet computing device 200. In various embodiments, an item management system storage interface may allow or facilitate the storage or tagging of one or more items (or system data objects) through user interaction with one or more item management system interface elements.

Illustratively, an item management system storage interface may include item information panel 300 for displaying information and data associated with a selected item. For example, item information panel 300 may include an item name field 302 for displaying and modifying a name associated with a selected item. Item information panel 300 may further include an item keyword field 304 for displaying, adding, removing, and modifying keywords associated with a selected item. Illustratively, keywords may comprise elements of text metadata or simple tag phrases associable with an item; for example, keywords may consist of text formatted tag phrases without corresponding tag categories or may consist of tag phrases with a general or system-defined tag category (e.g. a "keyword" tag category). In one embodiment, a keyword may not be displayed with a tag category label. In a further embodiment, a keyword may have any number of display characteristics differentiating it from other tag elements. Item information panel 300 may further include an item preview 306 showing a preview of a selected item (e.g. one or more element of data comprising or associated with a selected item). Item information panel 300 may include one or more button interface elements, such as suggestion button 330 and clear button 332. In one embodiment, user interaction with suggestion button 330 may cause an item management system to perform one or more processing steps on a selected item in order to determine likely keywords to associate with the selected item. Illustratively, likely keywords may be added to or may replace any keywords extant within item keyword field 304. In one embodiment, clear button 332 may cause an item management system to clear all keywords from keyword field 304.

Illustratively, item information panel 300 may further be associated with one or more button interface elements such as item preview button 320 and item information button 322. In one embodiment, user interaction with item preview button 320 and item information button 322 may cause item information panel 300 to switch between display of an item preview 306 and other elements of item information respectively. For example, pushing or clicking item information button 322 may cause item information panel 300 to hide item preview 306 and display tag elements or other metadata corresponding to one or more characteristics or attributes of a selected item. An illustrative embodiment of a tablet computing device displaying elements of item information in item information panel 300 is discussed below at least with reference to FIG. 24.

An item management system storage interface may further include tagging interface panel 308. In one embodiment, tagging interface panel 308 may hold one or more tag elements. In one embodiment, a user may drag and drop or otherwise move tag elements from other interface panels, libraries, or repositories to tagging interface panel 308. As illustrated in FIG. 3, tagging interface panel 308 may hold tag elements such as deliverable date tag element 334, project head tag element 336, and client id tag element 338. Illustratively, and as described elsewhere in this specification, a tag element may correspond to a tag instance, and may be associated with metadata such as one or more tag categories or tag phrases. For example, deliverable date tag element 334 as illustrated in FIG. 3 may correspond to a tag category named "Deliverable Date" and a tag phrase comprising a date "5/28/2013." In one embodiment, an item management system storage interface may include an item save button 344, which may cause data associated with a selected item (e.g. an item corresponding to item preview 306) and any associated metadata (e.g. tag elements metadata within tagging interface panel 308, keywords within item keyword field 304, an item name within item name field 302, or other item information) to be stored responsive to a user interaction. Illustratively, as described at least with reference to FIG. 1, metadata and item data may be stored in any combination of metadata repositories or storage solutions. Illustratively, items or metadata may be saved or stored automatically, responsive to user interaction or modification of elements within an item management system storage interface, responsive to user interaction with a save or store command (e.g. item save button 344), or according to any other schedule or process.

An item management system storage interface may additionally include a tag library panel 318 for managing tag elements. In one embodiment, tag library panel 318 may display one or more representations of tag elements corresponding to tag categories extant in the system that a user has permission to view. In one embodiment, tag library panel 318 may be configured by an item management system user, installer, administrator, creator, or other entity to include one or more interface panels, areas, or logical categories for the storage and management of tag elements. For example, and as illustrated in FIG. 3, tag library panel 318 may include collapsible interface elements such as suggested tags header 312, my tags header 314, and tag gallery header 316. In one embodiment, a collapsible interface element may be expanded to display an interface panel for the storage and management of tag elements. For example, and as illustrated in FIG. 3, my tags header 314 may expand to display my tags panel 346 containing state tag element 340 and accounting code tag element 342. Illustratively, tag library panel 318 may include any number of sections such as panes, areas, collapsible headers, lists, or other interface elements, and may contain any number of different tag elements; for example, in one embodiment, tag library panel 318 might contain interface areas configured by a system user and titled "Music Tags" and "Work." In the context of this example, the "Music Tags" area might contain tag elements corresponding to tag categories such as "Band Name," "Genre," "Era," etc. To continue this example, the "Work" areas might contain tag elements corresponding to tag categories such as "Project ID," "Customer ID," "Accounting Code," etc. In one embodiment, tag library panel 318 may additionally or alternately contain search features allowing a user to search for a particular tag element (e.g. a search for a tag element with a particular tag category, tag phrase, tag attribute, etc.). In various embodiments, tag library panel 318 may display tag instance metadata or tag elements in any form or configuration as known in the art, including, but not limited to, one or more vertical or horizontal list view, tree view, preview flow view, icon view, collapsible panel view, or other visual layout or view.

An item management system storage interface may additionally include a tag scratch panel 310 for temporarily holding tag elements during a tagging, storage, or search process. For example, an item management system user may be able to drag and drop or otherwise move one or more tag elements to tag scratch panel 310. Illustratively, tag elements moved to tag scratch panel 310 may have no effect on the tagging and storage process. For example, moving tag elements to tag scratch panel 310 may allow a user to place tag elements in an out-of-the way location while selecting, moving, organizing, or managing tag elements during the tagging, storage, or search process. In one embodiment, tag elements dragged to tag scratch panel 310 may persist within tag scratch panel 310 until they are removed from the panel or dragged elsewhere. For example, tag scratch panel 310 may save the state of tag elements contained therein, and may cause tag elements within tag scratch panel 310 to persist between instances, sessions, or usages of a tag management system interface. Illustratively, tag element state data may be saved locally on tablet computing device 200, or on a remote device or storage solution. In another embodiment, tag scratch panel 310 may not save the state of tag elements contained therein, and may cause tag elements contained within tag scratch panel 310 to persist only within a given instance, session, or usage of a tag management system Still further, an item management system storage interface may include one or more button interface elements such as tagging button 324, permissions button 326, and storage settings button 328 for selecting a mode of tagging. In one embodiment, selecting tagging button 324 may cause tagging interface panel 308 to display tag elements relating to tag categories, tag phrases, and other metadata associated with categorizations or organizational attributes of a selected item (e.g. client ID tag element 338, project head tag element 336, etc.). Further, in one embodiment, selecting permissions button 326 may cause tagging interface panel 308 to display tag elements, settings, or other interface elements associated with user or system permissions for a selected item. Still further, in one embodiment, selecting storage settings button 328 may cause tagging interface panel 308 to display tag elements, settings, or other interface elements associated with storage settings or locations for a selected item. Illustratively, a change to tag elements, settings, or interface elements displayed in tagging interface panel 308 may cause an associated change in the tag elements, organizational scheme, or interface elements displayed in tag library panel 318 or other interface panels or element. For example, selecting storage settings button 328 may cause one or more of tagging interface panel 308, tag library panel 318, or tag scratch panel 310 to display tag elements associated with storage locations and settings instead of (or in addition to) tag elements associated with item categorizations or metadata (e.g. state tag element 340, accounting code tag element 342, etc.).

Illustratively, specific interface elements discussed here with reference to FIG. 3 are included for the purpose of example, and represent one possible configuration or embodiment of an item management system interface or item management system storage interface. In other configurations or embodiments, an item management system interface may include any number of additional or alternate interface elements in any possible design or configuration. For example, an item management system interface may, without limitation, include interface elements such as text, images, icons, virtual or physical buttons, pull-down menus, radio buttons, check boxes, selectable lists, etc. In various embodiments, any of the functionality or attributes discussed herein with reference to specific components, interface elements, or configurations may be performed by, implemented by, or applied to any combination of elements or components. Embodiments of tag elements discussed and depicted herein with reference to FIG. 3, et al. are provided for the purpose of illustration only; in various embodiments, tag elements may be associated with any number of tag categories, tag phrases, or other system data objects, properties, attributes, or metadata; tag elements may implement or include any number of different styles or visual appearances, and may include or be associated with any combination of different visual indicia or data. In various embodiments, styles or visual appearances may further include or be associated with functional or behavioral aspects, or non-visual or non-static display attributes such as sounds, animations, effects, etc.

Figure 4:
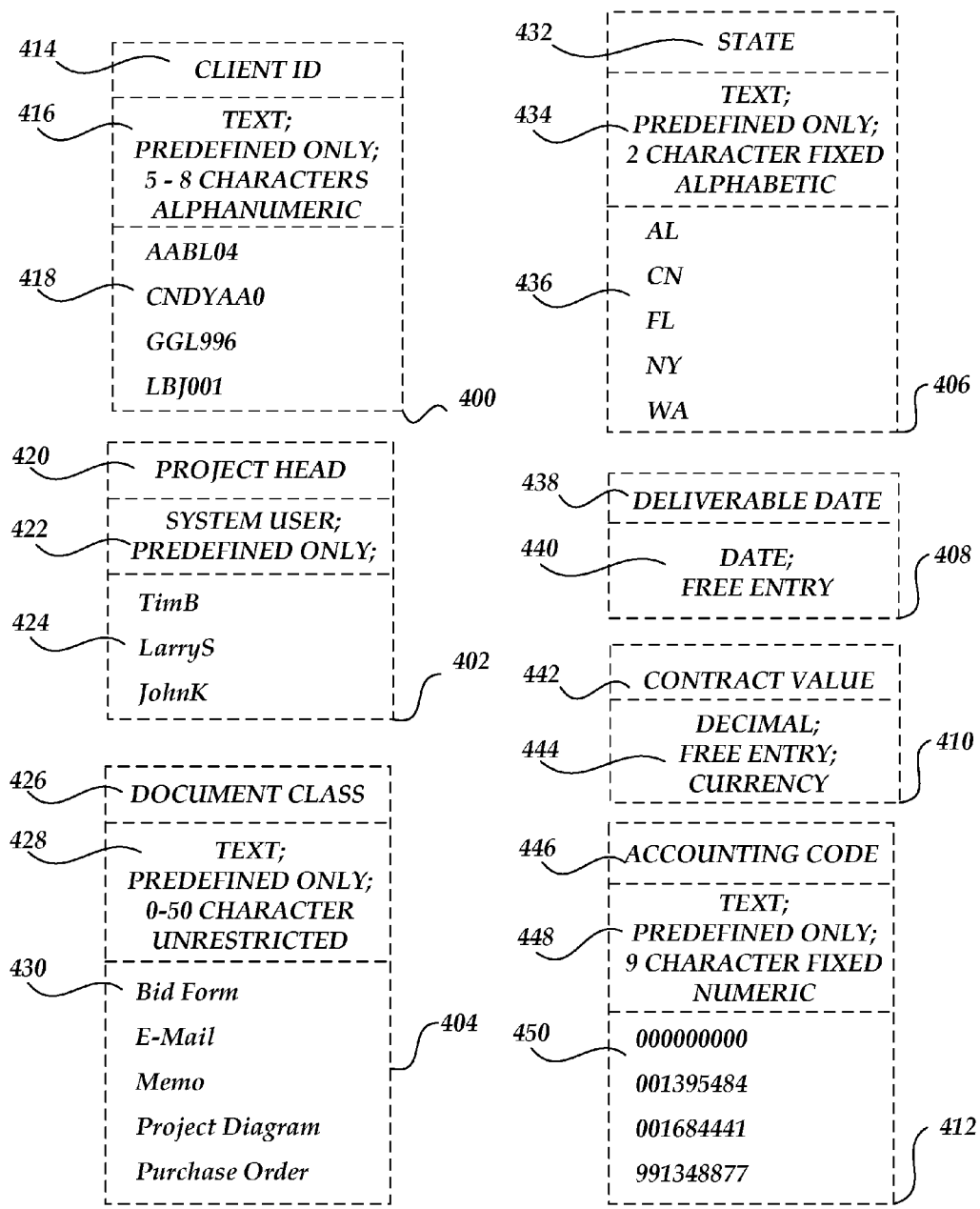
FIG. 4 is a data diagram depicting an illustrative embodiment of tag category data and tag attribute.

FIG. 4 is a data diagram depicting an illustrative embodiment of tag category data and tag attribute data in the context of an item management system. Illustratively, and as discussed herein, a tag category may be associated with tag attribute data that may define or suggest attributes or properties of one or more associated tag instances or elements. Illustratively, data described or depicted with respect to FIG. 4 may be stored together in one or more metadata repository or item management system storage location or solution, may be referenced by one or more elements or pointers, or may be logically associated in any other way. Although data elements such as tag attributes and tag phrase collections are described with reference to FIG. 4 as associated with one or more tag categories, any of various data elements discussed here may logically correspond to one or more item, tag instance, tag element, tag phrase, or other system data object instead of or in addition to a tag category.

To continue with illustrative FIG. 4, an item management system may include client id metadata 400 comprising client id tag category 414, client id tag attributes 416, and client id tag phrase collection 418. In one embodiment, client id tag category 414 may indicate or be interpreted to indicate that associated tag instances denote or are logically associated with at least a client identification code. Further, in one embodiment, client id tag attributes 416 may comprise one or more tag attributes that may indicate or be interpreted to indicate that associated tag phrases may be: interpreted or displayed in a text format; be predefined only (e.g. allow no entry of new tag phrases by a user); and be constrained to 5-8 characters in an alphanumeric character set. In one embodiment, client id tag phrase collection 418 may include one or more predefined tag phrases potentially associable with one or more tag instances (e.g. tag instances based on client id tag category 414). Illustratively, in various alternate configurations and embodiments, client id metadata 400 may contain, specify, or be associated with any number of additional or alternate tag attributes associated with any combination of tag instance, tag phrase, tag category, tag element, item, or other system data object.

Although metadata elements discussed with reference to FIG. 4 are shown in a text format, this format is for purposes of illustration only. In various embodiments, various elements of metadata (e.g. tag categories, tag phrases, tag attributes, etc.) may be stored, processed, or displayed in any data format. For example, client id tag category 414 may comprise text "CLIENT ID"; however, in another embodiment, one or more tag categories may be defined by numerical id codes, binary id codes, hexadecimal id codes, or any other format. As a specific example, in one embodiment client id tag category 414 might be represented, referenced, or stored as a machine readable hexadecimal code "0x0a99d611a." In one embodiment, a machine readable code used to represent a pointer or data in an item management system may be associated with any combination of display name or indicia such as a natural language name, description, icon, color, picture, etc. In various embodiments any metadata element, including but not limited to a tag category, tag attribute, tag phrase, or other data object, may be encoded in any format or according to any schema or configuration, and may be associated with any combination of display values (e.g. a natural language name, icon, etc.) regardless of an internal encoding.

Although FIG. 4 illustratively shows tag attributes (e.g. client id tag attributes 416) as potentially comprising multiple logical metadata elements or tag attributes (e.g. "TEXT," "PREDEFINED ONLY," "5-8 CHARACTERS ALPHANUMERIC," etc.), this representation and grouping is for the purpose of clarity and illustration only; in one or more embodiments, various logical metadata elements may be stored or presented in any encoding or format and may be combined or separated into any logical grouping.

To continue our discussion of illustrative FIG. 4, an item management system may include project head metadata 402 comprising project head tag category 420, project head tag attributes 422, and project head tag phrase collection 424. In one embodiment, project head tag category 420 may indicate or be interpreted to indicate that associated tag instances denote or are logically associated with at least the name or id of a project head or lead. Further, in one embodiment, project head tag attributes 422 may comprise one or more tag attributes that may indicate or be interpreted to indicate that associated tag phrases may be interpreted as and limited to ids of item management system users, and be predefined only (e.g. allow no entry of new tag phrases by a user). In other embodiments, user ids may be based on sets of enterprise e-mail system users, operating system users, or other system users in addition to or instead of item management system users. In one embodiment, project head tag phrase collection 424 may include one or more predefined tag phrases potentially associable with one or more tag instances (e.g. tag instances based on project head tag category 420).

An item management system may further include document class metadata 404 comprising document class tag category 426, document class tag attributes 428, and document class tag phrase collection 430. In one embodiment, document class tag category 426 may indicate or be interpreted to indicate that associated tag instances denote or are logically associated with at least a logical or organizational class of document Further, in one embodiment, document class tag attributes 428 may comprise one or more tag attributes that may indicate or be interpreted to indicate that associated tag phrases may: be interpreted as and limited to text formatted phrases; be predefined only (e.g. allow no entry of new tag phrases by a user); and be limited to between zero and fifty of any characters in a standard character set (e.g. ASCII). In one embodiment, document class tag phrase collection 430 may include one or more predefined tag phrases potentially associable with one or more tag instances (e.g. tag instances based on document class tag category 426).

An item management system may further include state metadata 406 comprising state tag category 432, state tag attributes 434, and state tag phrase collection 436. In one embodiment, state tag category 432 may indicate or be interpreted to indicate that associated tag instances denote or are logically associated with at least a state identifier. Further, in one embodiment, state tag attributes 434 may comprise one or more tag attributes that may indicate or be interpreted to indicate that associated tag phrases may be: interpreted as and limited to text formatted phrases; be predefined only (e.g. allow no entry of new tag phrases by a user); and be limited to two alphabetic characters. In one embodiment, state tag phrase collection 436 may include one or more predefined tag phrases potentially associable with one or more tag instances (e.g. tag instances based on state tag category 432).

An item management system may further include deliverable date metadata 408 comprising deliverable date tag category 438 and deliverable date tag attributes 440. In one embodiment, deliverable date tag category 438 may indicate or be interpreted to indicate that associated tag instances denote or are logically associated with at least a deliverable date for a product or service. Further, in one embodiment, deliverable date tag attributes 440 may comprise one or more tag attributes that may indicate or be interpreted to indicate that associated tag phrases may be interpreted and formatted as date values and unrestricted to predefined tag phrase values (e.g. an associated tag element may allow entry of any date by a user, and not limit an entry to a previously defined or entered tag phrase values). Although no tag phrase collection associated with deliverable date metadata 408 is depicted in illustrative FIG. 4, in one embodiment deliverable date metadata 408 or deliverable date tag category 438 may be associated with a tag phrase collection. Illustratively, although a tag element based on deliverable date tag category 438 may allow free entry of new tag phrase dates, said tag element may additionally or alternately suggest tag phrase dates to a system user based on elements or attributes of a selected item or based on a tag phrase collection associated with deliverable date metadata 408. For example, newly entered tag phrase dates may be included in a tag phrase collection associated with deliverable date tag category 438, and associated tag elements may suggest tag phrases to a user based on said tag phrase collection.

An item management system may further include contract value metadata 410 comprising contract value tag category 442, and contract value tag attributes 444. In one embodiment, contract value tag category 442 may indicate or be interpreted to indicate that associated tag instances denote or are logically associated with at least a value of a contract for a good or service. Further, in one embodiment, contract value tag attributes 444 may comprise one or more tag attributes that may indicate or be interpreted to indicate that associated tag phrases may: be interpreted as and limited to decimal values; allow free entry of tag phrase values; and be displayed in a currency formatting. As discussed above, although no tag phrase collection is depicted with respect to contract value metadata 410 in illustrative FIG. 4, contract value tag category 442 or contract value metadata 410 may be associated with a tag phrase collection in one or more embodiments.

An item management system may further include accounting code metadata 412 comprising accounting code tag category 446, accounting code tag attributes 448, and accounting code tag phrase collection 450. In one embodiment, accounting code tag category 446 may indicate or be interpreted to indicate that associated tag instances denote or are logically associated with at least an organizational accounting code. Further, in one embodiment, accounting code tag attributes 448 may comprise one or more tag attributes that may indicate or be interpreted to indicate that associated tag phrases may: be interpreted as and limited to text formatted phrases; be predefined only (e.g. allow no entry of new tag phrases by a user); and be limited to nine numeric characters. In one embodiment, accounting code tag phrase collection 450 may include one or more predefined tag phrases potentially associable with one or more tag instances (e.g. tag instances based on accounting code tag category 446).

It should be understood that the metadata discussed herein with respect to illustrative FIG. 4 are presented for the purpose of illustration only, and an item management system may be configured or implemented to include any combination or variety of metadata in addition or instead of the metadata discussed herein. In various embodiments of an item management system, any number of tag categories may combine, include, reference or be otherwise associated with any number of different tag attributes, tag phrases, tag phrase collections, settings, parameters, or other data or metadata. For example, data included or associated with a tag category may include one or more tag attributes defining various display or functional properties affecting a tag element or other item management system interface component.

Figure 5:
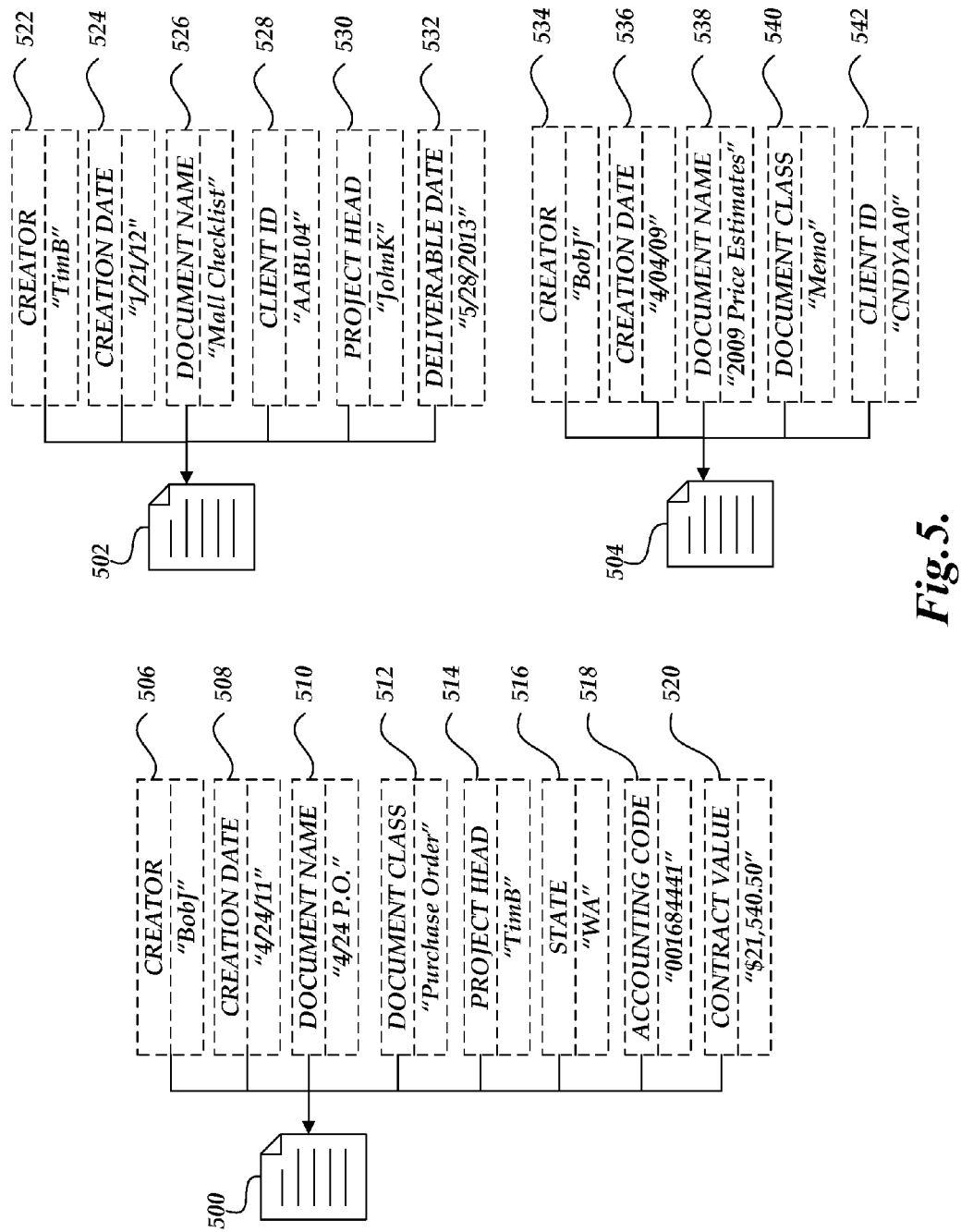
FIG. 5 is a data diagram depicting an illustrative embodiment of item data and associated tag instance data.

FIG. 5 is a data diagram depicting an illustrative embodiment of item data and associated tag instance data in the context of an item management system. Illustratively, an item management system may include one or more items such as item A 500, item B 502, and item C 504. As discussed above, an item may include any type of data capable of being stored in an electronic medium. In various embodiments, an item management system may contain, manage, include, or be associated with any number of items or tag instances.

In one embodiment, an item may be associated with one or more tag instances. Illustratively, and as discussed above, a tag instance may include or be associated with one or more elements of metadata, such as a tag category and a selected tag phrase. In various embodiments, a tag instance may additionally or alternately include or be associated with any number and type of other metadata elements, including, but not limited to, tag attributes or other system data objects. In a further embodiment, a tag instance may include or be logically associated with any number or combination of metadata elements associated with other tag instances or tag categories.

With reference to illustrative FIG. 5, in one embodiment item 500 may be associated with a number of tag instances such as creator tag instance 506, creation date tag instance 508, document name tag instance 510, document class tag instance 512, project head tag instance 514, state tag instance 516, accounting code tag instance 518, and contract value tag instance 520. Item 502 may be associated with tag instances such as creator tag instance 522, creation date tag instance 524, document name tag instance 526, client id tag instance 528, project head tag instance 530, and deliverable date tag instance 532. Item 504 may be associated with tag instances such as creator tag instance 534, creation date tag instance 536, document name tag instance 538, document class tag instance 540, and client id tag instance 542. In one embodiment, each tag instance may be associated with at least a tag category and selected tag phrase. For example, creator tag instance 506 may include or be associated with the tag category "CREATOR" and the selected tag phrase "BobJ."

Although tag instances discussed above with reference to illustrative FIG. 5 are shown as including or being associated with a single tag category and selected tag phrase for the purpose of clarity, in various embodiments a tag instance may include, reference, or otherwise be associated with any number of metadata elements in addition or as an alternative to a tag category and a selected tag phrase. For example, a tag instance may include a tag category and multiple selected tag phrases corresponding to the tag category. In one embodiment, a tag instance may include or be associated with one or more tag attributes (not shown) associated with presentation of a tag element corresponding to the tag instance. For example, a tag instance may be associated with properties or visual characteristics including, but not limited to: a tag element width or height, a background color or image, a border style, font, a sound, an animation, a background color, a font color, a transparency style (e.g. a style when dragging a tag element), a layer blend style or algorithm, an image, an icon, or any other visual style, display property, or attribute.

In one embodiment, tag instance data may be associated with an item by a reference, record, or pointer stored in a metadata repository or storage solution. For example, multiple items may reference or be associated with a single logical copy of a tag instance. In other embodiments, tag instance data may additionally or alternately be stored with an item or may be associated with an item in any other way. Although metadata elements (e.g. tag categories, tag phrases, etc.) associated with a tag instance may be discussed with reference to illustrative FIG. 5 as being stored or represented in a human-readable format (e.g. "DOCUMENT CLASS"), one of skill in the relevant art will appreciate that metadata may be stored, referenced, or represented in any form or format (e.g. numerical id, binary data, pointer, reference, database entry, hexadecimal id, etc.).

In one embodiment, one or more tag instances may include or be associated with the same tag category or tag phrase. For example, client id tag instance 528 and client id tag instance 542 may both be associated with a "CLIENT ID" tag category. In one embodiment, a tag instance may logically include a copy of various associated metadata elements (e.g. client id tag instance 542 may logically include a copy of the data "CLIENT ID"). In other embodiments, a tag instance may reference or be otherwise logically associated with instances of metadata elements. For example, document class tag instance 512 and document class tag instance 540 may include or otherwise be associated with a reference to a "DOCUMENT CLASS" tag category such as document class tag category 426 discussed with reference to illustrative FIG. 4.

Figures 6, 7:
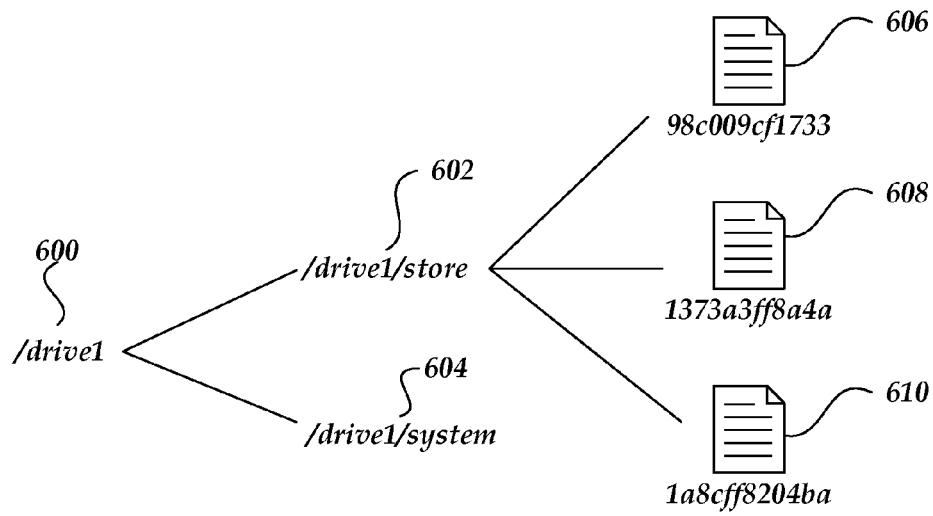
FIG. 6 is a data diagram depicting an illustrative embodiment of item data associated with an item management system.
FIG. 7 is a data diagram depicting an illustrative embodiment of metadata associated with an item management system.

FIG. 6 is a data diagram depicting an illustrative embodiment of item data associated with an item management system. Illustratively, item data may be stored on, with, or by a storage solution corresponding to any storage solution or device, including, but not limited to, external storage solution 128, storage device 130, or network storage provider 106 or 108 as discussed at least with reference to illustrative FIG. 1 above.

In one embodiment, a storage solution may implement a directory based file system. Illustratively, a storage solution may include a drive root directory 600 corresponding to the base level of a storage device. A storage solution may further include any number of other directories such as a store directory 602 and a system directory 604. In one embodiment, an item management file system may be configured to store item data associated with the system in store directory 602, such as item 606, 608, and 610. In one embodiment, item files 606, 608, and 610 may correspond to item 500, item 502, and item 504 respectively with regards to FIG. 5 above. One with experience in the relevant art will appreciate that although item data are represented as files with respect to illustrative FIG. 6, item data may be stored in any format or form. For example, non-file based data such as database records, e-mails, contact data, etc. may be stored and represented as file data within the context of a directory based file system. As another example, item data may be stored or represented as records within an associative or non-associative database. In one embodiment, multiple logical items may be concatenated or otherwise stored together in a single file. In other embodiments, each logical item may be stored in a different file. Illustratively, item data may be concatenated, combined, compressed, encrypted, reformatted, or otherwise modified by an item management system as part of a storage, management, tagging, or retrieval process.

In one embodiment, an item management system may identify stored items by file name id. For example, an item management system may identify an item file 606 with a file name ID "98c009cf1733." In other embodiment, an item management system may identify stored items by any other reference or identifier, including, but not limited to, a database reference, a physical or logical memory location, a physical or logical drive or storage location, a uniform resource locator (URL), a directory or network path, an IP address, or any other form of data reference as known in the art. Although illustrative FIG. 6 shows a directory based file system, it should be appreciated that an item management storage system may store item data in or on any combination of storage solutions, formats, or schemas, including, but not limited to, associative or non-associative databases, cloud storage repositories, directory file system (e.g. FAT, NFTS, UFS, MFS, etc.) or other file storage method, system, or solution as known in the art.

FIG. 7 is a data diagram depicting an illustrative embodiment of metadata associated with an item management system. In one embodiment, metadata may be stored in, with, or by a metadata repository comprising an associative database with columns including data id column 702, associative category column 704, and associative attribute column 706. Although an embodiment of an associative database is represented in FIG. 7 for purpose of illustration, a metadata repository may comprise any type or combination of structured or unstructured data storage system or format as discussed at least with reference to illustrative FIG. 1.

With respect to illustrative FIG. 7, various metadata may be related to a stored item by an item code or file name stored in data id column 702. In one embodiment, an item code or file name in data id column 702 may correspond to a file name ID with reference to item file 606, 608, and 610 discussed with respect to illustrative FIG. 6 above. In other embodiments, an item code or other identifying item information may correspond to a pointer, path, location, or other reference to one or more items stored with one or more storage solutions. In one embodiment, multiple items may be stored in a single logical file, record, or block of data. For example, an item code may include information corresponding to both a file or data location and a logical location within a file or block of data.

In one embodiment, a tag category identifier may be stored in associative category column 704. Illustratively, a tag category identifier may be human-readable (e.g. "STATE," etc.) or may consist of a pointer, a binary code, a database record identifier, or other reference.

In one embodiment, associative attribute column 706 may store a selected tag phrase corresponding to or associated with a tag category identifier stored in associative category column 704. Illustratively, associative attribute column 706 may store tag phrase data, or may store one or more references to tag phrase data stored in various other database tables or storage locations.

Returning to FIG. 7, and for the purpose of example, an item with identifier "98c009cf1733" may correspond to a tag instance with a "DOCUMENT CLASS" tag category and a "PURCHASE ORDER" selected tag phrase. An item with identifier "98c009cf1733" may further correspond to a tag instance with a "STATE" tag category and a "WA" selected tag phrase.

In various embodiments, a metadata repository may include any number of other or alternate databases, columns, or tables, as well as other storage locations, schemas, or formats in any configuration or combination. A metadata repository may further include any number of other metadata elements stored in one or more columns or locations (e.g. display values associated with one or more references or records, tag attributes, other system data objects, etc.).

Figure 8:
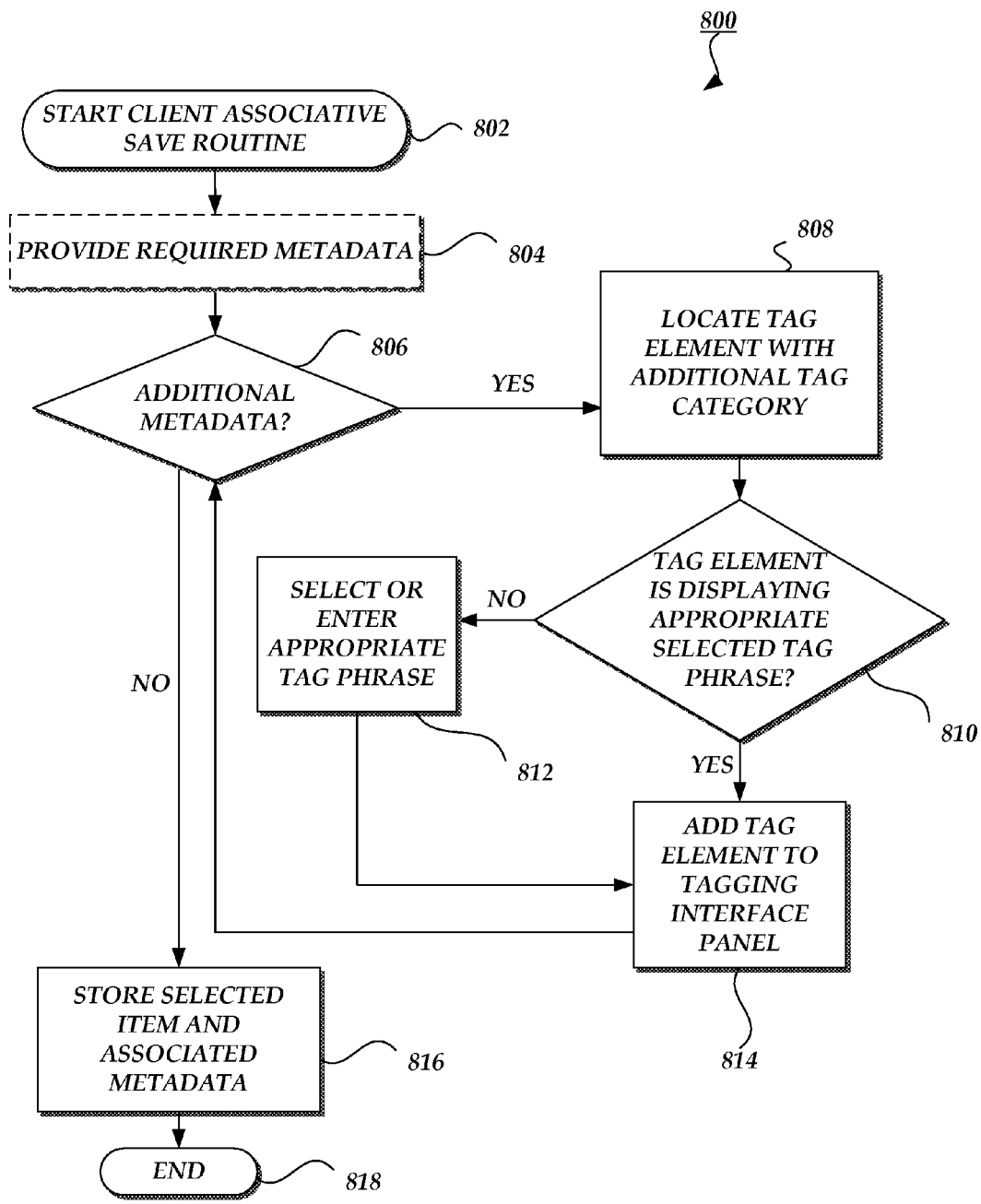
FIG. 8 is a flow diagram depicting an illustrative routine for tagging and storing an item with associated metadata.

FIG. 8 is a flow diagram depicting an illustrative routine 800 for tagging and storing an item with associated metadata. In one embodiment, routine 800 may be implemented or performed by a user interacting with an item management system storage interface such as that depicted at least with reference to illustrative FIG. 3, et al. In one embodiment, interface elements and routine blocks discussed with reference FIG. 8 may be implemented, displayed, or executed on a client computing device 102 with reference to illustrative FIG. 1 or tablet computing device 200 with reference to illustrative FIG. 2. In one embodiment, aspects or blocks of routine 800 may be performed by an automated or semi-automated process associated with a client computing device 102, association management provider 132, or associative storage manager 110. Aspects of routine 800 may be performed in response to specific interactions or commands by a user or process. In yet another embodiment, aspects of routine 800 may be implemented on a continuous basis. It will be appreciated by one skilled in the relevant art that various aspects or blocks of routine 800 may be performed concurrently, sequentially, or at different times and in response to different events or timings. For example, in various embodiments a user may select a tag phrase for a tag element after moving the tag element to a tagging interface panel, or may provide required metadata at any number of different points in the saving or tagging process.

Returning to FIG. 8, illustrative routine 800 may begin at block 802 responsive to a user or process selecting an item. Illustratively, an item may be manually selected by a user, or may be selected by any combination of one or more entities or processes. In one embodiment, an item may be selected with the involvement of one or more devices, interfaces, or local or remote processes, including, but not limited to, a third party software tool or application, a computer operating system or file system, an item management system itself, an automated process, or any other way known in the art. For example, in one embodiment a user of a personal computer or mobile device may select an item by dragging and dropping a representation of the item onto an icon associated with an item management system. As another example, a user may select an item consisting of a document by selecting a save or store command in an associated application. In one embodiment, illustrative routine may begin at block 802 responsive to selecting an item previously stored in an item management system. In another embodiment, illustrative routine 800 may begin responsive to entering a tagging context in an item management system interface context. For example, an item may have been previously selected and various associations, settings, and permissions may have been modified through a different interface or interface context; a user may enter a tagging interface context in order to add, remove, modify, or manage tag instances associated with the selected item.

It is important to note that although aspects of tagging or storage interactions discussed or described herein and with reference to FIG. 8 may refer to a single selected item, any embodiments or examples are understood to be for the purpose of clarity and illustration only, and are in no way intended to impose a limitation on a number of items that may be tagged with regard to one or more process, routine, method, or interaction. In one embodiment, illustrative routine 800 may begin responsive to a user or process selecting multiple items. In a further embodiment, tag instances associated with one item as part of a tagging or storage routine or interaction may be associated with each of multiple selected items. In a still further embodiment, a user may select one or more additional items at any time during routine 800. In a further embodiment, a user may select one or more system data objects in addition or as an alternative to any one or more items.

At optional block 804, a user or process provides any required metadata. Illustratively, an item management system may be configured to require one or more elements of metadata when storing an item. For example, an item management system may require that a user provides an item name before saving or storing the item. As a specific example, an item management system storage interface discussed with respect to illustrative FIG. 3 may require that a user enter a name into item name field 302 before storing an item. In one embodiment, an item management system may require that at least one tag instance be associated with the item, but may not require any specific metadata (e.g. a name).

At block 806, a user or process determines whether additional metadata should be associated with the selected item. Illustratively, additional metadata may comprise one or more tag instances or other metadata. In one embodiment, a user or process may determine whether additional metadata should be associated with the selected item at least based on whether additional tag elements or interface fields relate to the selected item or would have utility in the context of a future search for the item. For the purpose of an illustrative example, a user storing an e-mail may determine that adding a tag element with a "Document Class" tag category and "E-mail" tag phrase would simplify the retrieval of the E-mail item in the future.

If a user or process determines that additional metadata should be associated with the selected item, illustrative routine 800 moves to block 808. At block 808, a user or process locates a tag element with an appropriate tag category for the selected item. Illustratively, one or more tag elements may be displayed or locatable in a tag library panel 318 or other interface panel, or may be searchable through a tag element search interface. In the context of the above illustrative example, a user storing an e-mail may locate a tag element with a "Document Class" tag category in a tag library panel 318.

At block 810, a user or process determines whether the located tag element is displaying an appropriate tag phrase for the selected item. To continue the above illustrative example, the tag element with the "Document Class" tag category may already be displaying "E-mail" as a selected tag phrase, or may be displaying another selected tag phrase such as "Memo." In one embodiment, a tag element may display multiple selected tag phrases.

If the tag element is not displaying an appropriate selected tag phrase for the selected item, routine 800 moves to block 812. At block 812, a user or process selects or enters an appropriate tag phrase for the selected item. In one embodiment, a user may select a tag phrase from a dropdown associated with the tag element. Illustratively, a dropdown associated with the tag element may display one or more predefined tag phrases from a tag phrase collection associated with the tag element. In another embodiment, an item management system interface may generate or display one or more suggested tag phrases in addition or as an alternative to predefined tag phrases from a tag phrase collection. An illustrative embodiment of a tag phrase selection interaction is discussed below at least with reference to FIG. 13. In one embodiment, a dropdown associated with a tag element may provide a search field for searching for or narrowing a list of possible tag phrases. An illustrative embodiment of a dropdown with a search field allowing for a search or a narrowing of a list of tag phrases is discussed at least with reference to FIG. 13 and FIG. 14, et al.

In one embodiment, a user or process may be limited to selecting a tag phrase from a list of predefined tag phrases (e.g. a tag phrase collection associated with the tag element). In further embodiments, an item management system interface may enable a user to enter a tag phrase in addition or as an alternative to selecting a tag phrase from a list or menu. For example, in one instance a user might enter a numerical or text value into a tag element field in order to specify a selected tag phrase. Illustratively, an item management system interface may suggest one or more suggested or predefined tag phrases before, during, or after the user enters a tag phrase. Illustratively, in other various embodiments, a user may select a tag phrase in any way known in the art, including, but not limited to: selecting from a dropdown or other menu; entering or otherwise specifying a tag phrase name, contents, or id; selecting from set of tiles or icons; utilizing a slider, toggle, or up/down/left/right arrows; etc.

In one embodiment, two or more tag categories may be linked and a single tag element may display indicia or interface components associated with both linked tag categories. Illustratively, a user may be able to select a tag phrase corresponding to each linked tag category. For example, each linked tag category may be associated with a tag phrase area allowing access to a dropdown or other menu. In one embodiment, a first selected tag phrase associated with a first linked tag category may determine which of several sets of tag phrases or tag phrase collections associated with the second linked tag category may be presented or suggested for the purpose of selecting a second tag phrase. For example, a tag element may be associated with a "Client ID" tag category and a "Matter ID" tag category. In one embodiment and in the context of this example, the "Matter ID" tag category may be associated with a number of tag phrase collections each associated with one or more tag phrases associated with the "Client ID" tag category. In the context of this example, we may assume that a user selects a "GELEC" tag phrase from a tag phrase dropdown associated with the "Client ID" tag category. To continue this example, the item management system may identify a set of tag phrases or a tag phrase collection associated with the "Matter ID" tag category and the "GELEC" selected tag phrase (corresponding to the "Client ID tag phrase). Illustratively, and for the purpose of this example only, the set of identified tag phrases may correspond to matter ids that are specific to the client represented by the "GELEC" selected tag phrase. In the context of this example, a user may access a tag phrase selection dropdown associated with the "Matter ID" tag category; the tag phrase selection dropdown may display or suggest "Matter ID" associated tag phrases (or allow searching for tag phrases) identified as associated with the "GELEC" selected tag phrase (e.g. associated with the client represented by the "GELEC" client ID). In the context of this example, selecting a different "Client ID" tag phrase (e.g. "APPL") may cause a different set of "Matter ID" associated tag phrases to be displayed or suggested in a "Matter ID" tag phrase dropdown.

Returning to illustrative FIG. 8, if the tag element is displaying an appropriate selected tag phrase for the selected item, routine 800 moves to block 814. At block 814, a user or process adds a tag element to a tagging interface panel associated with a selected item. In one embodiment, a user may drag and drop a tag element from its current location to a tagging interface panel. An illustrative embodiment of a tag element being dragged to a tagging interface panel is discussed below at least with reference to illustrative FIG. 16. In another embodiment, a user may add a tag element from a current location to a tagging interface panel through any other command or interaction including, but not limited to, a menu item, button, keystroke, command line command, click (e.g. right-click, double-click, etc.), or other interface command or functionality. Illustratively, tag elements or other metadata indicia may be stored, displayed, or organized in one or more interface panels in any way known in the art. In one embodiment, methods of moving tag elements between interface panels may be based upon or may change according to a display, view, or other configuration of one or more interface panels or other interface elements.

In one embodiment, dragging or otherwise adding a tag element from a source interface panel (e.g. library interface panel, scratch interface panel, etc.) to a tagging interface panel may cause the tag element to be removed from the source interface panel and added to the tagging interface panel. In another embodiment, adding a tag element from a source interface panel to a tagging interface panel may cause the tag element to be added to the tagging interface panel without the tag element being removed from the source interface panel. Illustratively, if a tag element is not removed from a source panel, a user may utilize the tag element as a basis for adding additional instances of the tag element to a tagging interface panel.

In one embodiment, a first tag element may be associated with one or more additional tag elements such that adding the first tag element to a tagging interface panel automatically adds the additional tag elements to the tagging interface panel. For the purpose of a brief specific example, an item management system interface may include a tag element with a "Project ID" tag category and an "ABL.001" selected tag phrase (henceforth the "Project ID:ABL.001 tag element" for the purpose of this specific example). For the purpose of brevity and in the context of this specific example, a tag element configured to allow association of additional tag elements may be referred to as a "primary tag element" and a tag element associated with a primary tag element may be referred to as a "secondary tag element." In one embodiment, an administrator or other entity may configure a tag element to be a primary tag element or may associate one or more secondary tag elements with a primary tag element. In another embodiment, a user with appropriate permissions may add or remove secondary tag elements to or from a primary tag element by dragging and dropping tag elements onto or from a primary tag element or associated interface panel, by selecting an add or remove interface command, by interacting with an add or remove interface component, or through any other interaction. Illustratively, a configuration or setting designating a primary tag element may be associated with a tag category/tag phrase pair, such that any tag element associated with both the designated tag category and selected tag phrase may by default be associated with the same secondary tag elements. In one embodiment, a tag category may be configured to be a primary tag category such that each associated tag phrase (e.g. tag phrases in an associated tag phrase collection) may be the basis for a different primary tag element (e.g. with a different set of associated secondary tag elements).

In the context of our specific example, an administrator may configure a setting such that the combination of "Project ID" tag category and "ABL.001 selected tag phrase may be designated as primary; tag elements associated with the "Project ID" tag category and the "ABL.001" tag phrase may be primary tag elements, and may each be associated with the same set of secondary tag elements. Illustratively, a primary tag element may be displayed in association with various visual indicia indicating that it corresponds to additional secondary tag elements; in one embodiment, the primary tag element may include or be displayed in association with a panel, collapsible pane, or other interface area for display of any associated secondary tag elements. For example, a user may be able to drag tag elements to or from an interface pane expanded out from a primary tag element; dragging tag elements into the interface pane may cause the dragged tag elements to be designated as secondary tag elements associated with the primary tag element.

To continue our specific example, a user may identify a tag element with a "State" tag category and a "NY" selected tag phrase (henceforth the "State:NY tag element" for the purpose of this specific example) and a tag element with a "Contract Value" tag category and a "$2000.00" selected tag phrase (henceforth the "Contract Value:$2000.00 tag element" for the purpose of this specific example). In the context of this specific example, a user may expand an interface pane associated with the Project ID:ABL.001 tag element, and may drag the State:NY and Contract Value:$2000.00 tag elements into the expanded pane. In the context of this specific example, the item management system may associate the State:NY and Contract Value:$2000.00 tag elements as secondary tag elements with the Project ID:ABL.001 as a primary tag element.

To continue our specific example, the user may drag the Project ID:ABL.001 tag element to a tagging interface panel; the item management system may add the State:NY and Contract Value:$2000.00 tag elements to the tagging interface panel as secondary tag elements. In one embodiment, secondary tag elements may not be explicitly shown in a tagging interface panel, but may be hidden in a collapsed interface pane associated with a primary tag element or hidden within other interface element. For example, in the context of our specific example, the tagging interface panel may not show the State:NY and Contract Value:$2000.00 tag elements; the tagging interface panel may display the Project ID:ABL.001 tag element. In the context of this specific example, the Project ID:ABL.001 tag element may display indicia indicating that it is associated with secondary tag elements, but these secondary tag elements may not be visible. In one embodiment, a user may expand an interface panel associated with a primary tag element to view associated secondary tag elements. In the context of our specific example, saving a selected item associated with the tagging interface panel may associate the selected item data with tag instances corresponding to the State:NY and Contract Value:$2000.00 tag elements as though they had been added to the tagging interface panel individually. Illustratively, and in the context of our specific example, any instances of Project ID:ABL.001 tag elements utilized in the future may automatically be associated with the State:NY and Contract Value:$2000.00 tag elements as secondary tag elements for the purpose of tagging items.

Ending our brief specific example and returning to FIG. 8, once a tag element has been added to a tagging interface panel, routine 800 returns to block 806. At block 806, a user or process determines whether additional metadata should be associated with the selected item. If additional metadata should be associated with the selected item, routine 800 returns to block 808. Otherwise, if the user or process determines that all appropriate metadata has been associated with the selected item, routine 800 continues to block 816.

At block 816, the item management interface system saves or stores a selected item and any associated metadata. In one embodiment, the item management system may save or store a selected item and associated metadata responsive to a command from a user or process. For example, an item management system interface may include a save or store button associated with a selected item; clicking the save or store button may cause the item management system to store the selected item and any associated metadata. In other embodiments, an item management system may save or store a selected item and associated metadata responsive any number of different commands or interactions from a user or process. In one embodiment, an automatic process may cause an item management system to proceed with saving or storing a selected item and associated metadata. In one embodiment, moving a tag element to an interface panel may cause an item management system to automatically associate or store a tag instance corresponding to the tag element with a selected item. In further embodiments, an item management system may automatically associate or store selected item data or associated metadata responsive to any other user interaction, automated process or schedule.

Illustratively, and as discussed above and at least with reference to FIG. 1, data corresponding to a selected item may be saved to any combination of storage solutions, and may be configured, split, concatenated, formatted, compressed, encrypted, or otherwise modified in any way according to an item management system configuration or embodiment. In one embodiment, metadata associated with a selected item may comprise data (e.g. tag instances, etc.) associated with tag elements contained or included in a tagging interface panel. In further embodiments, metadata corresponding to a selected item may additionally or alternately comprise metadata entered in any other way (e.g. entered into fixed fields or forms by one or more users, etc.), automatically generated metadata, previously stored metadata, or any other metadata. Illustratively, and as discussed above and with reference to FIG. 1, et al., metadata associated with a selected item may be saved to any combination of metadata repositories, and may be configured, split, concatenated, formatted, compressed, encrypted, or otherwise modified in any way according to an item management system configuration or embodiment.

At block 818, routine 800 ends having stored selected item data and associated metadata to one or more storage solutions or metadata repositories.

FIGS. 9-24 are device diagrams depicting illustrative embodiments of an item management system storage interface displayed on a tablet computing device 200. With reference to FIGS. 9-24, embodiments of interactions between a user and various aspects of an illustrative item management system interface will be described. Specifically, interactions associated with an illustrative item storage routine will be described with reference to aspects of embodiments of one or more item management system storage interfaces. For purposes of example, FIGS. 9-24 have been simplified such that many of the features, components, functionalities, interactions, and interface elements associated with the storage, management, and presentation of items, metadata, and system data objects are not shown. One skilled in the relevant art will appreciate that various further features, components, functionalities, and interface elements may be utilized in the storage, management, and presentation of items, metadata, and system data objects, and that various additional interactions may accordingly occur without departing from the spirit and scope of the present disclosure. One skilled in the relevant art will further appreciate that various functionalities, features, components, and interface elements may be implemented, performed, presented, or otherwise associated with any combination of devices, entities, or systems, including, but not limited to, devices, entities or systems discussed with reference to illustrative FIG. 1 and elsewhere. Illustratively, aspects of various illustrative interactions may be performed by any combination of one or more user or process.

In one embodiment, aspects of features, components, functionalities, interactions, and interface elements discussed with reference to FIGS. 9-24 may illustrate or correspond to aspects or blocks of illustrative routine 800 as discussed above with reference to FIG. 8. Illustratively, various aspects, actions, or interactions discussed with reference to FIGS. 9-24 may be performed concurrently, sequentially, or at different times and in response to different events or timings. For the purpose of illustration, one or more illustrative interface elements discussed or depicted with reference to any one or more of FIG. 2, FIG. 3, FIGS. 9-24, FIGS. 27-32, et al. may share a common numbering or name; it should be understood that any common numbering or name is for the purpose of illustration and clarity only, and is not meant to imply or require that commonly named or numbered interface elements depicted or discussed with reference to different figures share an identity or are otherwise identical in form or functionality, although this may be the case in some embodiments.

Figure 9:
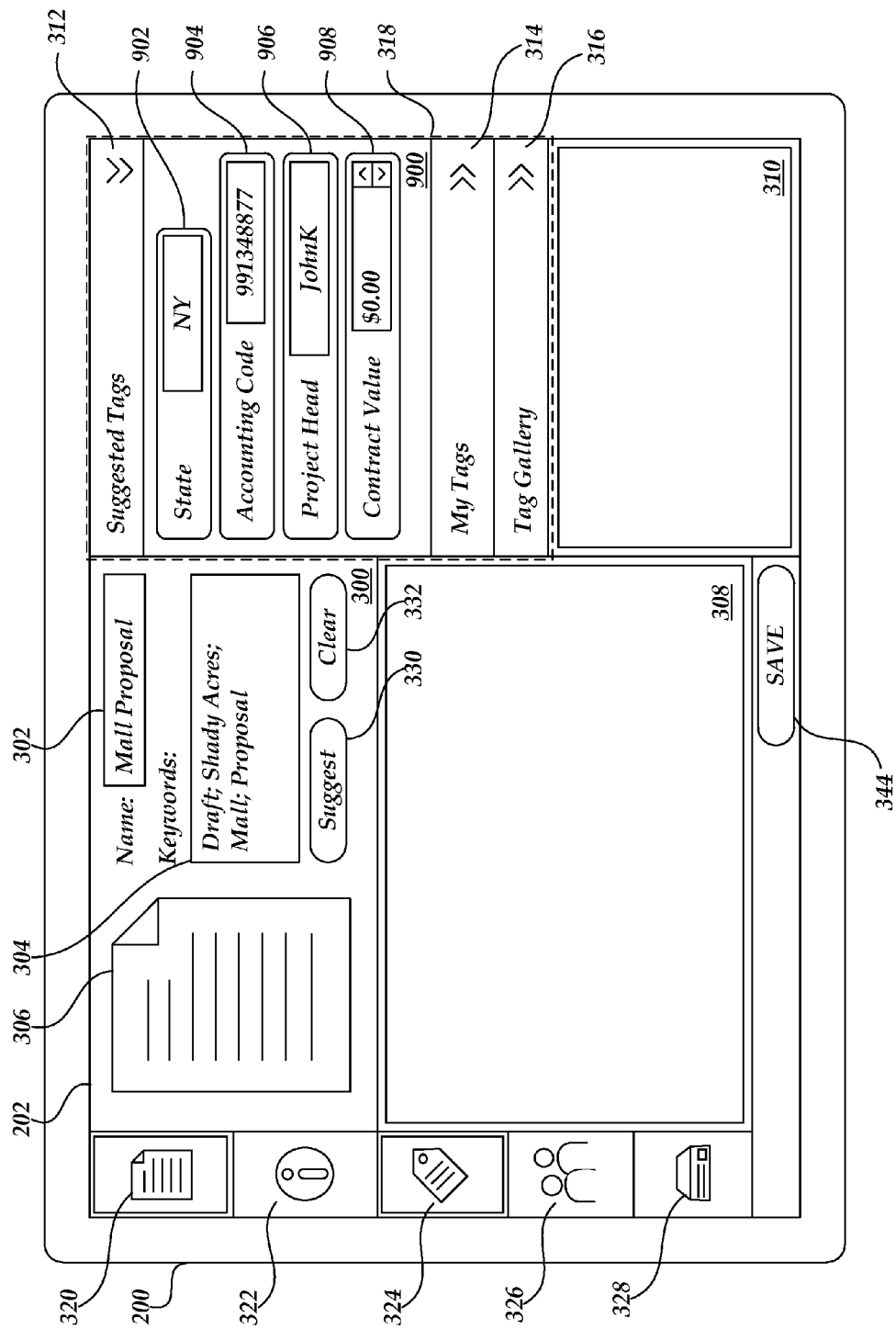
FIGS. 9-24 are device diagrams depicting illustrative embodiments of an item management system storage interface.

With reference to FIG. 9, an illustrative embodiment of an item management system storage interface is displayed. In various embodiments, an item management system storage interface may allow or facilitate the storage and tagging of one or more items (or system data objects) through interaction with one or more item management interface elements.

In one embodiment, aspects of an illustrative item management storage interface depicted in FIG. 9 may be presented to a user or process responsive to the user or process selecting an item for storage. As discussed above and at least with reference to FIG. 8, a user or process may select an item for storage through any combination of interactions, commands, or other actions and through or by any combination of one or more processes, interfaces, or devices.

For the purpose of providing an illustrative example, we may assume that a user selects an item consisting of a word processing document comprising a sales proposal for a mall. In the context of this illustrative example, the user may enter the name "Mall Proposal" in item name field 302. In one embodiment, item name field 302 may comprise required information (e.g. an item management system may not save or store an item without data in item name field 302). Item preview 306 may show a preview of one or more aspects of the selected item data. The user may further enter keywords (e.g. "Draft," "Shady Acres," "Mall," "Proposal") into item keyword field 304. In one embodiment, clicking on suggestion button 330 may cause the item management system to suggest one or more keywords instead of or in addition to keywords entered by the user. Illustratively, suggested keywords may be based on the contents (e.g. word frequency, appearance of words in a document title or file name, etc.) of the selected item.

For the purpose of our illustrative example, tag library panel 318 may comprise three expandable headers: suggested tags header 312, my tags header 314, and tag gallery header 316. In various embodiments, tag library panel 318 may contain any number of different expandable headers or other organizational elements configured by a user or any other entity. In the context of our illustrative example, suggested tags header 312 may be expanded to show suggested tags panel 900. Suggested tags panel 900 may display one or more tag elements, such as state tag element 902, accounting code tag element 904, project head tag element 906, and contract value tag element 908. Tag elements may be configured or managed by an administrative user, system installer, system creator, or any other entity. In one embodiment, tag elements included in suggested tags panel 900 may be determined by an automatic process. For example, an item management system may determine one or more tag categories or tag phrases based on occurrences of a tag category name or tag phrase in data corresponding to a selected item (e.g. in an item name, item data itself, or metadata associated with the item). As another example, an item management system may determine one or more tag categories or tag phrases based on how often a tag category or tag phrase is used by a user or group, how recently a tag category was used by a user or group, a predefined relevance value, or any other value or heuristic as known in the art.

Returning to our illustrative example, state tag element 902, accounting code tag element 904, and project head tag element 906 may be associated with a "State," "Accounting Code," and "Project Head" tag category respectively, and may each be associated with a tag phrase collection comprising a number of predefined tag phrases. For the purpose of example, we may assume that state tag element 902 currently has "NY" as a selected tag phrase, that accounting code tag element 904 currently has "991348877" as a selected tag phrase, and that project head tag element 906 currently has "JohnK" as a selected tag phrase. In the context of our illustrative example, contract value tag element 908 may not be associated with a tag phrase collection, and may allow a user to enter a decimal value representing a currency value.

Figure 10:
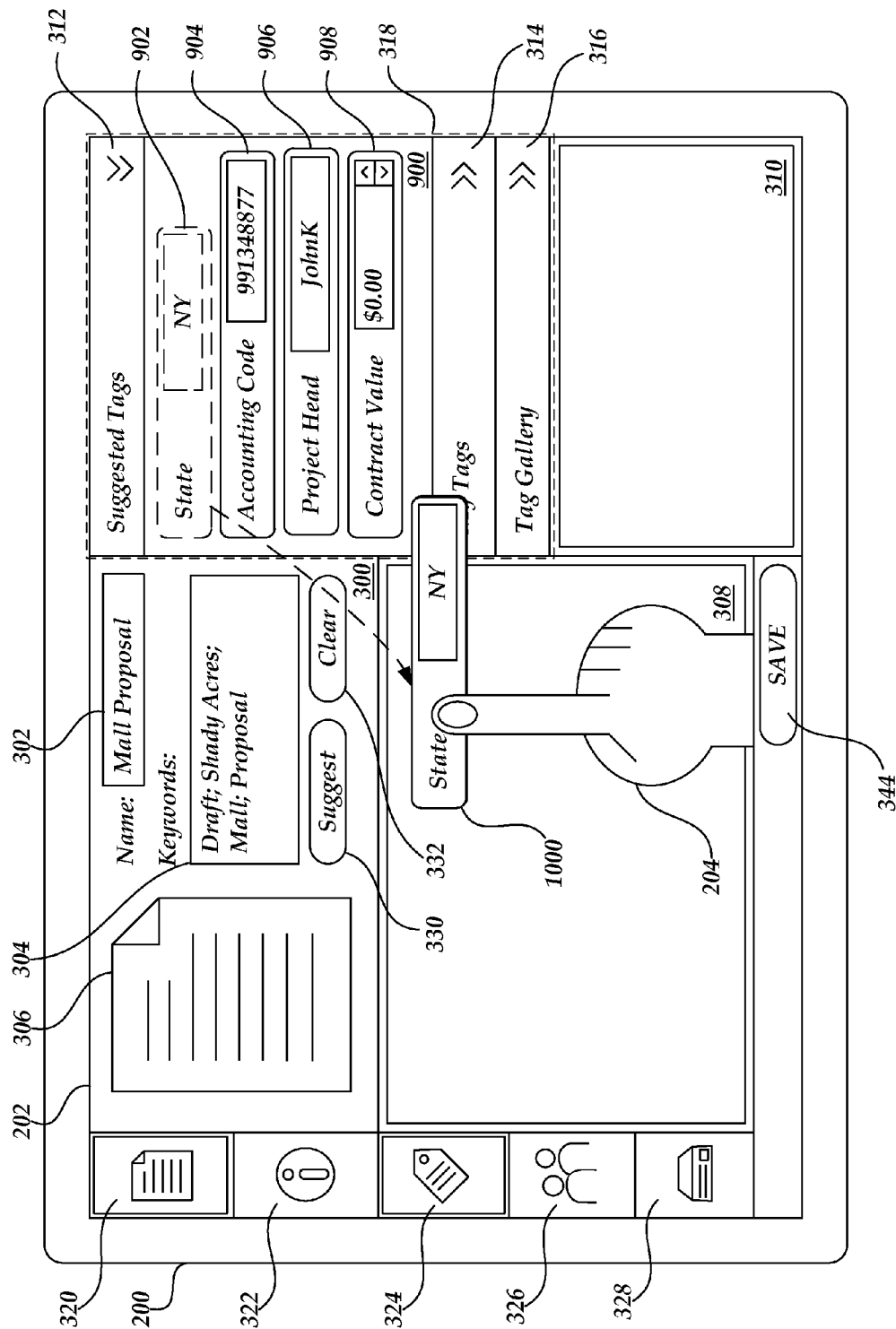

To continue our illustrative example with reference to FIG. 10, the user may determine that the selected item is associated with New York State. The user may drag state tag element 902 out of suggested tags panel 900 into tagging interface panel 308 in order to indicate that the selected item should be associated with at least a tag instance corresponding to a tag category "State" and a selected tag phrase "NY." In one embodiment, dragging state tag element 902 out of suggested tags panel 900 may cause the item management system interface to create a new instance of a tag element such as state tag element 1000 based on state tag element 902. For example, an item management system interface may keep an instance of state tag element 902 within suggested tags panel 900, while creating a new instance of state tag element 1000 for the user to drag. Illustratively, keeping an instance of state tag element 902 within suggested tags panel 900 may allow a user to access state tag element 902 from suggested tags panel 900 at a later point in the storage or tagging process. In other embodiments, a user may drag the original state tag element 902 to suggested tags panel 900, causing the state tag element 902 to be removed from suggested tags panel 900.

Figure 11:
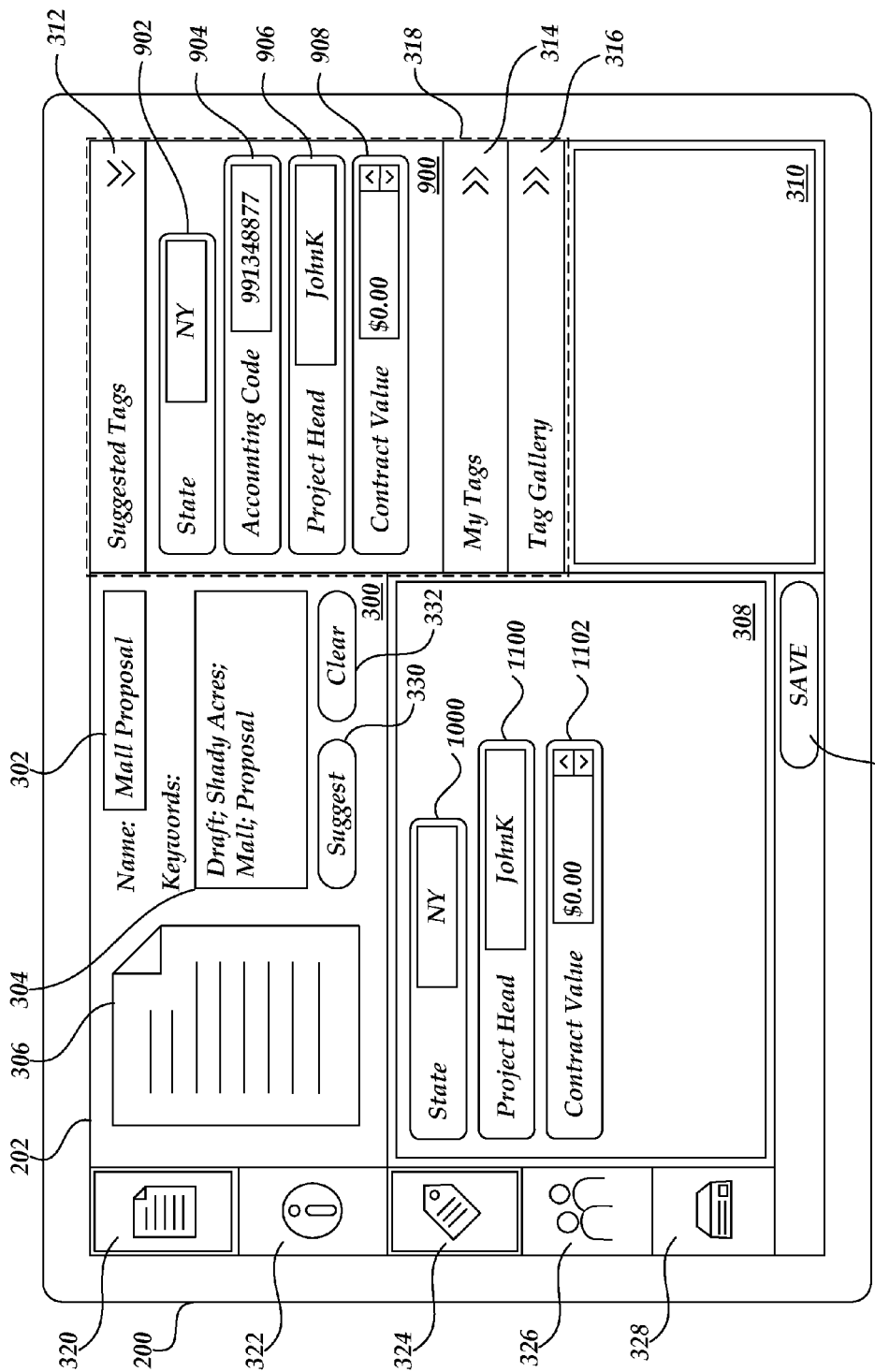

To return to our earlier illustrative example with reference to FIG. 11, the user may further determine that the selected item is associated with a project head and a contract value. The user may drag project head tag element 906 out of suggested tags panel 900 into tagging interface panel 308, which may cause the item management system interface to create a new instance of a project head tag element 1100. The user may further drag contract value tag element 908 out of suggested tags panel 900 into tagging interface panel 308, which may cause the item management system interface to create a new instance of a contract value tag element 1102. In another embodiment, the user may add one or more tag elements to tagging interface panel 308 by using a menu command, keystroke, single or double click, or any other interface interaction.

Figure 12:
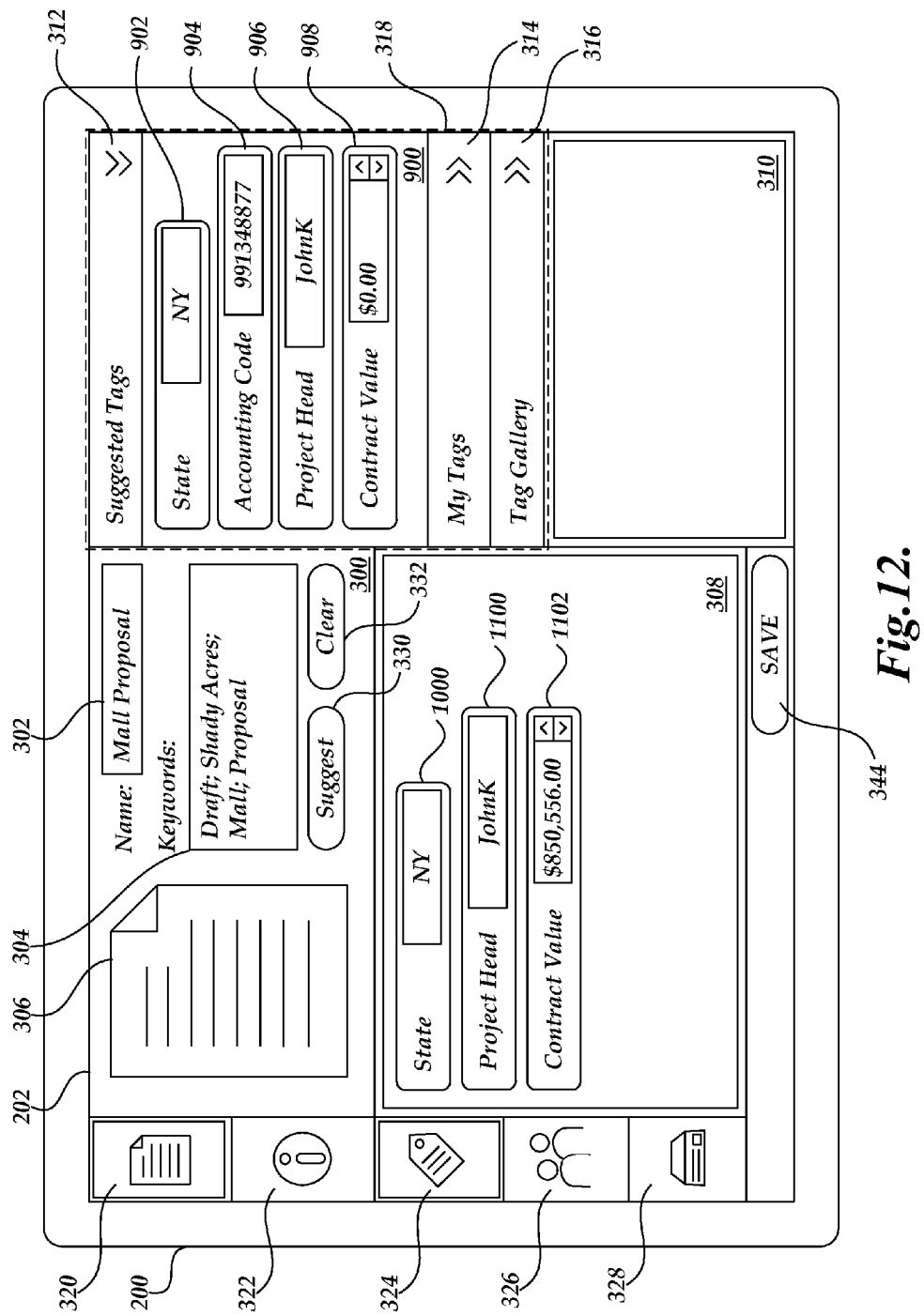

To continue our illustrative example with reference to FIG. 12, the user may determine that the currently selected "JohnK" tag phrase is correct for the "Project Head" tag category associated with project head tag element 1100 and not change the currently selected tag phrase. The user may further determine that the currently selected "$0.00" tag phrase is not correct for the "Contract Value" tag category. For the purpose of our example, we may assume that the selected item is associated with a contract value of $850,556.00. The user may enter "850,556.00" into a tag phrase field of contract value tag element 1102, causing contract value tag element 1102 to be associated with a selected tag phrase of "$850,556.00." In one embodiment, up/down arrows associated with a tag phrase field may allow a user to increment or decrement a selected tag phrase value. In another embodiment, up/down arrows associated with a tag phrase field may allow a user to select a next or previous tag phrase of an associated tag phrase collection. In a further embodiment, clicking or otherwise interacting with a tag phrase field may toggle between tag phrases of an associated tag phrase collection. In one embodiment, a tag element may autocomplete or suggest a tag phrase value based on a value included in selected item data, or based on one or more tag phrases in an associated tag phrase collection.

Figure 13:
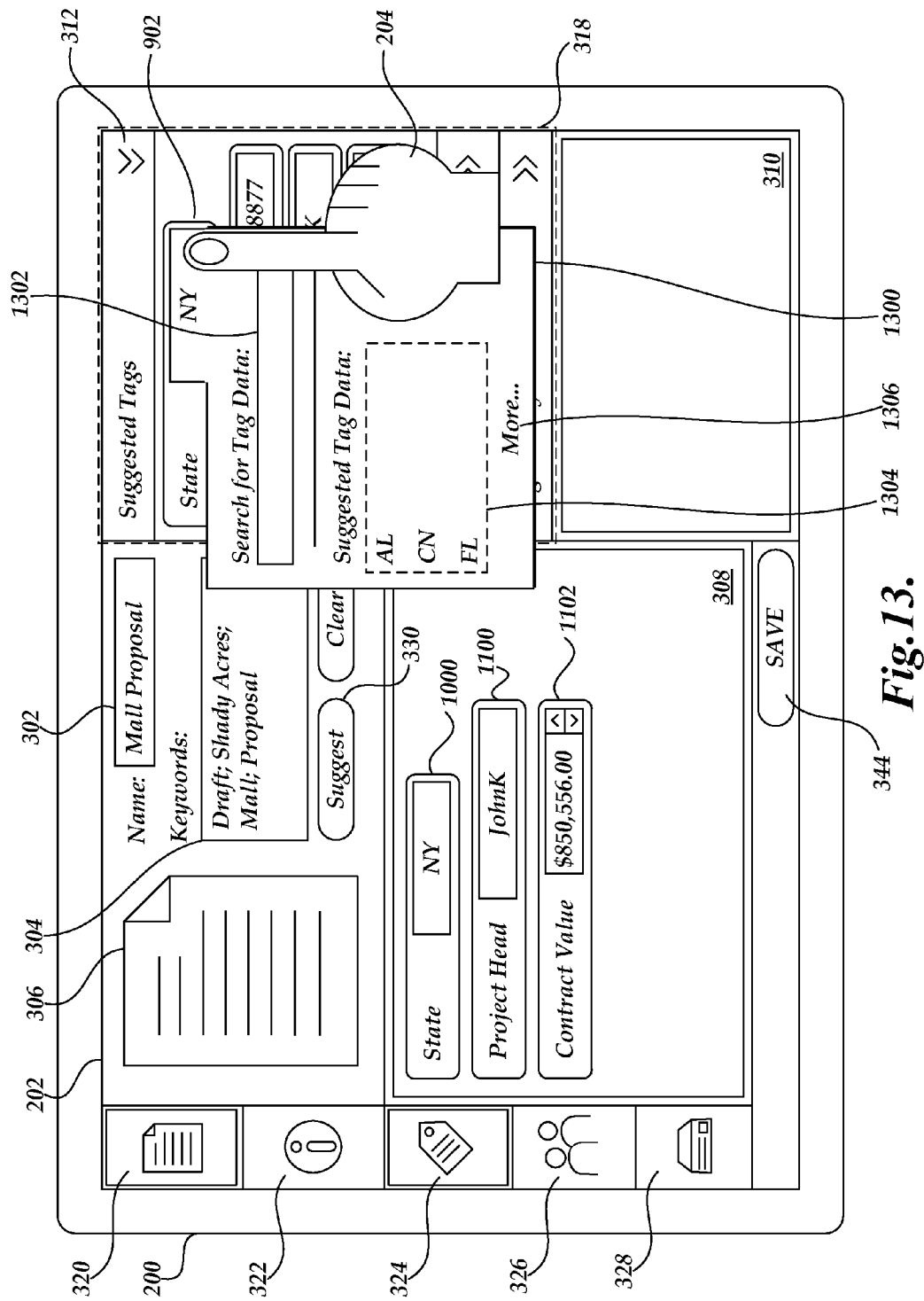

To continue our illustrative example with reference to FIG. 13, the user may determine that the selected item is associated with Washington State in addition to New York State. Within the context of our example, we may assume that a tag phrase collection associated with the "State" tag category contains a number of tag phrases including at least a "WA" state abbreviation tag phrase indicating Washington State. The user may click or select a tag phrase field associated with state tag element 902 to open tag phrase selection dropdown 1300. Tag phrase selection dropdown 1300 may include a number of interface elements such as tag phrase search field 1302, tag phrase collection list 1304, and show more interface element 1306.

Tag phrase collection list 1304 may present a list of tag phrases associated with a tag phrase collection. In one embodiment, various display attributes (e.g. a number of phrases to display by default, a number of additional phrases to display when a user selects show more interface element 1306, a means of selecting tag phrases to display, one or more tag phrase fonts or visual indicia, a display format or view, etc.) may be associated with a tag category, tag phrase collection, tag phrase, or other system data object. In one embodiment, an item management system interface may identify tag phrases for display within tag phrase collection list based a combination of one or more factors, potentially including, but not limited to, how recently a tag phrase was last used for search or storage, how often a tag phrase is used for search or storage, whether a tag phrase occurs or is implied by contents of a selected item, etc. For example, an item management system may process a selected item to determine whether or how often any tag phrases in a tag phrase collection occur within the item data, and may display one or more of these tag phrases within a tag phrase collection list based on whether or how often the phrase occurs. For the purpose of our example, tag phrase collection list 1304 may display three tag phrases ("AL," "CN," and "FL") from a tag phrase collection associated with state tag element 902.

In one embodiment, tag phrase search field 1302 may function to search or filter one or more tag phrase collections associated with a tag element. In other embodiments, tag phrase search field 1302 may additionally or alternately allow a user to enter a new tag phrase not included in a tag phrase collection as a selected tag phrase. In one embodiment, an item management system may add a newly entered tag phrase to an associated tag phrase collection. Illustratively, results of a search or filter may be displayed in tag phrase collection list 1304. Tag phrase collection list 1304 may display any number of tag phrases in a list format, or any other format or view known in the art.

Figure 14:
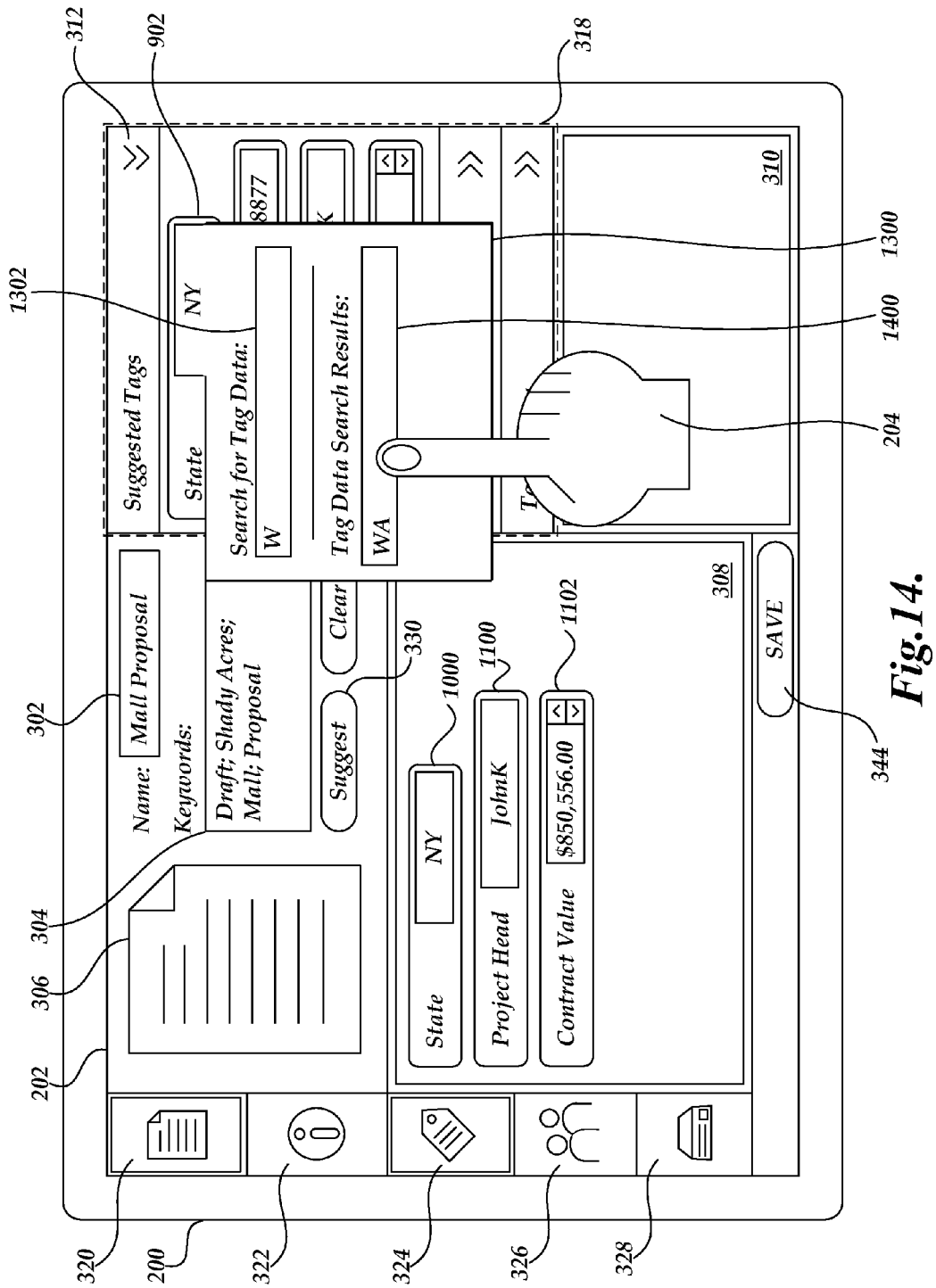

To continue our illustrative example with reference to FIG. 14, the user may enter a "W" search phrase into tag phrase search field 1302. Responsive to the user entering a "W" search phrase into tag phrase search field 1302, the item management system interface may identify one or more tag phrases that begin with "W" from an associated tag phrase collection, and may display one or more results in the tag phrase collection list 1304. For the purpose of our example, we may assume that filtering the associated tag phrase collection by the search phrase "W" results in a set of one tag phrase "WA." Although a single letter search phrase is used here for the purpose of illustration, one of skill in the relevant art will recognize that a search phrase of any length or format may be used based on the configuration of the item management system interface. In one embodiment, entering or modifying a search phrase may cause the item management system interface to begin or update a search. In another embodiment, a user may have to click on a "Search" button (not shown) or perform some other form of search command in order to begin or update a search.

Figure 15:
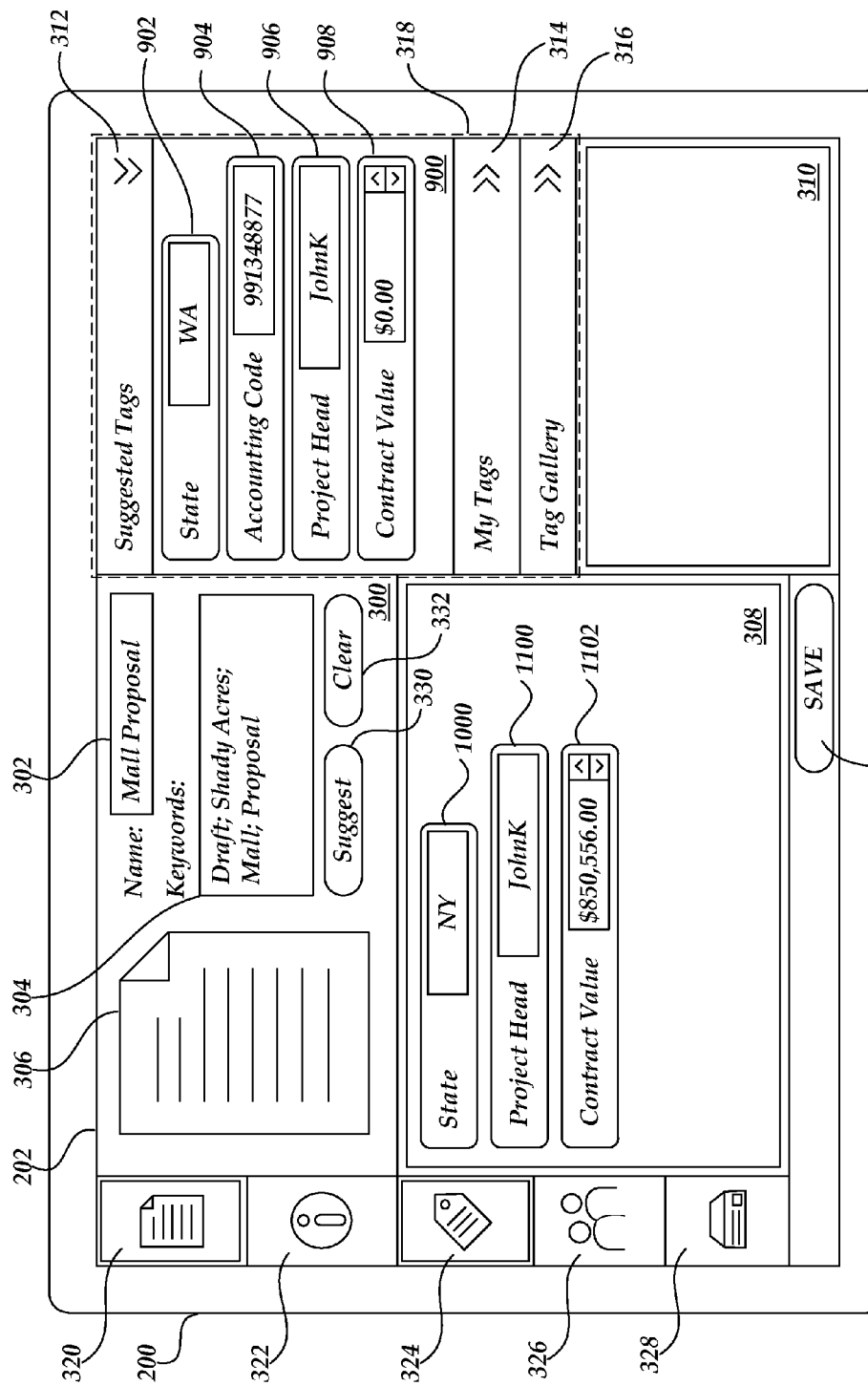

To continue our illustrative example with reference to FIG. 15, the user may select the tag phrase "WA" from tag phrase collection list 1304. The tag phrase "WA" may become the selected tag phrase for state tag element 902.

Figure 16:
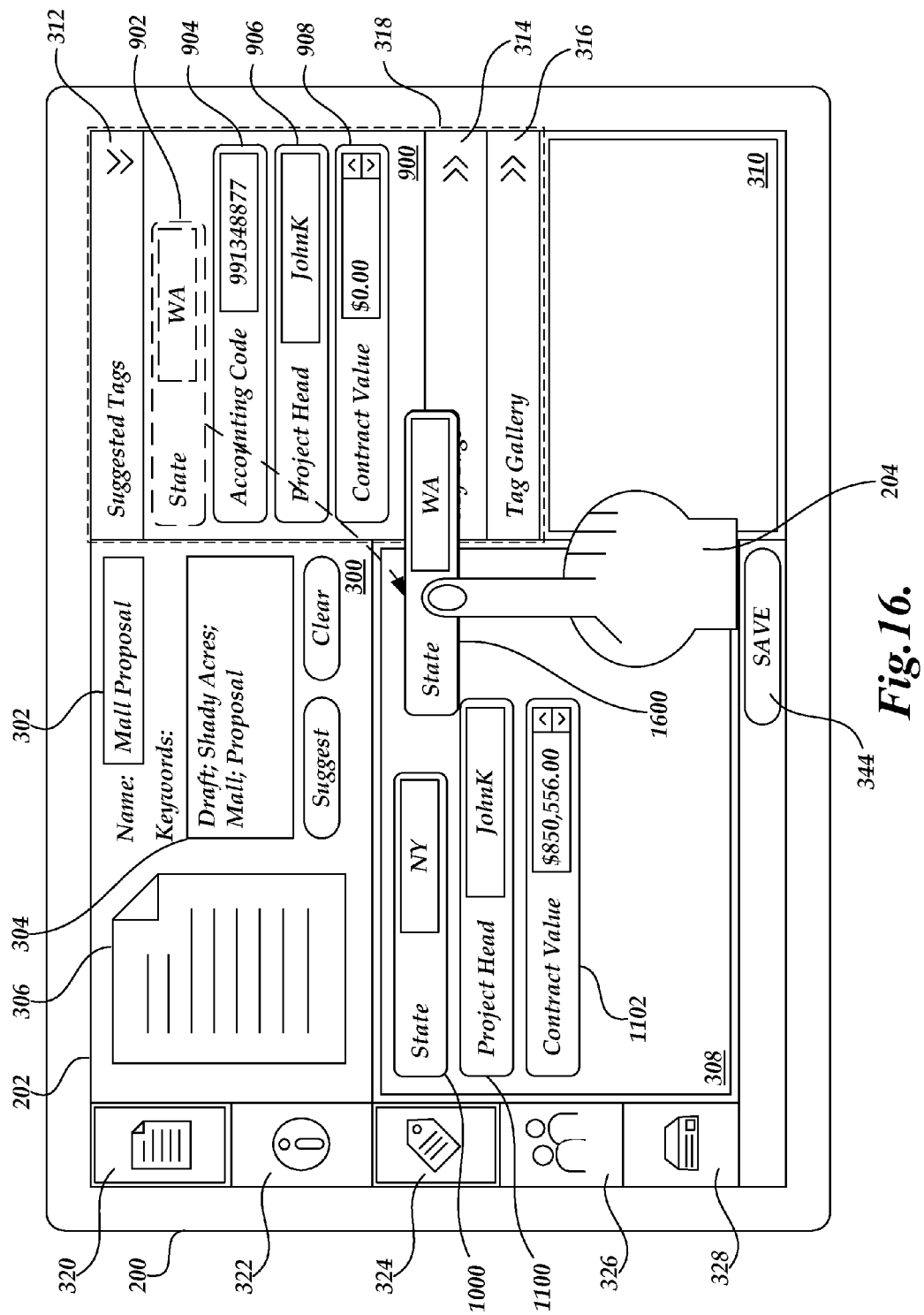

To continue our illustrative example with reference to FIG. 16, the user may drag or otherwise move state tag element 902 from suggested tags panel 900. Illustratively, the item management system interface may create a new instance of state tag element 1600 responsive to the user dragging state tag element 902 from suggested tags panel 900. Illustratively, the user may drop or otherwise add state tag element 1600 to tagging interface panel 308.

Figure 17:
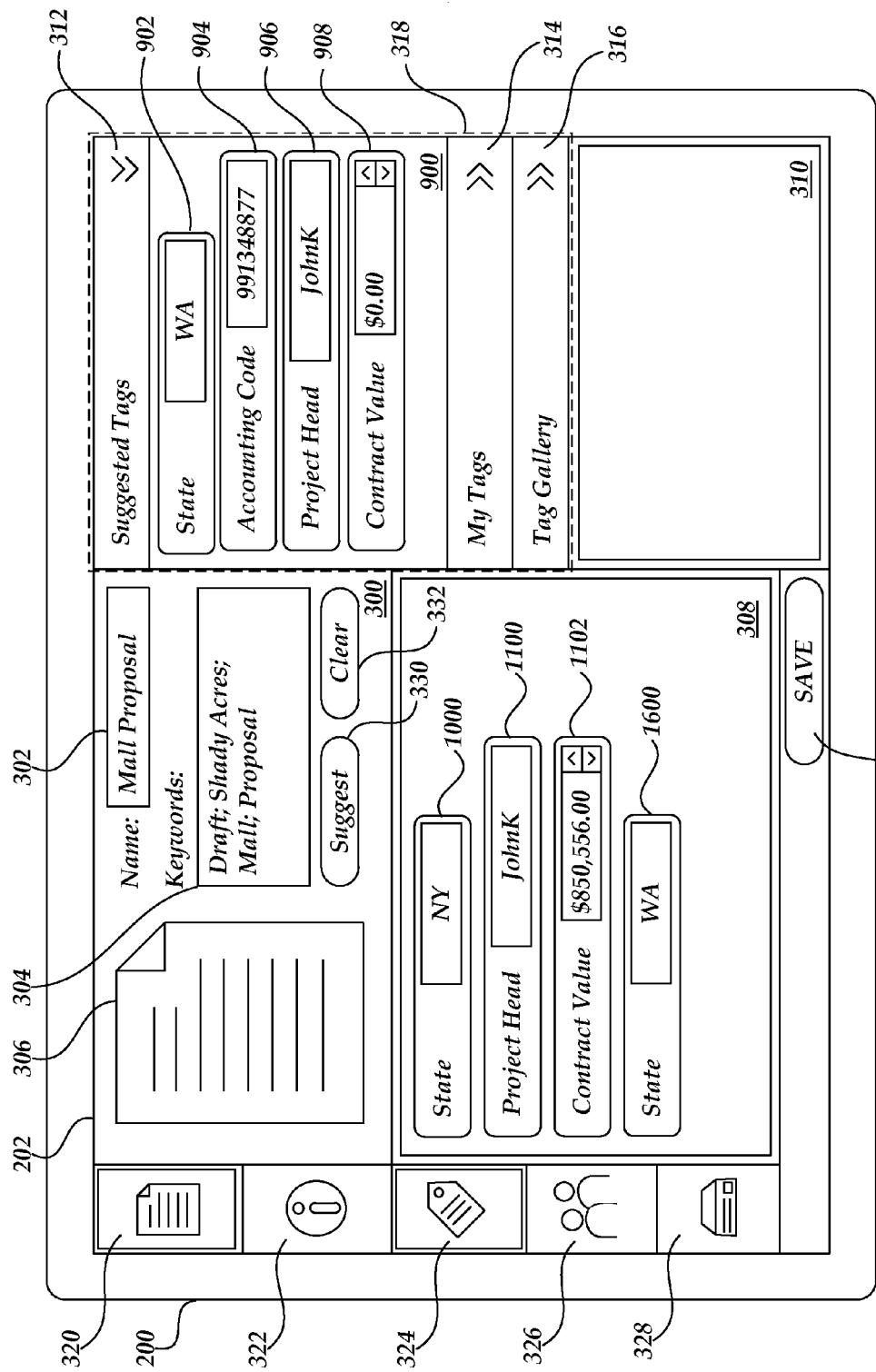

To continue our illustrative example with reference to FIG. 17, tagging interface panel 308 contains four tag elements, two of which have the same "State" tag category. Illustratively, tag elements displayed in tagging interface panel 308 may be presented in any format or form. In one embodiment, tag elements may be automatically ordered or laid out within tagging interface panel 308 (e.g. by a corresponding tag category, element size, element priority value, tag attribute, tag phrase, etc.). In another embodiment, tag elements may be displayed in an order or position based on an order or position in which the tag elements were dropped or otherwise added.

Figure 18:
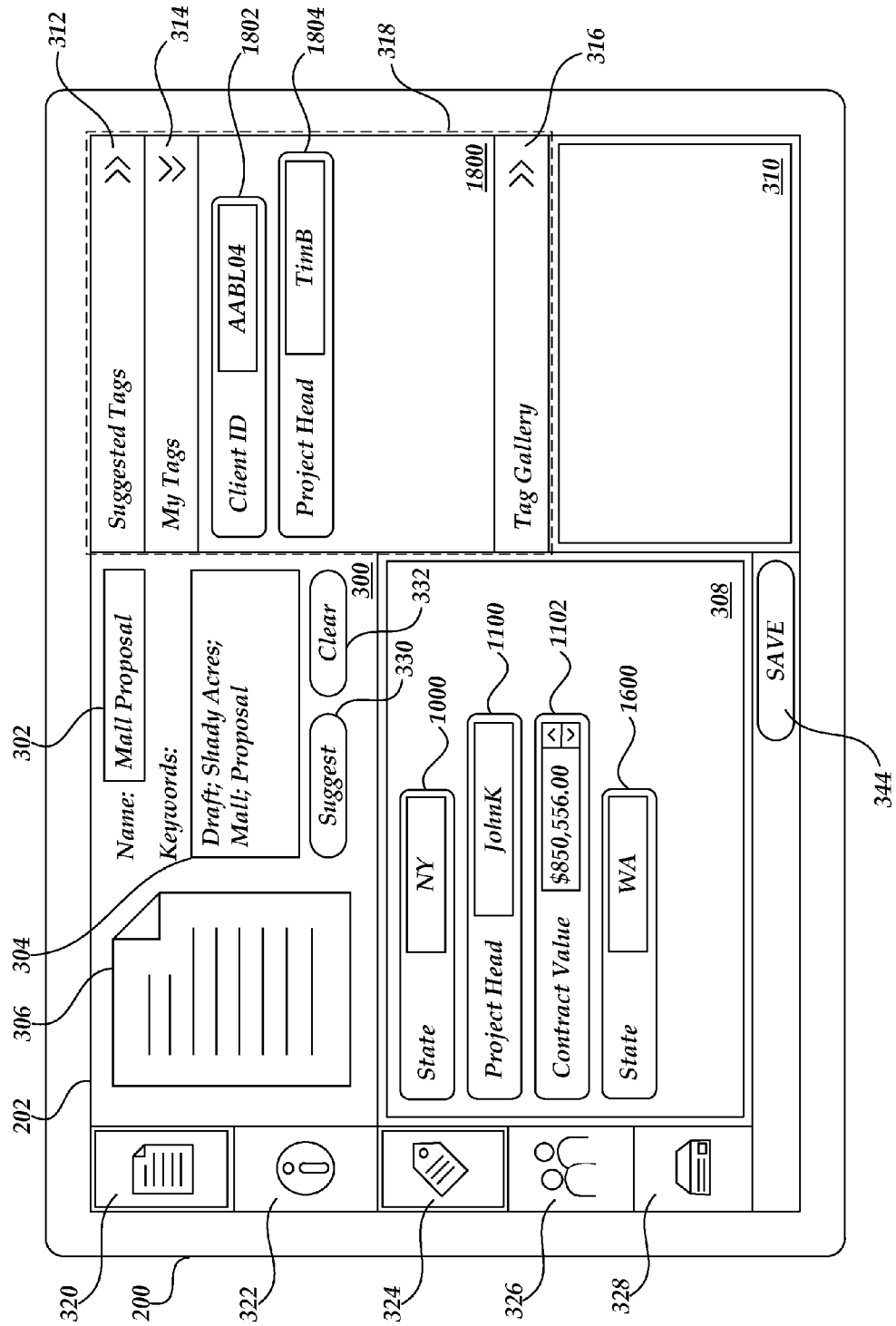

To continue our illustrative example with reference to FIG. 18, a user may expand my tags header 314 to display my tags panel 1800. In one embodiment, expanding my tags header 314 may collapse other open headers, such as suggested tags header 312.

My tags panel 1800 may contain a number of tag elements such as client id tag element 1802 and project head tag element 1804. In one embodiment, tag elements in my tags panel 1800 may have been previously selected or organized by a user or a system administrator. In one embodiment, a user may set up one or more areas or sections within tag library panel 318 for holding tag elements (e.g. one or more collapsible headers with corresponding panels). For example, a user could create a "Work" section and a "Photography" section containing different types of tag elements. In a further embodiment, an administrator may alternately or additionally create one or more areas or sections relating to an organization or workflow. Illustratively, sections relating to an organization or workflow may be presented in common to one or more users in an organization. For example, a system admin may create a "Patents" section and a "Contracts" section, each containing tag elements useful in a particular department in an organization. A user may further create one or more personal sections for organizing tag elements; the "Patents" and "Contracts" sections would potentially be viewable by multiple users while the personal sections would only be viewable by the section creators.

Figure 19:
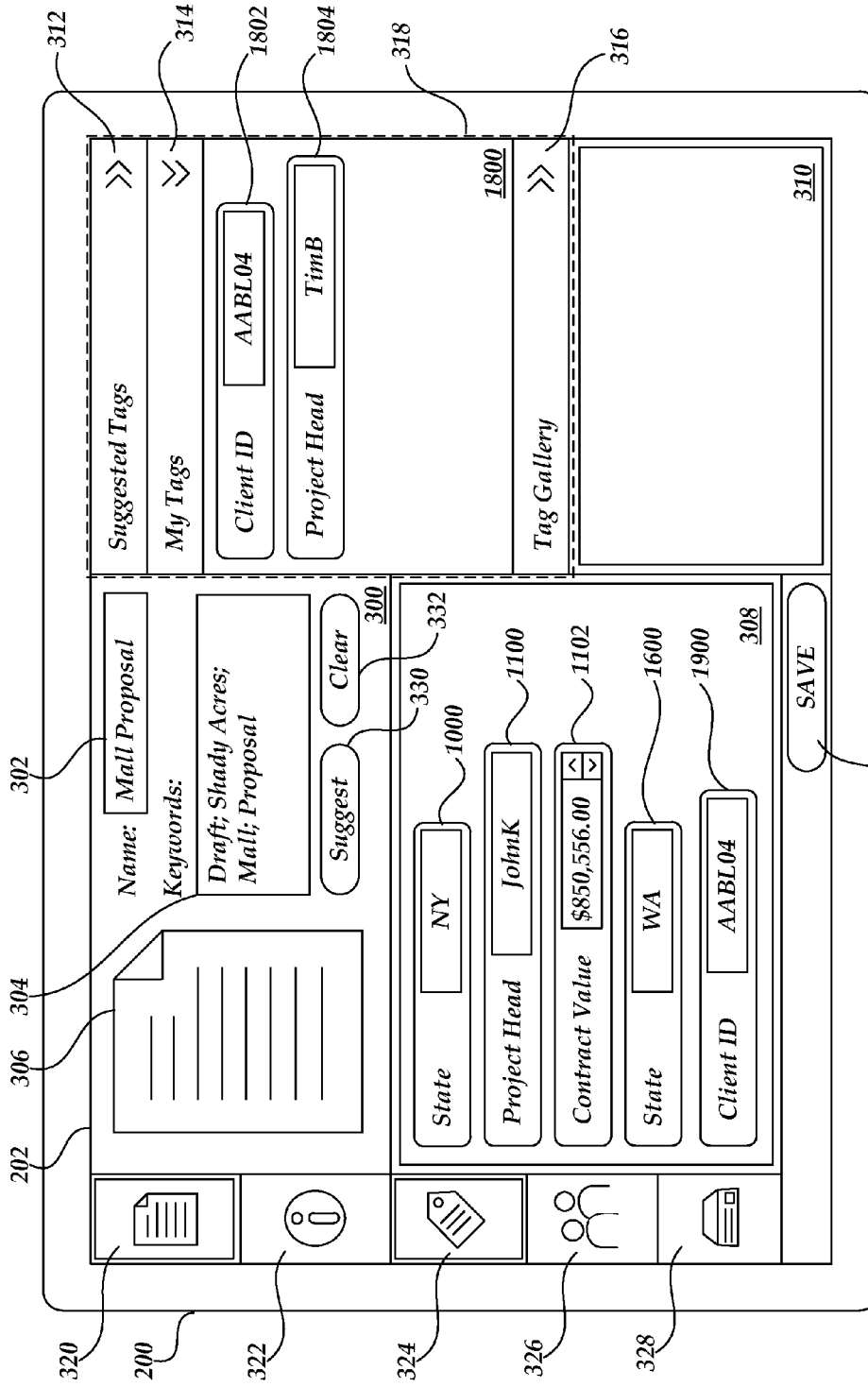

To continue our illustrative example with reference to FIG. 19, the user may determine that a client ID tag category relates to the selected item. The user may drag client id tag element 1802 from my tags panel 1800, which may cause the creation of client id tag element 1900 based on client id tag element 1802. The user may drop client id tag element 1900 to tagging interface panel 308, causing client id tag element 1900 to be added to tagging interface panel 308. For the purpose of our example, we may assume that the current selected client id "AABL04" associated with client id tag element 1900 is appropriate for the selected item, and will not be changed by the user.

Figure 20:
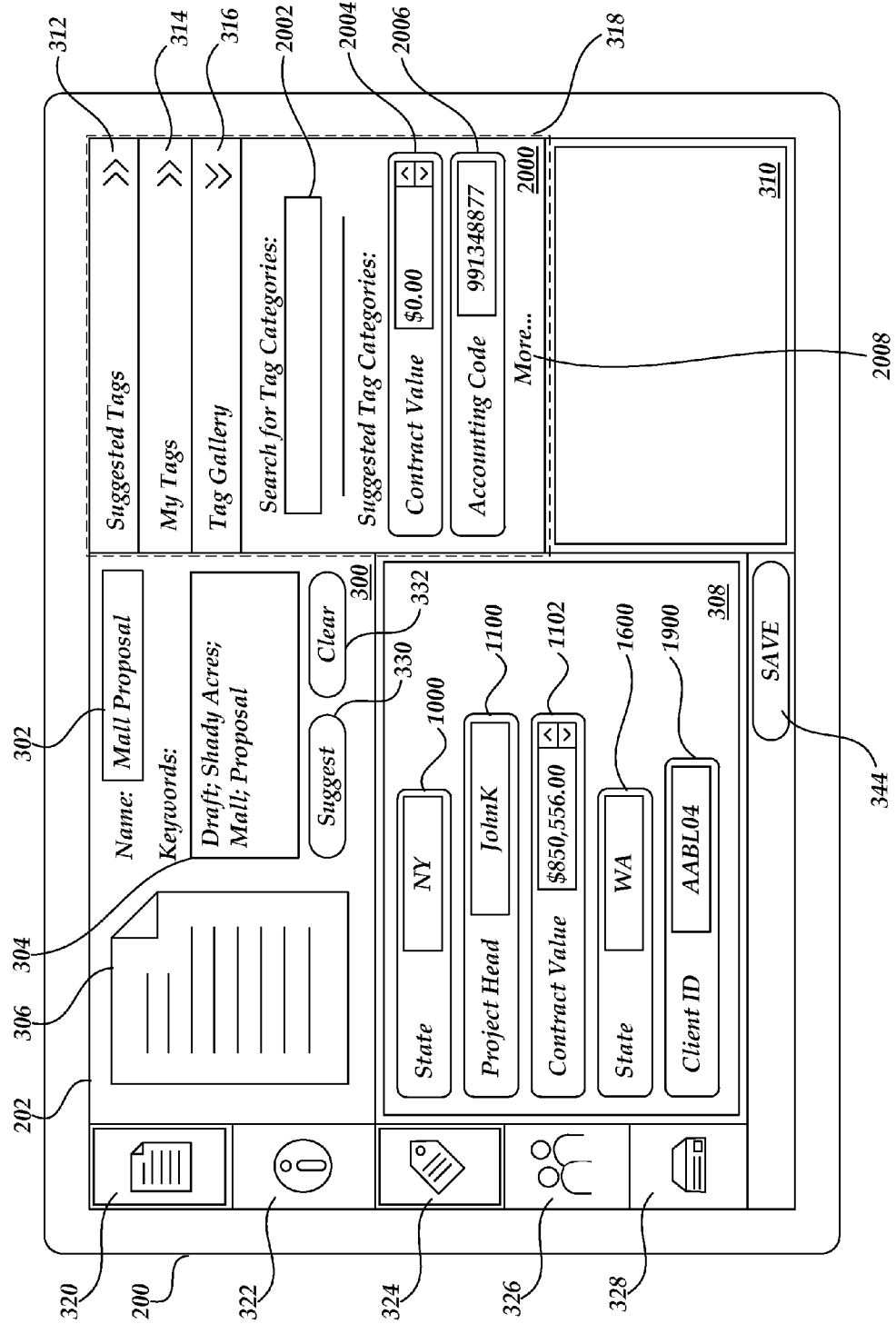

To continue our illustrative example with reference to FIG. 20, a user may further determine that a tag instance with a "Deliverable Date" tag category would be appropriate for the selected item. We may assume for the purpose of our example that a tag element with a "Deliverable Date" tag category is not currently included under either suggested tags header 312 or my tags header 314. The user may expand tag gallery header 316 to show tag gallery panel 2000. In one embodiment, tag gallery panel 2000 may include interface elements allowing a search of tag elements by tag category. For example, tag gallery panel 2000 may include tag category search field 2002 for entering a search phrase. In one embodiment, tag elements returned by a search may correspond to a set of tag elements corresponding to different tag categories matching a search phrase, and which the searching user has permission to view. Although a search based on a tag category is described here for purpose of illustration, a search may be based on any one or more metadata elements, such as tag categories, tag phrases, location within a tag library panel 318, association with a selected item, a visual or display aspect, etc.

Tag gallery panel 2000 may display one or more tag elements, such as contract value tag element 2004 and accounting code tag element 2006 by default (e.g. before a search phrase is entered). In one embodiment, the item management system interface may determine one or more tag elements to show by default based on any number of different factors such as a frequency that a tag category has been searched for or moved out of tag gallery panel 316, or any other factor (e.g. as discussed above at least with reference to FIG. 9 or suggested tags panel 900). User interaction with show more interface element 2008 may cause the item management system interface to display additional or alternate tag elements in tag gallery panel 2000.

Figure 21:
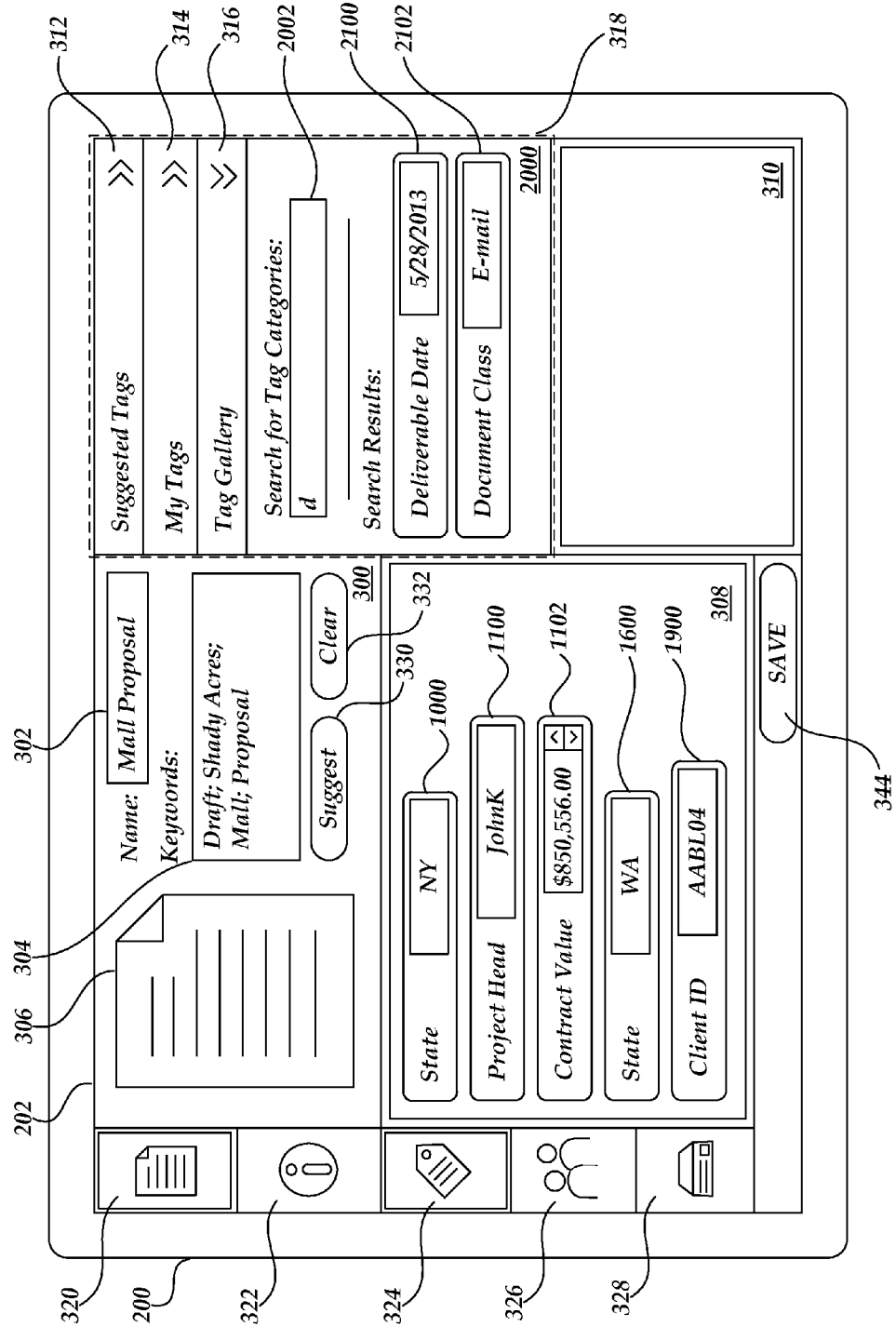

To continue with our illustrative example with reference to FIG. 21, the user may enter a search phrase of "d" into tag category search field 2002. In one embodiment, the item management system interface may cause a search to begin automatically responsive to entering or modifying a search phrase. In another embodiment, the item management system interface may cause a search responsive to a "Search" button or other interface command. Although a single letter search phrase is used here for the purpose of illustration, one of skill in the relevant art will recognize that a search phrase of any length or format may be used based on the configuration of the item management system interface.

For the purpose of our example, we may assume that the item management system interface causes a search responsive to "d" being entered into the search field, and identifies two tag categories beginning with "d" that the user has permission to view: "Deliverable Date," and "Document Class." In the context of our example, two tag elements may be displayed as a result of the search: deliverable date tag element 2100, and document class tag element 2102. In one embodiment, tag elements displayed as a result of a search may have selected tag phrases. Selected tag phrases in tag elements displayed as a result of a search may be selected or determined based on a default setting, a last use, a frequency of use, one or more properties or elements of data associated with or included in a selected item, one or more aspects of the search phrase (e.g. a particular keyword or association), or based on any other information or basis.

Figure 22:
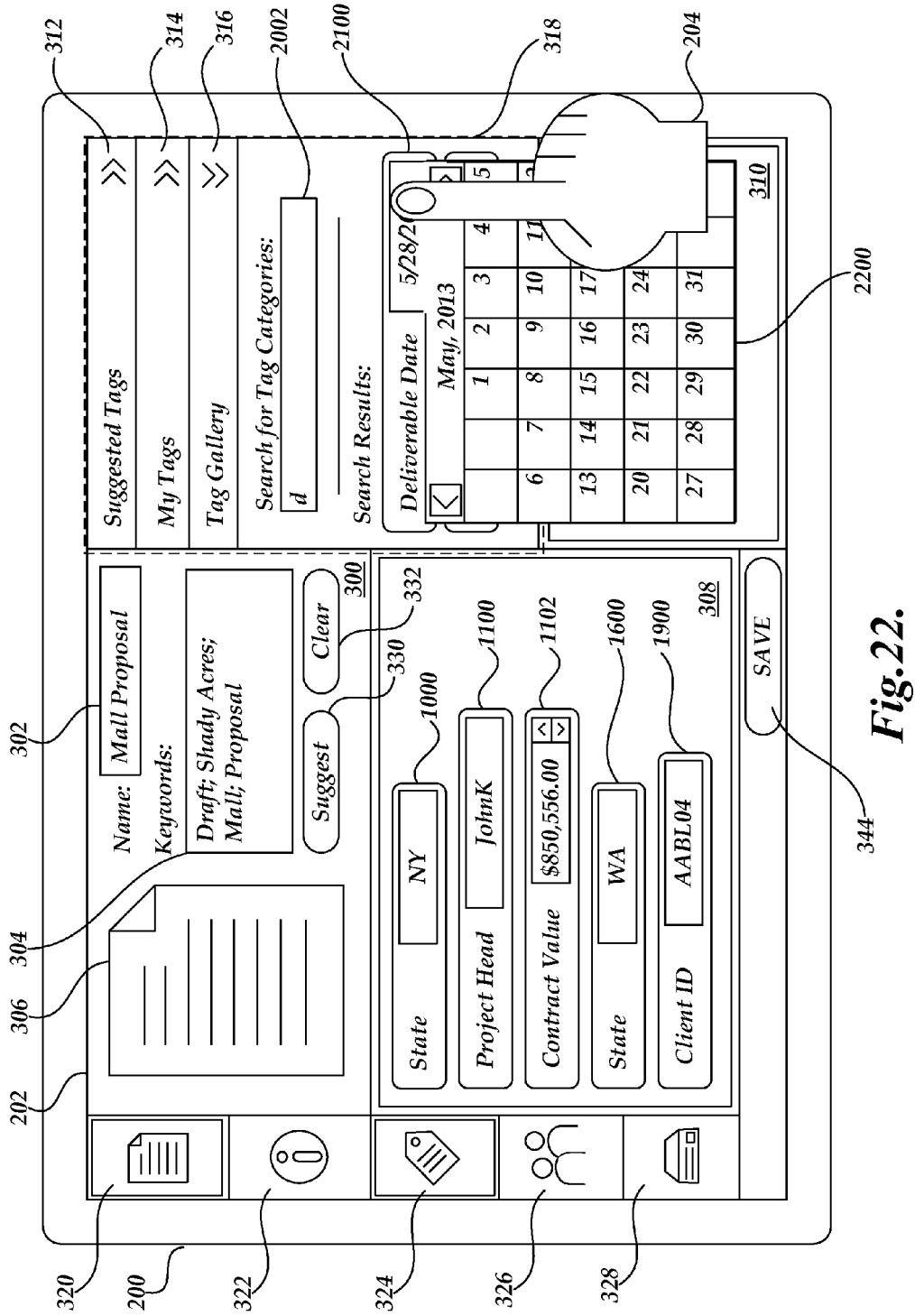

We now continue our illustrative example with reference to FIG. 22. For the purpose of our example, we may assume that deliverable date tag element 2100 accepts date formatted tag phrases and does not restrict a user to tag phrases within a tag phrase collection. In the context of our example, the user may determine that the current selected tag phrase date (e.g. "5/28/2013") associated with deliverable date tag element 2100 may not be an appropriate date for the selected item. The user may click or otherwise interact with the tag phrase area of deliverable date tag element 2100 to open tag phrase calendar dropdown 2200. Illustratively, the user may utilize tag phrase calendar dropdown 2200 to select a tag phrase to be associated with deliverable date tag element 2100.

Figure 23:
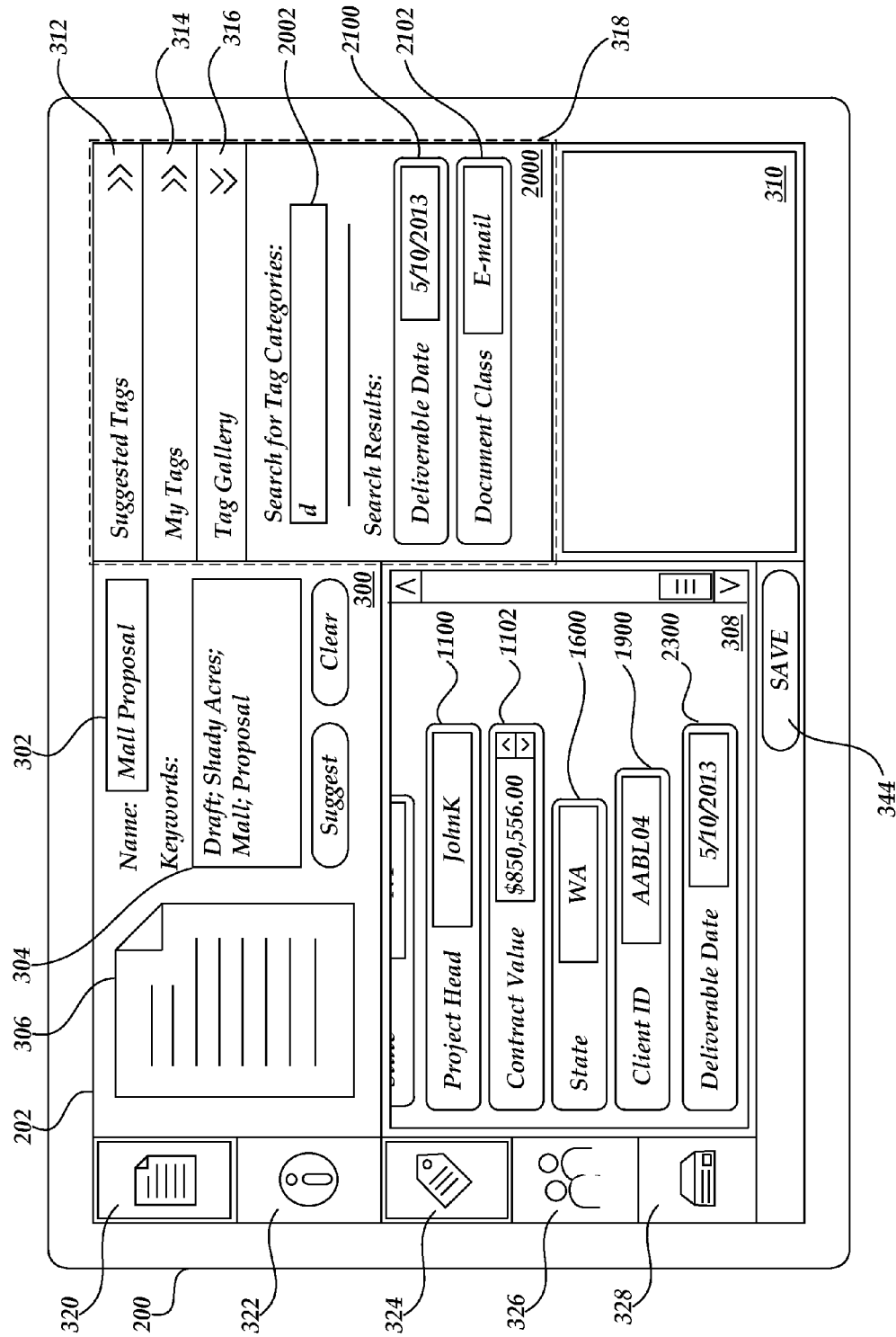

We now continue our illustrative example with reference to FIG. 23. For the purpose of our example, we may assume that the user has selected a tag phrase of "5/10/2013" based on a deliverable date associated with the current selected item. We may further assume that the user has dragged or otherwise moved deliverable date tag element 2100 to tagging interface panel 308, which for the purpose of our example, may cause the item management system interface to create an instance of deliverable date tag element 2300 in tagging interface panel 308.

Figure 24:
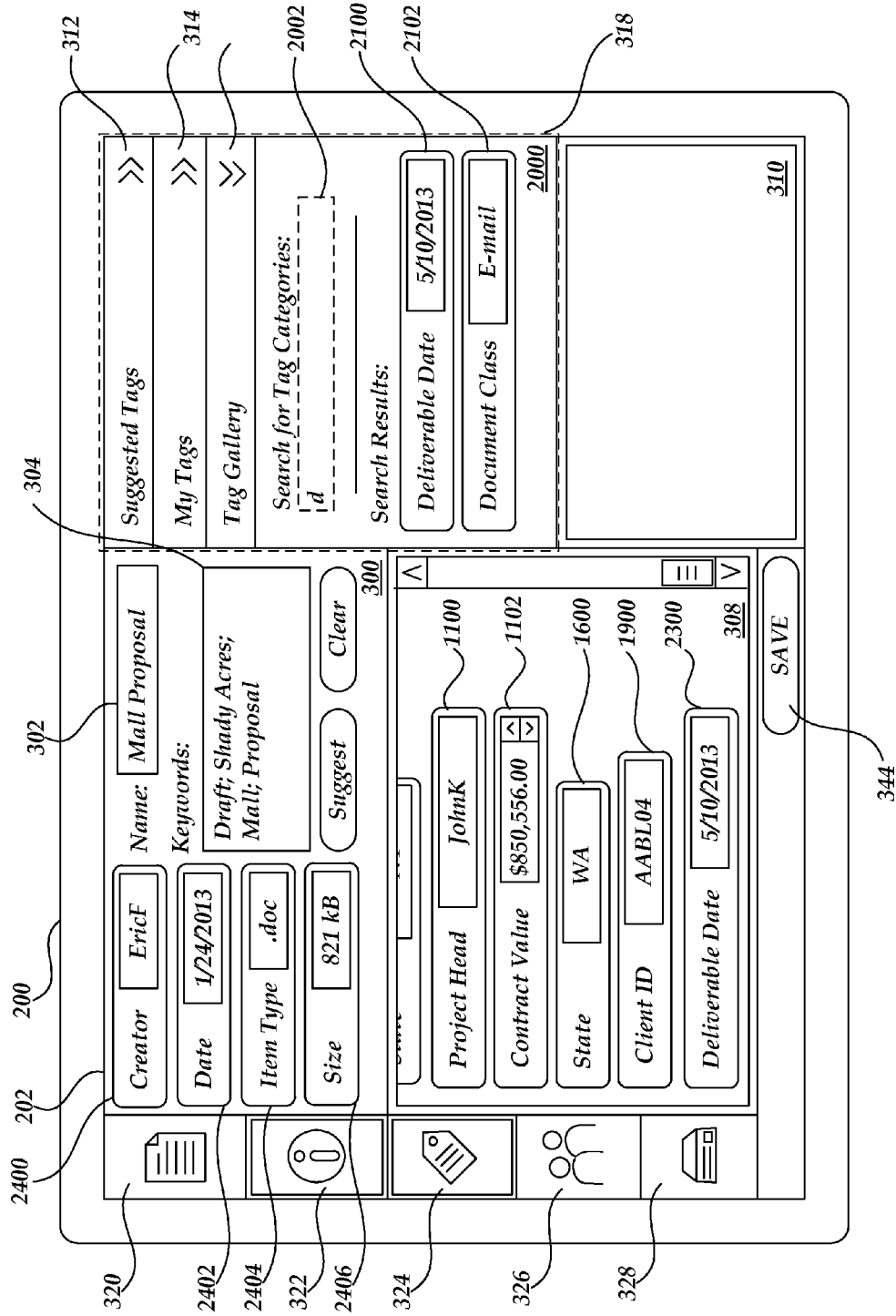

To continue our illustrative example with reference to FIG. 24, the user may activate or otherwise interact with item information button 322. In one embodiment, activating item information button 322 may cause an item management system interface to stop displaying an item preview, and display one or more default tag elements such as creator default tag element 2400, date default tag element 2402, type default tag element 2404, and size default tag element

2406. In one embodiment, an item management system may automatically generate one or more default tag elements when an item is selected as part of an item process or routine. Illustratively, one or more default tag elements may be determined or generated based on properties or data associated with or comprising a selected item. In the context of our illustrative example, the item management system may have determined a creator, creation date, item type (e.g. a file with a .doc suffix), and a size; the item management system may create default tag elements reflecting these properties. In one embodiment, one or more default tag elements will always be associated with an item. In other embodiments, one or more default tag elements may be optional (e.g. a user may be able to choose a combination of system-generated tag elements to associate with an item). In various embodiments, an item management system may generate or determine any number of default tag elements in addition or as an alternative to the default tag elements discussed with reference to illustrative FIG. 24. Tag categories of default tag elements may include, but are not limited to an item creator, a last user to modify an item, an item creation date, an item modification date, an item last access date, an item type (e.g. file, e-mail, contact, data collection, event, user, tag instance, etc.), a file type (e.g. file extension or associated application), a file format, an encryption format, a compression format, compression statistics, a file size, or any other attribute associated with a file, document, set of data, or other item.

To return to our illustrative example, the user may determine that no more tag elements are appropriate to associate with the selected item, and may activate item save button 344 or other save or store command. Illustratively, activating a save or store command may cause the item management system to store the selected item to one or more data storage solutions and store associated tag instances and other metadata to one or more metadata repositories as discussed above and at least with respect to FIG. 1, et al. In one embodiment, tag instances and other metadata associated with the selected item may include tag instances corresponding to tag elements in the tagging interface panel 308, tag instances corresponding to default tag elements (e.g. creator default tag element 2400, et al.), tag instances corresponding to required metadata (e.g. data from item name field 302), tag instances corresponding to keywords, tag instances corresponding to other properties, associations, or attributes of the selected item, or various other metadata, including any of the above categories of metadata stored or recorded in an alternate or non-tag instance format.

Figure 25:
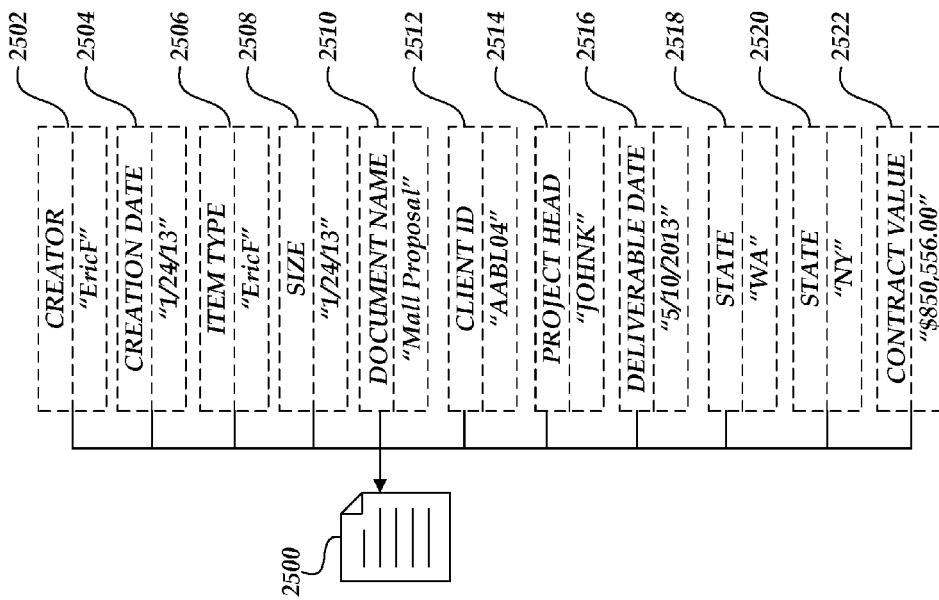
FIG. 25 is a data diagram depicting an illustrative embodiment of item data and tag instance data.

FIG. 25 is a data diagram depicting an illustrative embodiment of item data and tag instance data associated with an item management system. An embodiment of an item management system may include an item 2500 with one or more associated tag instances. In one embodiment, item 2500 may comprise a stored item associated with stored metadata. For example, item 2500 may correspond to an item stored through routine 800 with reference to illustrative FIG. 8. In one embodiment, item 2500 may correspond to the selected item discussed in our above illustrative example with reference to FIGS. 9-24.

Item 2500 may be associated with one or more tag instances, including creator tag instance 2502, creation date tag instance 2504, item type tag instance 2506, size tag instance 2508, document name tag instance 2510, client id tag instance 2512, project head tag instance 2514, deliverable date tag instance 2516, state tag instance 2518, state tag instance 2520, and contract value tag instance 2522. In one embodiment, tag instances discussed with reference to FIG. 25 may correspond to tag elements discussed in our above illustrative example with reference to FIGS. 9-24.

Figure 26:
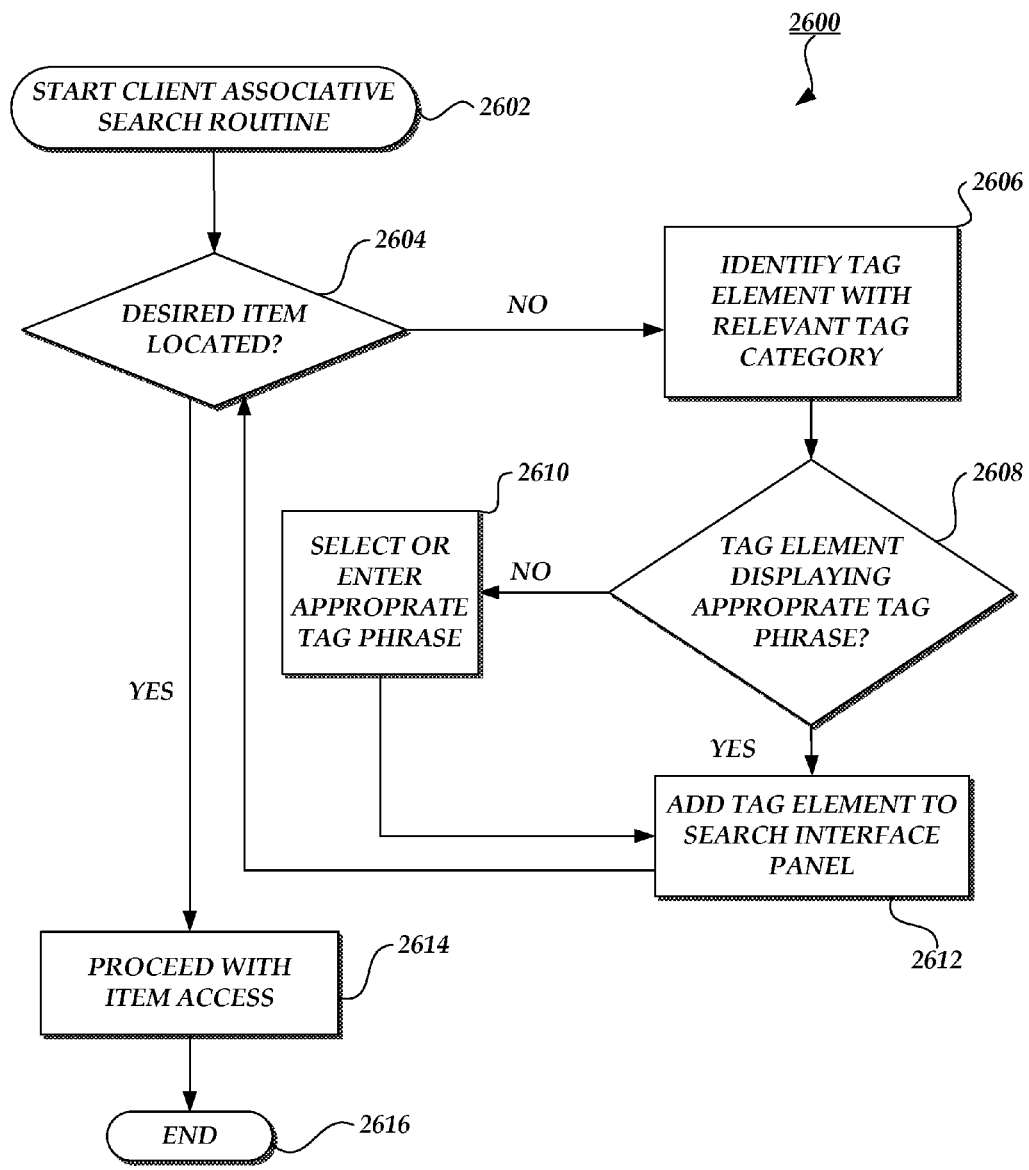
FIG. 26 is a flow diagram depicting an illustrative routine for performing an associative search utilizing metadata.

FIG. 26 is a flow diagram depicting an illustrative routine 2600 for performing an associative search utilizing metadata. In one embodiment, routine 2600 may be implemented or performed by a user interacting with an item management system search interface such as depicted at least with reference to illustrative FIG. 27, et al. Illustratively, interface elements, interactions, routines, and other aspects discussed with reference to FIG. 26 may be implemented, displayed, or executed on a client computing device 102 with reference to illustrative FIG. 1. For example, aspects of routine 2600 may be performed on tablet computing device 200 with reference to illustrative FIG. 2. In one embodiment, aspects or blocks of routine 2600 may be performed by an automated or semi-automated process associated with a client computing device 102, association management provider 132, or associative storage manager 110. In a further embodiment, aspects of routine 2600 may be performed in response to specific interactions or commands by a user or process. In a still further embodiment, aspects of routine 2600 may be implemented on a continuous basis. It will be appreciated by one skilled in the relevant art that various aspects or blocks of routine 2600 may be performed concurrently, sequentially, or at different times and in response to different events or timings. For example, in various embodiments a user may select or enter a tag phrase for a tag element after moving the tag element to a search interface panel.

For the purposes of clarity and illustration, searches and search results may be generally described with regard to FIG. 26 and elsewhere as corresponding to one or more items; however, any discussion specific to the search or retrieval of items is presented for the purpose of clarity and illustration only, and in no way is intended to limit embodiments, interactions, or aspects of an associative search routine to items or item data. In one or more embodiments, one or more embodiments, interactions, routines, or aspects of an associative search may correspond to a search for a system data object (e.g. a system user, tag category, access record or history, etc.) or any other data or metadata associated with an item management system.

Returning to FIG. 26, illustrative routine 2600 begins at block 2602 responsive to a user or process initiating an associative search for a stored item. Illustratively, an associative search may be initiated responsive to any combination of command, interaction, or action, and through or by any combination of one or more processes, interfaces, or devices. In one embodiment, an associative search may be automatically or manually initiated through a search command associated with an operating system, application, or other process or interface. For example, in one embodiment a user may initiate a search by double clicking an icon associated with an item management system. In another embodiment, a user may initiate a search through an "Open" menu option in a third-party application. Illustratively, in one embodiment, initiating a search through a particular application or process may cause search results to be automatically or optionally filtered to exclude items with data types not associated with the particular application or process. In one embodiment, a user may initiate an associative search for multiple items or sets of items.

At block 2604, a user or process determines whether a desired item has been located. For example, a user may view a list of search results to determine whether a desired item has been returned by a search. Illustratively, search results may consist of any number of records or sets of data or metadata associated with any number of items or system data objects. For example, a search result may consist of a set of data corresponding to a stored item and including metadata such as an item name, an item modification date, an item data type, and an item size.

In one embodiment, a search result may correspond to any item or set of items managed by an item management system. In another embodiment, a search result may correspond to a system data object, such as a system user, a tag category, a system storage location, an item access history or record, etc. Illustratively, a search result may consist of any combination of data or metadata associated with an item or system data object, including, but not limited to, names or identifiers, ID codes, pointers or reference codes, sizes, data types, data formats, creation or modification dates, creators or modifiers, access histories, permissions, data storage parameters or locations, encryption settings, compression settings, data previews or samples, associated tag instances or other data system objects, display properties, or any other associated metadata or data. In one embodiment, search results may consist of no data or an empty set.

In one embodiment, search results may be displayed responsive to a completion or processing of a search. In another embodiment, an item management system interface may cause the display of item records or metadata prior to a search being performed. For example, an item management system interface may present search results corresponding to suggested or recently accessed items before any tag elements or other metadata have been selected for a search. As another example, an item management system interface may present a list corresponding to all items stored in an item management system. In another embodiment, an item management system interface may cause the display of item records or metadata concurrent to a search being performed (e.g. as search results are processed by an item management system).

If a user or process is unable to locate a desired item, routine 2600 moves to block 2606. For example, a user or process may be unable to locate a desired item due to the desired item not appearing in a set of search results, or due to the desired item appearing within a large set of other search results. As another example, a user or process may be unable to locate a desired item because a search has not yet been performed or no search results have been provided by an item management system.

At block 2606, a user or process identifies a tag element with a relevant tag category. For example, a user may determine that a particular tag category describes one or more aspect of a desired item. In one embodiment, an item management system interface may include one or more tag elements with general or universal tag categories. For example, an item management system interface may include a tag element with an "Any Category" tag category, allowing a user to search for matching tag phrases across all tag categories. In one embodiment, an identified tag element may be similar or identical to one or more tag elements utilized, identified, or referenced as part of a storage or tagging routine, such as illustratively discussed at least with reference to one or more of FIGS. 9-27.

In one embodiment, one or more tag elements may be located or organized within a section or panel associated with a tag library component. In a further embodiment, one or more tag elements may be searchable by tag category or other associated metadata or system data object. As a specific example, a user searching for a purchase order from an Arizona distributor may identify a tag element with a "State" tag category as relevant; the user may locate the "State" tag element within a section of tag library component, or search for a tag element with a tag category matching "State."

At block 2608, a user or process determines whether an identified tag element with a relevant tag category is displaying an appropriate tag phrase for a desired item. In the context of the above specific example, the "State" tag element may currently be displaying a "WA" tag phrase corresponding to Washington State; the user may wish to select or enter an "AZ" tag phrase.

If a user or process determines that an identified tag element with a relevant tag category is not displaying an appropriate tag phrase for a desired item, routine 2600 moves to block 2610. At block 2610, a user or process to selects or enters an appropriate tag phrase. Illustratively, a user or process may select or enter an appropriate tag phrase utilizing any combination of tag dropdown, search field, text entry box, or any other way including but not limited to methods, interactions, and interfaces discussed with reference to at least one or more of FIG. 8, FIGS. 9-24, and FIGS. 27-32, et al. In the context of the above specific example, a user may select an "AZ" tag phrase by interacting with a dropdown displaying one or more tag phrases (e.g. tag phrases included in a tag phrase collection associated with the "State" tag category).

If an identified tag element is displaying an appropriate tag phrase, routine 2600 moves to block 2612. At block 2612, a user or process adds an identified tag element to a search interface panel. Illustratively, a user may add a tag element to a search interface panel by dragging and dropping the tag element into the search interface panel, selecting a move or add command from a menu, or any other way including but not limited to methods, interactions, and interfaces discussed with reference to a tagging interface panel or search interface panel in the context of at least one or more of FIG. 8, FIGS. 9-24, and FIGS. 27-32, et al. For example, a user may drag a tag element from a tag library component to a search interface panel. In one embodiment, adding a tag element to a search interface panel from an original location within an item management system interface may cause the tag element to move from the original location. In another embodiment, adding a tag element to a search interface panel from another location may cause a new identical tag element to be created within the search interface panel while preserving the state or location of the original tag element.

In one embodiment, adding, removing, or modifying a tag element with reference to a search interface panel may cause an item management system to initiate, update, or process an associative search based on tag elements within the search interface panel. For example, adding a tag element to a search interface panel may cause an item management system to stop any related searches currently being executed and begin a new search based on tag instances corresponding to tag elements within the search interface panel. In another embodiment, an item management system interface may include a "Search" button, menu, or other command; the item management system may begin or execute a search responsive to a user or process triggering, interacting with, or issuing the search button, menu, or command. With reference to illustrative routine 2600, we may assume that in one embodiment an illustrative item management system interface displays or returns search results (e.g. the results of an associative search based on tag elements in a search interface panel) responsive to a tag element being added to a search interface panel. Routine 2600 may continue to block 2604.

At block 2604, a user or process may determine whether a desired item has been located. For example, search results corresponding to a desired item may be displayed or returned by an illustrative item management system interface.

If a desired item has been located, routine 2600 moves to block 2614. At block 2614, a user or process may proceed with accessing a desired item. Illustratively, methods, processes, or interactions associated with accessing a desired item may vary based on a data type, file type, format, or other attribute of the desired item data, or may vary based on a client device or item management system setting or configuration. For example, if an item consists of or includes structured document data, accessing the item may include opening an application or other software process allowing viewing or interaction with the structured document data. As another example, one or more aspects of item data may be viewable or modifiable from within an item management system interface (e.g. contacts, events, user information, custom sets or associations of data, etc.) In one embodiment, accessing item data may include executing or interacting with a local or remote process, or may include providing various item data to one or more local or remote process.

At block 2616, routine 2600 ends. A user or process may identify and locate one or more additional items, may tag or store additional items, may modify tags or other metadata associated with a located desired item, may proceed to view or edit accessed item data, or may proceed with any other interaction, routine, or process.

FIGS. 27-32 are device diagrams depicting illustrative embodiments of an item management system search interface displayed on a tablet computing device 200. With reference to FIGS. 27-32, embodiments of interactions between a user and various aspects of an illustrative item management system interface will be described. Specifically, interactions associated with an illustrative item search routine will be described with reference to aspects of embodiments of one or more item management system search interfaces. For purposes of example, FIGS. 27-32 have been simplified such that many of the features, components, functionalities, interactions, and interface elements associated with the search, management, and presentation of items, metadata, and system data objects are not shown. One skilled in the relevant art will appreciate that various further features, components, functionalities, and interface elements may be utilized in the search, management, and presentation of items, metadata, and system data objects, and that various additional interactions may accordingly occur without departing from the spirit and scope of the present disclosure. One skilled in the relevant art will further appreciate that various functionalities, features, components, and interface elements may be implemented, performed, presented, or otherwise associated with any combination of devices, entities, or systems, including, but not limited to, devices, entities or systems discussed with reference to illustrative FIG. 1 and elsewhere. Illustratively, aspects of various illustrative interactions may be performed by any combination of one or more user or process.

In one embodiment, aspects of features, components, functionalities, interactions, and interface elements discussed with reference to FIGS. 27-32 may illustrate or correspond to aspects or blocks of illustrative routine 2600 as discussed above with reference to FIG. 26. Illustratively, various aspects, actions, or interactions discussed with reference to FIGS. 27-32 may be performed concurrently, sequentially, or at different times and in response to different events or timings. For the purpose of illustration, one or more illustrative interface elements discussed or depicted with reference to any one or more of FIG. 2, FIG. 3, FIGS. 9-24, FIGS. 27-32, et al. may share a common numbering or name; it should be understood that any common numbering or name is for the purpose of illustration and clarity only, and is not meant to imply or require that commonly named or numbered interface elements depicted or discussed with reference to different figures share an identity or are otherwise identical in form or functionality, although this may be the case in some embodiments. In various embodiments, aspects herein described with reference to an embodiment of an item management system storage interface such as discussed with reference to illustrative FIG. 3 may be implemented or included in various aspects, implementations, or configurations of an illustrative item management system search interface or other interface associated with an embodiment of an item management system, and vice versa.

Figure 27:
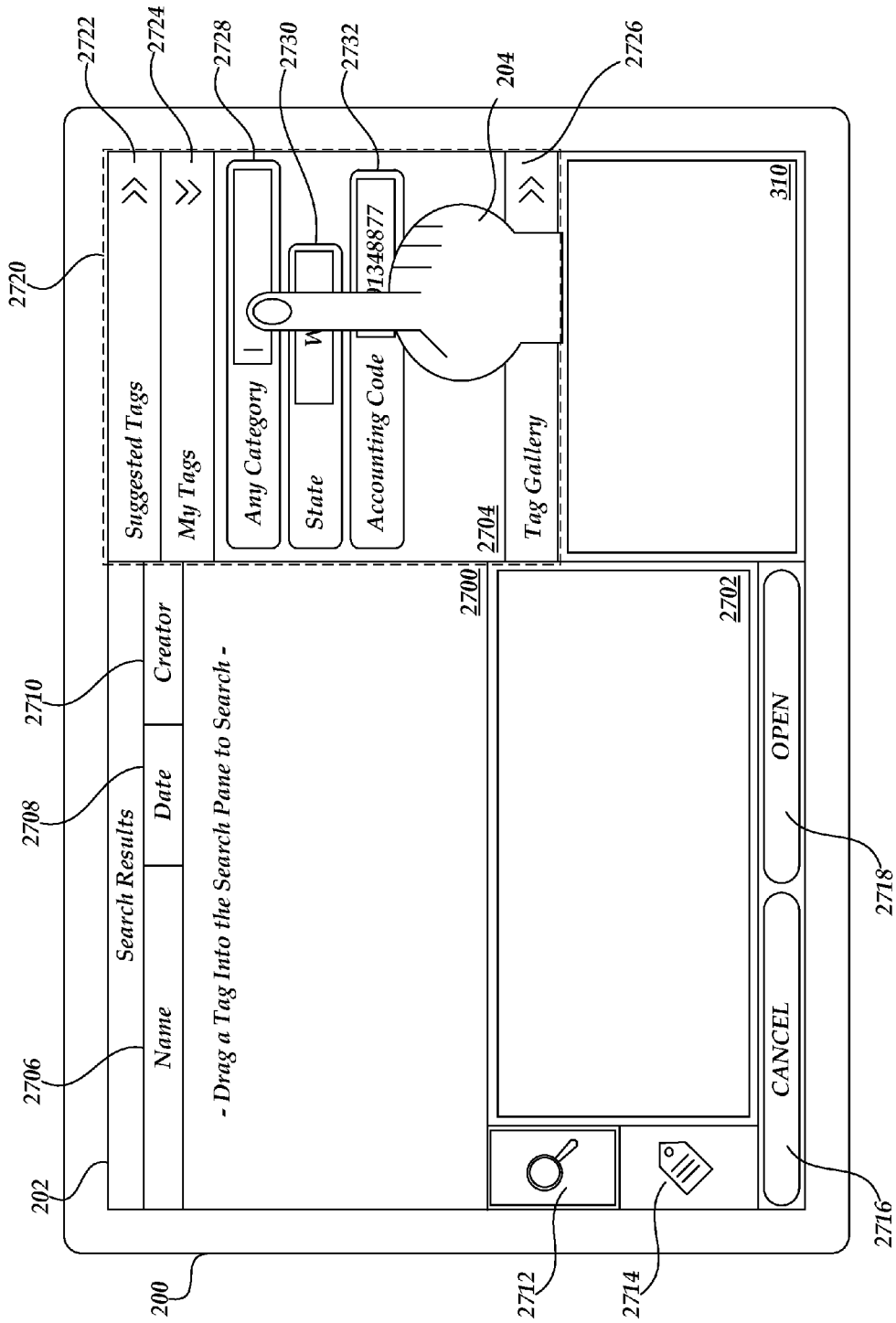
FIGS. 27-32 are device diagrams depicting illustrative embodiments of an item management system search interface.

With reference to FIG. 27, an illustrative embodiment of an item management system search interface is displayed. In various embodiments, an item management system search interface may allow or facilitate the search or retrieval of one or more items (or system data objects) through user interaction with one or more item management interface elements.

Illustratively, an item management system search interface may include search results interface panel 2700 for the display of one or more search results. As discussed above, and at least with respect to illustrative FIG. 26, search results may consist of any number of records or sets of data or metadata associated with any number of items or system data objects. Illustratively, search results interface panel 2700 may include one or more data columns for the presentation of search result data such as name column 2706, date column 2708, and creator column 2710. In other embodiments, search results interface panel 2700 may include any number of other data columns, or may present search result data in any combination of one or more views or formats.

An item management system search interface may further include search interface panel 2702. Illustratively, search interface panel 2702 may hold one or more tag elements. In one embodiment, a user may drag and drop or otherwise move or add tag elements from other interface panels, libraries, or repositories to search interface panel 2702. In one embodiment, adding a tag element to search interface panel 2702 may cause an associative search to be initiated, updated, or processed based on data or metadata associated with a set of tag elements currently search interface panel 2702.

Illustratively, performing an associative search may include comparing search phrases or parameters (e.g. aspects of tag instances or other data associated with tag elements within search interface panel 2702) with stored metadata or data (e.g. tag instance data or other data stored in one or more metadata repositories and associated with stored items or system data objects). For example, an item management system may compare selected tag phrases corresponding to tag elements in search interface panel 2702 to selected tag phrases corresponding to stored tag instances with matching tag categories; these stored tag instances may correspond to stored items or system data objects. In the context of this example, an item management system interface may cause the display of search results corresponding to stored items associated with tag instances that match or logically correspond to tag elements in search interface 2702.

In one embodiment, an item management system may perform a search based on a default logical association between aspects of tag elements within search interface panel 2702. For example, an item management system may by default perform a search based on a logical AND between tag elements of different tag categories, and a logical OR between tag elements corresponding to the same tag category (e.g. identifying search results tagged with at least one tag instance that matches at least one tag element in each set of tag elements of the same tag category included in search interface panel 2702). In another embodiment, an item management system search interface may include one or more interface elements allowing a user to specify a logical relationship between tag elements. For example, an item management system search interface may allow the entry, generation, or selection of aspects of a search phrase specifying a conditional relationship between aspects of tag elements in search interface panel 2702. As another example, search interface panel 2702 may be trifurcated into three sections corresponding to logical AND, OR, and NOT respectively. In the context of this example, an associative search may identify items (or system data objects) that are: tagged with a tag instance corresponding to each tag element in the AND section (e.g. with a corresponding tag category and selected tag phrase); tagged with at least one tag instance corresponding to a tag element in the OR section; and tagged with no tag instances corresponding to tag elements in the NOT section. In various embodiments, the specification of a logical relation between aspects of tag elements may be specified through any way known in the art.

In one embodiment, one or more additional or alternate interface elements or commands may allow the entry or specification of various search phrases or parameters. For example, a search text-box may allow a user to specify additional tag categories or tag phrases (e.g. keywords or other untyped tag phrases).

In one embodiment, search interface panel 2702 may be associated with one or more button interface elements such as search panel button 2712 and tag panel button 2714. In one embodiment, search panel button 2712 being selected may cause search interface panel 2702 to display a set of tag elements currently forming the basis for an associative search as discussed above. In a further embodiment, tag panel button 2714 being selected may cause search interface panel 2702 to display a set of tag elements associated with one or more search results selected in search results interface panel 2700 (if any). For example, a search result corresponding to a stored item may be selected in search results interface panel 2700; search interface panel 2702 may display one or more tag elements associated with the stored item. In the context of this example, modifying a tag element associated with the stored item may cause modification to the association between a stored tag instance corresponding to the tag element and the stored item.

An item management system search interface may additionally include interface button elements including back button 2716 and open button 2718. In one embodiment, interaction with back button 2716 may allow a user to cancel out of an item management system search interface and return to a previous process, application, or interface. In one embodiment, interaction with open button 2718 may allow a user to open or otherwise access items corresponding to one or more selected search results. Illustratively, opening or accessing an item may include, but is not limited to, viewing or editing the item data in an application or process, saving a local copy of item data to a local or remote file system, viewing or editing the item data in an item management system interface or through an item management system plugin, or accessing, viewing, editing, processing, or otherwise interacting with item data in any other way. In one embodiment, opening or accessing an item may include opening, running, instantiating, or accessing a local or remote application or process to process the item data.

An item management system search interface may additionally include a tag library panel 2720 for managing tag elements. In one embodiment, tag library panel 2720 may be configured or implemented in a similar manner to a tag library panel included in an item management system storage interface or configuration. For example, in one embodiment tag library panel 2720 may correspond to tag library panel 318 discussed at least with reference to FIG. 3 or may include any number of same or similar interface elements (e.g. tag elements, tag library panel sections, etc.) discussed with reference to tag library panel 318. In another embodiment, tag library panel 2720 may include any number of sections (e.g. sub-panels, collapsible headers, panes, views, or other interface elements), tag elements, or other interface elements different than a tag library panel included in an item management system storage interface or configuration.

For the purpose of example, tag library panel 2720 may include collapsible interface elements such as suggested tags header 2722, my tags header 2724, and tag gallery header 2726. In various embodiments, one or more of suggested tags header 2722, my tags header 2724, and tag gallery header 2726 may or may not correspond to header interface elements discussed at least with reference to FIG. 3. In other embodiments, tag library panel 2720 may or may not include fewer, more, or any number of additional or alternate collapsible interface elements, areas, sections, lists, or other interface elements.

For the purpose of example, my tags header 2724 may be expanded to display my tags panel 2704 containing any category tag element 2728, state tag element 2730, and accounting code tag element 2732. In one embodiment, state tag element 2730 and accounting code tag element 2732 may correspond to state tag element 902 and accounting code tag element 904 discussed at least with reference to FIG. 9, et al. In another embodiment, one or more of state element 2730 and accounting code tag element 2732 may not correspond to state tag element 902 and accounting code tag element 904 or may have additional or alternate aspects.

In one embodiment, any category tag element 2728 may appear in an item management system search interface and not appear or be included with reference to an item management system storage interface such as that discussed at least with reference to illustrative FIG. 3 and FIGS. 9-24. Illustratively, any category tag element 2728 may correspond to a special tag category with a logical correspondence to any other tag category. For example, a search based on any category tag element 2728 may compare a selected tag phrase associated with any category tag element 2728 to all selected tag phrases of one or more stored tag instances in an item management system, regardless of tag category. In various embodiments, any category tag element 2728 may be associated with selected tag phrases of any data type or format, and may support or implement any one or more data entry elements or interfaces as known in the art.

For the purpose of a specific example of illustrative interactions with an item management system search interface and with reference to FIG. 27, we may assume that a user wishes to retrieve or access an item corresponding to a word processing document consisting of a sales proposal for a mall. Illustratively, in the context of this specific example, the item corresponding to a word processing document may correspond to the item illustratively stored in our specific example with reference to FIGS. 9-24. For the purpose of our specific example, the user may select a tag phrase field associated with any category tag element 2728.

Figure 28:
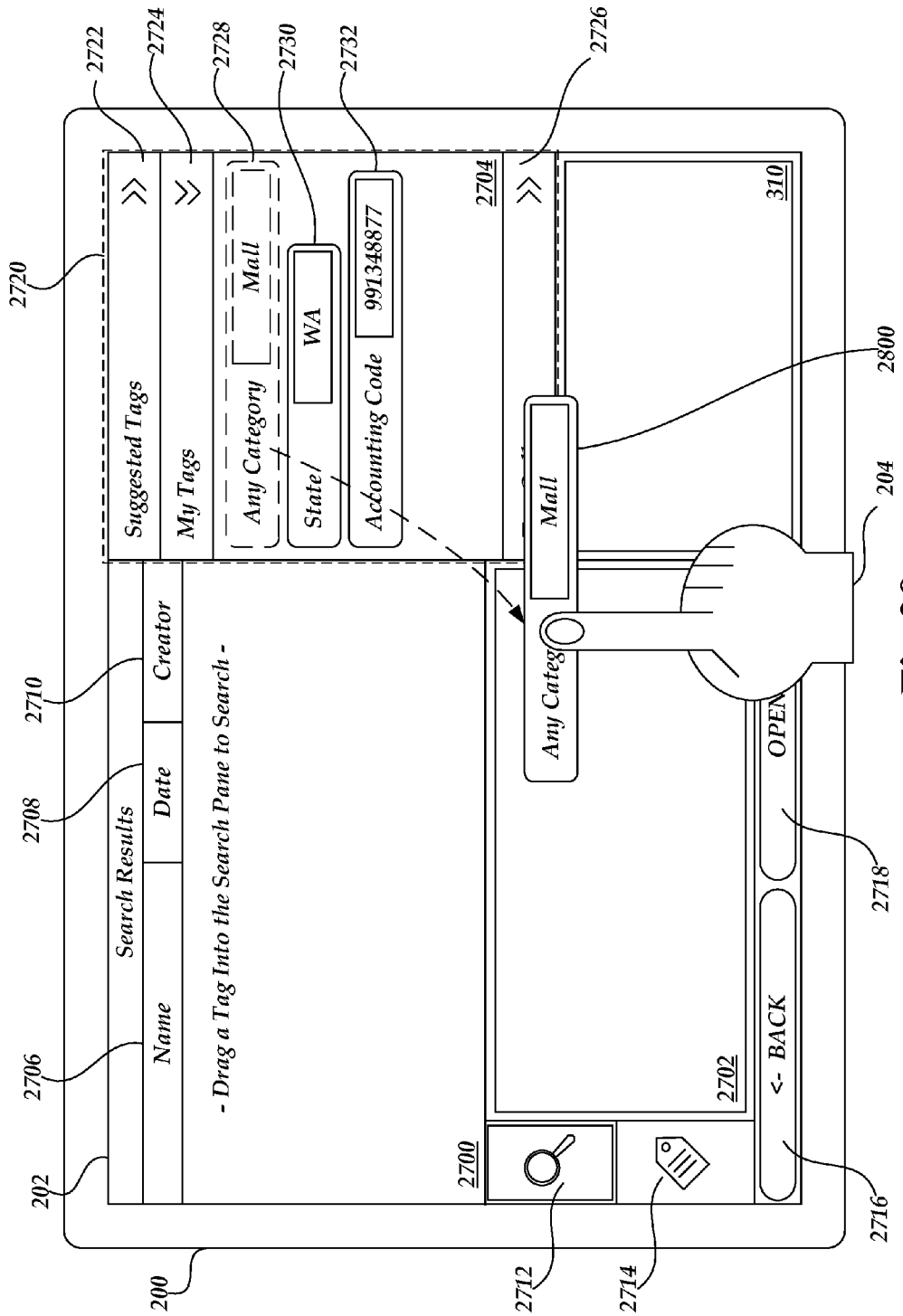

To continue our specific example with reference to FIG. 28, the user may enter a selected search phrase "Mall" into the tag phrase field associated with any category tag element 2728. In the context of our specific example, the user may drag any category tag element 2728 from my tags panel 2704 to search interface panel 2702. In one embodiment, dragging any category tag element 2728 from my tags panel 2704 may cause the instantiation of a new instance of any category tag element 2800. Dropping any category tag element 2800 on search interface panel 2702 may cause any category tag element 2800 to be added to search interface panel 2702. Illustratively, my tags panel 2704 may still contain any category tag element 2728. In another embodiment, dragging any category tag element 2728 to search interface panel 2702 may cause any category tag element 2728 to be moved from my tags panel 2704 to search interface panel 2702.

Figure 29:
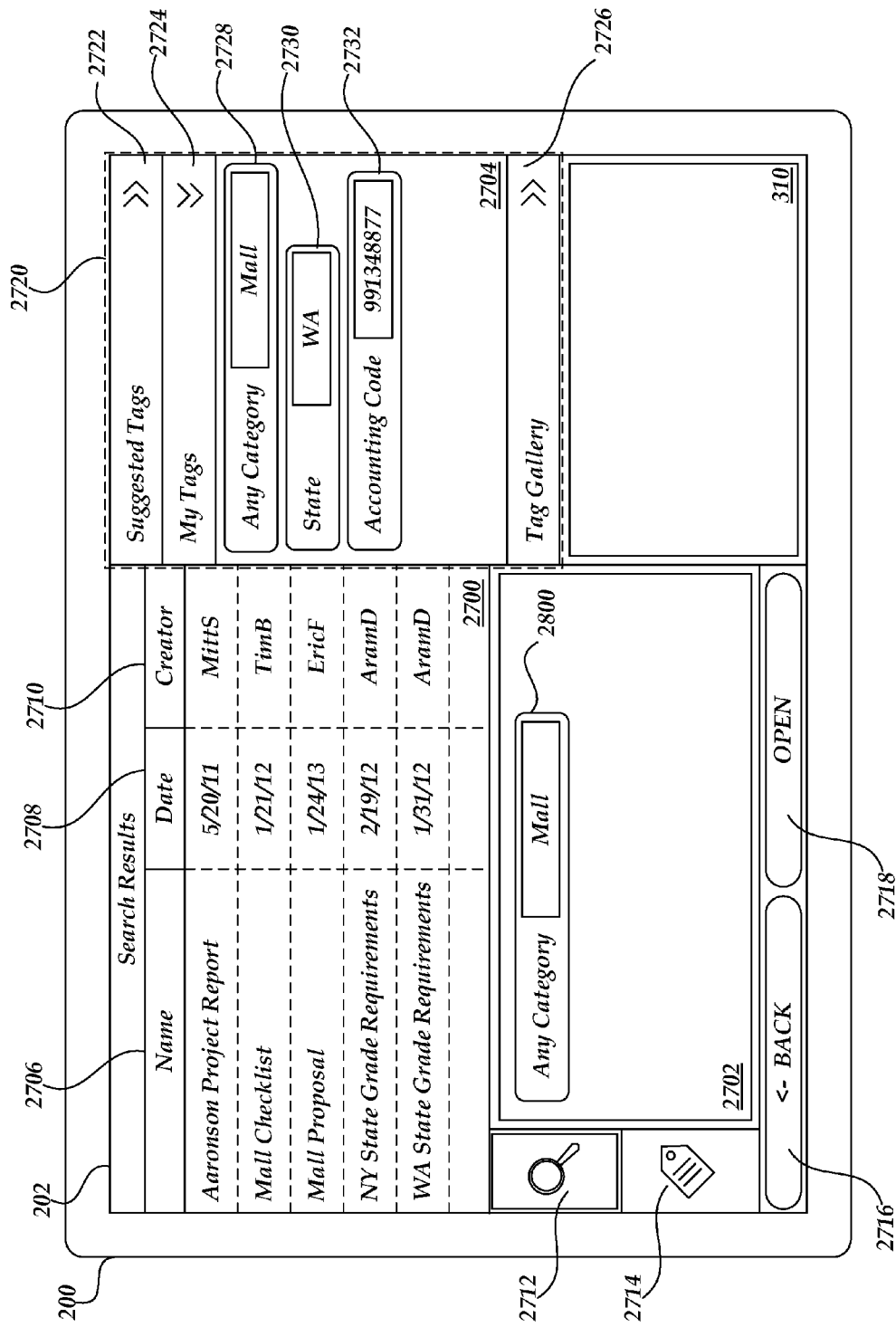

To continue our specific example with reference to FIG. 29, adding any category tag element 2800 to search interface panel 2702 may cause the item management system to perform an associative search based on data and metadata associated with any category tag element 2800. In the context of our specific example, the item management system may compare the "Mall" selected tag phrase to selected tag phrases associated with stored tag instances regardless of the tag categories of the stored tag instances. For the purpose of our specific example, we may assume that a number of stored items are associated with tag instances with a "Mall" selected tag phrase. For example, a first item may be associated with a tag instance corresponding to a "Mall" keyword (e.g. corresponding to a "Mall" selected tag phrase and a "keyword" tag category or a "Mall" selected tag phrase without a corresponding tag category, etc.). As another example, a second item may be associated with a tag instance corresponding to a "Development Type" tag category and a "Mall" selected tag phrase. In the context of these examples, an item management system may identify both the first item and the second item as logically corresponding to any category tag element 2800 during an associative search.

To continue our specific example, we may assume that an associative search identifies six stored items and returns a set of corresponding search results (e.g. "Aaronson Project Report," "Mall Checklist," etc.) that may be displayed in search result interface panel 2700. In the context of our specific example, we may assume that an item corresponding to a "Mall Proposal" search result is the item sought by the user; however, we will discuss additional illustrative interactions for the purpose of illustrating and clarifying various aspects and features of embodiments of an item management system.

Figure 30:
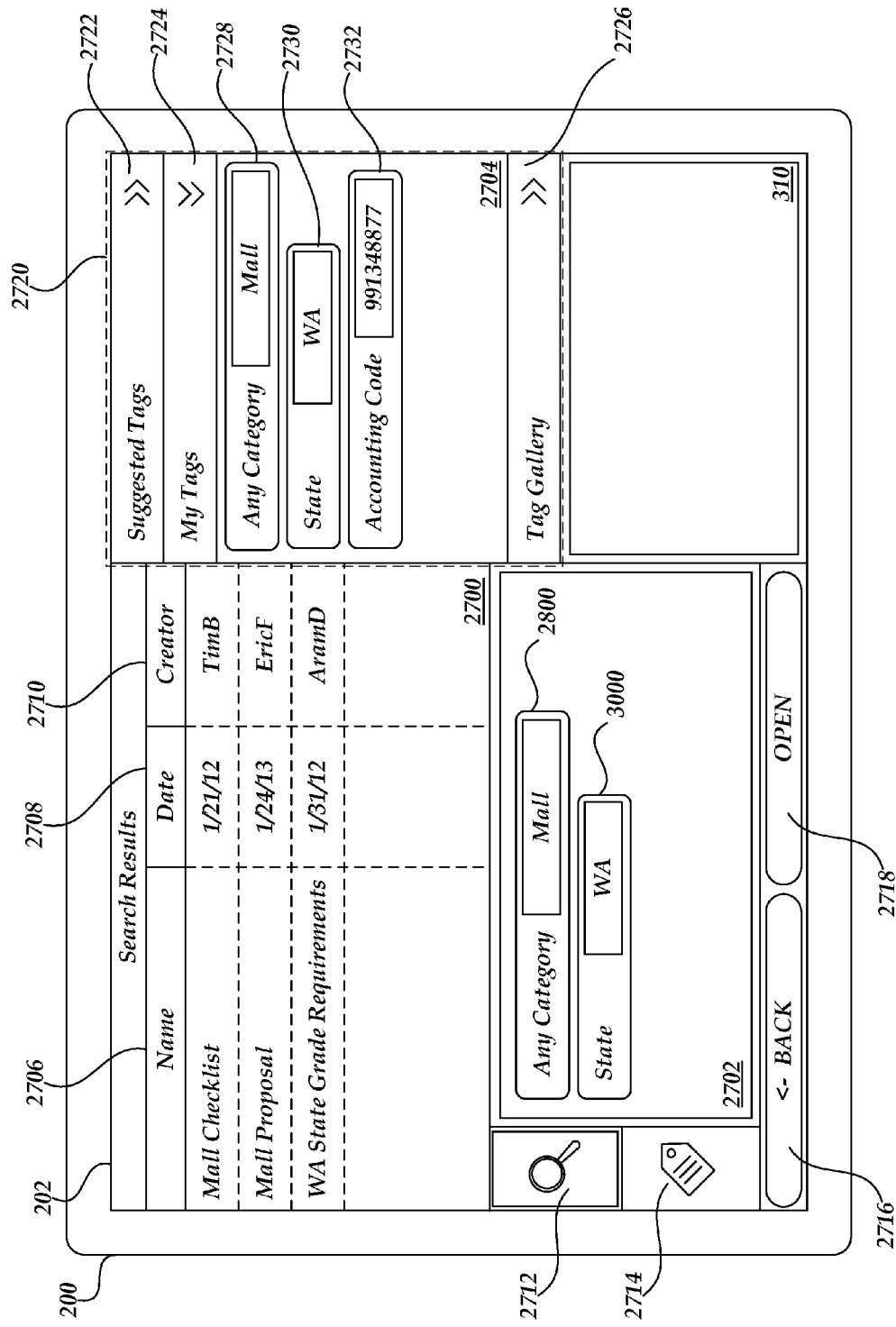

To continue our specific example with reference to FIG. 30, the user may add state tag element 3000 to search interface panel 2702. For example, the user may drag and drop state tag element 2730 into search interface panel 2702, which may cause a new instance of state tag element 3000 to be added in search interface panel 2702. In the context of our specific example, adding state tag element 2730 to search interface panel 2702 may cause the item management system to perform an associative search based on data and metadata associated with any category tag element 2800 and state tag element 3000. In one embodiment, an item management system may update, re-process, modify, or continue a previous or currently pending search in addition to or as an alternative to performing a new associative search.

In the context of our specific example, an associative search may include identifying instances of stored items where each stored item is associated with a set of one or more tag instances such that: at least one of the set of tag instances has a selected tag phrase including "Mall"; AND at least one of the one or more tag instances has a selected tag phrase including "WA" and a tag category "State." For the purpose of our example, we may assume that the item management system identifies three items associated with tag instances that meet the above criteria, and causes the item management system interface to display corresponding search results (e.g. "Mall Checklist," "Mall Proposal," etc.)

Figure 31:
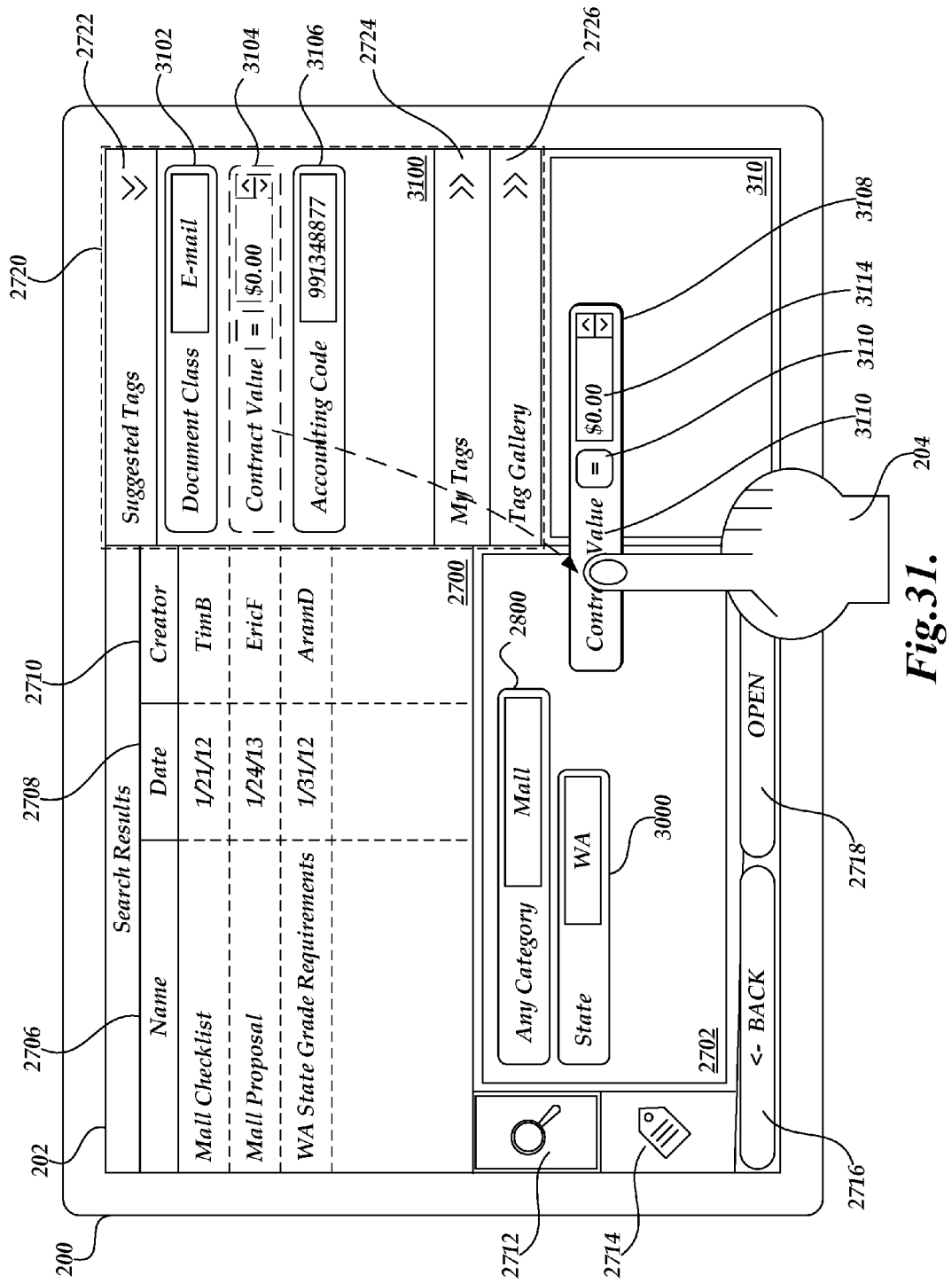

To continue our specific example with reference to FIG. 31, the user may expand suggested tags header 2722 to show suggested tags panel 3100 containing document class tag element 3102, contract value tag element 3104, and accounting code tag element 3106. In the context of our specific example, the user may drag contract value tag element 3104 out of suggested tags panel 3100, which may cause the item management system interface to create a new instance of contract value tag element 3108. For the purpose of our specific example, we may assume that contract value tag element 3108 is associated with a "Contract Value" tag category that designates a floating point currency value for associated selected tag phrases, and designates free entry of tag phrase values through at least tag phrase field 3114. Illustratively, contract value tag element 3108 may include conditional toggle 3110 in addition to tag category label 3110 and tag phrase field 3114. In one embodiment, conditional toggle 3110 may specify a relationship between selected tag phrase values of stored tag instances and a selected tag phrase value associated with tag value phrase field 3114.

To continue our specific example, dropping contract value tag element 3108 onto search interface panel 2702 may cause contract value tag element 3108 to be added to search interface panel 2702 and may cause the item management system to perform, update, or continue an associative search based on data or metadata associated with any category tag element 2800, state tag category 3000, and contract value tag element 3108. In the context of our specific example, an associative search may include identifying instances of stored items each associated with a set of one or more tag instances such that: at least one of the set of tag instances is associated with a selected tag phrase "Mall"; AND at least one of the one or more tag instances has a tag category "State" and is associated with a selected tag phrase "WA"; AND at least one of the one or more tag instances has a tag category "Contract Value" and is associated with a selected tag phrase with a value equal to 0.00.

Figure 32:
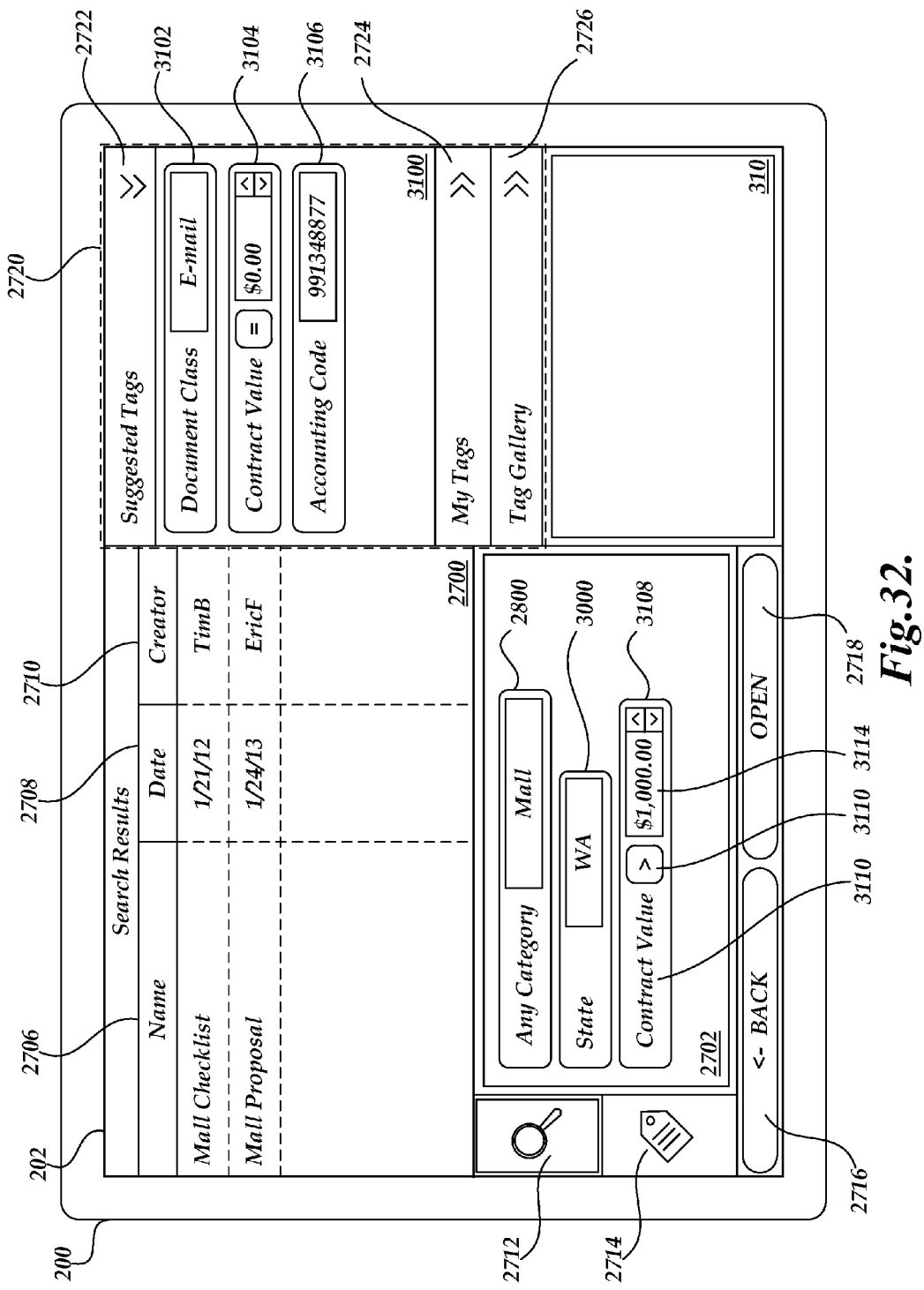

To continue our specific example with reference to FIG. 32, the user may interact with conditional toggle 3110 to select a greater than operator, and may interact with tag phrase field 3114 to enter or select a value of 1000.00. Illustratively, interactions with conditional toggle 3110 may include, but are not limited to, clicking to toggle a conditional operator, selecting a conditional operator from a dropdown, utilizing arrows or a menu to select a conditional operator, entering a conditional operator, or any other interaction as known in the art.

In the context of our specific example, modifying conditional toggle 3110 or tag phrase field 3114 may cause the item management system to perform, update, or continue an associative search based on data or metadata associated with any category tag element 2800, state tag category 3000, and contract value tag element 3108. In the context of our specific example, an associative search may include identifying instances of stored items each associated with a set of one or more tag instances such that: at least one of the set of tag instances is associated with a selected tag phrase "Mall"; AND at least one of the one or more tag instances has a tag category "State" and is associated with a selected tag phrase "WA"; AND at least one of the one or more tag instances has a tag category "Contract Value" and is associated with a selected tag phrase with a value greater than 1000.00.

For the purpose of our specific example, we may assume that the item management system identifies two items associated with tag instances that meet the above criteria, and causes the item management system interface to display corresponding search results (e.g. "Mall Checklist," "Mall Proposal"). In the context of our specific example, selecting one or both search results and clicking open button 2718 may cause the item management system interface to retrieve item data associated with one or more selected search results. In one embodiment, an item management system may display one or more aspects of retrieved item data. In another embodiment, an item management system may cause an application or other process to display or process one or more aspects of retrieved item data.

It will be appreciated by those skilled in the art and others that all of the functions described in this disclosure may be embodied in software executed by one or more processors of the disclosed components and communications devices. The software may be persistently stored in any type of non-volatile storage.

Conditional language, including, but not limited to, "can," "could," "might," or "may," unless stated otherwise, is generally intended to convey that certain embodiments include certain features, elements or steps, while other embodiments may contain additional, fewer, alternate, or modified features, elements, or steps. Such conditional language is not generally intended to imply that features, elements or steps are in any way required in the context of one or more embodiments, or that embodiments include logic for deciding, with or without user input or prompting, whether particular features, elements or steps are included or are to be performed in any particular embodiment. Alternative conjunctions such as "or," unless stated otherwise, are generally intended as inclusive, and should be interpreted as including any possible combination of one or more features, elements, or steps.

Any process descriptions, elements, or blocks described or suggested herein or depicted in one or more of the attached figures should be understood as potentially representing modules, segments, or portions of code which include executable instructions for implementing specific logical functions or steps. Alternate implementations are included within the scope of the embodiments described herein in which elements, functions, routines, user or process interactions, or any other step or aspect may be omitted, added, or executed in an alternate order from that shown or discussed, including substantially concurrently or in reverse order as would be understood by those skilled in the art. Data, metadata, components, or code described above may be stored on a computer-readable medium and loaded into memory of a computing device through any means known in the art including, but not limited to, a flash drive or other portable storage device, a storage system or device associated with the computing device, a CD-ROM, a DVD-ROM, a network interface, etc. Any number and combination of components, processes, functionality, data, metadata, or other elements may be included in a single device or distributed in any manner. Accordingly, one or more general purpose computing devices may be configured to implement any combination of processes, algorithms, or methodology of the present disclosure.

It should be emphasized that many variations and modifications may be made to the herein described embodiments; all aspects and elements of said variations and modifications among other acceptable examples are to be understood as being described herein. All such modifications and variations are intended to be herein included and within the scope of this disclosure and protected by the following claims.

What is claimed is:

1. A system for managing data associated with a selected item comprising:
    a first memory component for storing item data associated with the selected item;
    a second memory component for storing tags associated with the selected item;
    a computer implemented item management storage component operable to:
        display indicia corresponding to one or more attributes of the selected item;
        display a first plurality of encapsulated UI elements in a first library interface location, wherein each encapsulated UI element represents a tag comprising a tag category and a selected tag value, each encapsulated UI element comprising:
            a tag category name UI label displaying the tag category of the represented tag; and
            a selectable tag value UI field displaying the selected tag value of the represented tag, wherein the selected tag value is a first tag value of a plurality of tag values corresponding to the tag category of the represented tag, wherein user selection of the selectable tag value UI field causes the display of a dropdown UI displaying two or more of the plurality of tag values, and wherein user selection of a second tag value from the dropdown UI causes the second tag value to become the selected tag value of the represented tag in place of the first tag value, including displaying the second tag value in the selectable tag value UI field;
        responsive to a first drag and drop operation by a user, add a first encapsulated UI element of the first plurality of encapsulated UI elements to a selected item interface location associated with the selected item;
        responsive to a second drag and drop operation by a user, add a second encapsulated UI element of the first plurality of encapsulated UI elements to the selected item interface location associated with the selected item
        store the item data to the first memory component; and
        store tags associated with the item data to the second memory component, wherein the tags comprise tags represented by two or more encapsulated UI elements in the selected item interface location, including at least the first and second encapsulated UI elements; and
    an item management search component operable to:
        display a second plurality of encapsulated UI elements in a second library interface location, the second plurality of encapsulated UI elements including at least the first encapsulated UI element;

responsive to a third drag and drop operation by a user, add the first encapsulated UI element to a search interface location;

identify the item data stored in the first memory component based at least on a comparison between the stored tags associated with the item data and tags represented by one or more encapsulated UI elements in the search interface location, including at least the first encapsulated UI element; and access at least a part of the item data stored in the first memory component.

2. The system of claim 1, wherein the second encapsulated UI element is associated with a plurality of secondary encapsulated UI elements.

3. The system of claim 2, wherein adding the second encapsulated UI element to the selected item interface location automatically adds each member of the plurality of secondary encapsulated UI elements to the selected item interface location.

4. A computer-implemented method for managing data associated with a selected item comprising:

displaying, by one or more computing devices, a selected item interface location associated with the selected item;

displaying, by one or more computing devices, a tag UI location containing a plurality of encapsulated UI elements, each encapsulated UI element representing a tag comprising an associative category and a selected value of a plurality of values corresponding to the associative category, wherein each encapsulated UI element comprises a category UI label displaying the associative category and a selectable tag value field displaying the selected value, and wherein the selectable tag value field is operable to select a new selected value from the plurality of values corresponding to the associative category responsive to user interaction, including displaying the new selected value in the selectable tag value field;

responsive at least to a first user interaction, adding a first encapsulated UI element of the plurality of encapsulated UI elements to the selected item interface location, the first encapsulated UI element representing a first tag comprising a first associative category and a first selected tag value of a first plurality of tag values corresponding to the first associative category;

responsive at least to a second user interaction, adding a second encapsulated UI element of the plurality of encapsulated UI elements to the selected item interface location, the second encapsulated UI element representing a second tag comprising a second associative category and a second selected tag value;

storing, by one or more computing devices, tags associated with the selected item in a first memory component, wherein the tags comprise tags represented by two or more encapsulated UI elements in the selected item interface location, including at least the first tag and second tag;

responsive at least to a third user interaction, adding the first encapsulated UI element to a search interface location; and identifying, by one or more computing devices, item data associated with the selected item at least based on tags represented by one or more encapsulated UI elements in the search interface location, including at least the first tag.

5. The computer-implemented method of claim 4, wherein at least one of the first associative category and the second associative category is associated with an attribute data type comprising at least one of a text data type, a decimal data type, a floating point data type, an integer data type, a date data type, a time data type, a datetime data type, a custom data type, a system user data type, an event data type, and a system item data type.

6. The computer-implemented method of claim 4, wherein the first plurality of tag values is user-defined.

7. The computer-implemented method of claim 4 further comprising identifying the item data at least based on a comparison between the stored tags associated with the selected item and a plurality of tags each represented by an encapsulated UI element in the search interface location, including at least the first tag represented by the first encapsulated UI element and the second tag represented by the second encapsulated UI element.

8. The computer-implemented method of claim 7, wherein the plurality of tags each represented by an encapsulated UI element in the search interface location further includes a third tag represented by a third encapsulated UI element and comprising a third associative category and a third selected tag value, wherein the first associative category and the second associative category are the same associative category and the third associative category is a different associative category.

9. The computer-implemented method of claim 8 further comprising identifying the item data at least based on a comparison that is satisfied if at least a first selected tag value of a first stored tag matches either the first or second selected tag value and at least a second selected tag value of a second stored tag matches the third selected tag value.

10. The computer-implemented method of claim 4, wherein the first associative category is associated with at least one display characteristic, and wherein the at least one display characteristic is applied to one or more encapsulated UI elements associated with the first associative category, including at least the first encapsulated UI element.

11. The computer-implemented method of claim 10, wherein a display characteristic comprises at least one of a sound, an animation, a background color, a font, a font color, a transparency style, a visual style, an image, an icon, or a border style.

12. The computer-implemented method of claim 10, wherein the second associative category is the same as the first associative category, and the at least one display characteristic is applied to the second encapsulated UI element.

13. A computer-implemented system for managing data associated with a selected item comprising:

a memory component for the storage of metadata; and an item management component operable to:

display a first interface location associated with the selected item;

move a first encapsulated UI element to the first interface location responsive to a first user interaction wherein the first encapsulated UI element comprises at least a first tag category label displaying a first tag category and a first selectable value field displaying a first selected value, wherein the first selected value is one of a first plurality of values corresponding to the first tag category, and wherein the first selectable value field is operable to select a different selected value from the first plurality of values responsive to user interaction;

store item metadata associated with the selected item based on the first encapsulated UI element in the first interface location, including at least storing the first tag category and the first selected value;

display a second interface location associated with a search operation;

move the first encapsulated UI element to the second interface location responsive to a second user interaction; and identify item data associated with the selected item at least based on a first comparison between the stored item metadata associated with the selected item and the first encapsulated UI element including at least the first tag category and the first selected value.

14. The system of claim 13, wherein the first encapsulated UI element is not displayed to a first user at least based on a first access permission, and the first encapsulated UI element is displayed to a second user at least based on a second access permission.

15. The system of claim 13, wherein the item management component is further operable to move a second encapsulated UI element to the second interface location responsive to user interaction, wherein the second encapsulated UI element represents a second tag category and a second selected value.

16. The system of claim 15, wherein the identification of item data associated with the selected item is further based on a second comparison between the stored item metadata and the second encapsulated UI element, including at least identifying a first stored selected value of the stored item metadata matching the first selected value and a second stored selected value of the stored item metadata matching the second selected value.

17. The system of claim 15, wherein the second interface location includes a third encapsulated UI element, wherein the third encapsulated UI element represents the first tag category and a third selected value of the plurality of values corresponding to the first tag category, wherein the first tag category is different than the second tag category, and wherein the item management component is further operable to identify item data associated with the selected item at least based on a comparison comprising:

identifying a first stored selected value matching at least one of the first selected value and the third selected value; and identifying a second stored selected value matching at least the second selected value.

18. The system of claim 13, wherein the first interface location contains a plurality of encapsulated UI elements and wherein the item management component is further operable to store item metadata associated with the selected item at least based on information associated with the plurality of encapsulated UI elements.

19. The system of claim 18, wherein at least one of the plurality of encapsulated UI elements represents a user access permission.

20. The system of claim 13, wherein the first user interaction includes at least one of a user drag and drop operation, a user associative interface component click operation, and a user associative interface component selection operation.

* * * * *